(12) United States Patent
Edge

(10) Patent No.: US 12,200,482 B2
(45) Date of Patent: Jan. 14, 2025

(54) METHOD AND APPARATUS FOR ACQUISITION OF RELIABLE TIME IN A WIRELESS NETWORK

(71) Applicant: QUALCOMM Incorporated, San Diego, CA (US)

(72) Inventor: Stephen William Edge, Escondido, CA (US)

(73) Assignee: QUALCOMM Incorporated, San Diego, CA (US)

(*) Notice: Subject to any disclaimer, the term of this patent is extended or adjusted under 35 U.S.C. 154(b) by 218 days.

(21) Appl. No.: 17/386,325

(22) Filed: Jul. 27, 2021

(65) Prior Publication Data

US 2023/0032067 A1 Feb. 2, 2023

(51) Int. Cl.
*H04W 12/00* (2021.01)
*G04R 20/02* (2013.01)
(Continued)

(52) U.S. Cl.
CPC .......... *H04W 12/06* (2013.01); *G04R 20/02* (2013.01); *G04R 20/14* (2013.01); *H04L 9/30* (2013.01);
(Continued)

(58) Field of Classification Search
CPC ....... H04W 12/06; H04W 4/06; H04W 12/03; H04W 12/121; H04W 24/08;
(Continued)

(56) References Cited

U.S. PATENT DOCUMENTS

2018/0284149 A1* 10/2018 Kommi ................ G01C 21/165
2018/0324740 A1* 11/2018 Edge .................... G01S 5/0236
(Continued)

FOREIGN PATENT DOCUMENTS

WO   WO-2018057322 A1 *  3/2018 ............. G06F 21/64
WO   WO-2022106632 A1 *  5/2022 ........ H04W 56/0015

OTHER PUBLICATIONS

Chanaka Ganewattha, Zaheer Khan, Janne Lehtomäki, Matti Latva-Aho; "Hardware-accelerated Real-time Drift-awareness for Robust Deep Learning on Wireless RF Data"; ACM Transactions on Reconfigurable Technology and Systems, vol. 16, No. 2, Article 19; Mar. 2023; pp. 1-29 (Year: 2023).*
International Search Report and Written Opinion—PCT/US2022/032396—ISA/EPO—Sep. 19, 2022.
(Continued)

*Primary Examiner* — Fatoumata Traore
*Assistant Examiner* — Courtney D Fields
(74) *Attorney, Agent, or Firm* — QUALCOMM Incorporated

(57) ABSTRACT

Accurate and reliable time is acquired by a user equipment (UE) from a base station in a wireless network. The base station may obtain the time, e.g., UTC time or a GNSS time, and ciphers at least a portion of the time before broadcasting the time. The UE determines a propagation delay between the UE and the base station based on a timing advance, known locations of the UE and the base station, or a measured round trip propagation time (RTT) between the UE and the base station. A corrected time can be determined based on the time received from the base station and the propagation delay. A digital signature included with the time broadcast by the base station increases reliability. Spoofing of the broadcast time by an attacking device may be detected by the UE based on the propagation delay being outside an expected range.

44 Claims, 9 Drawing Sheets

(51) Int. Cl.
    *G04R 20/14*     (2013.01)
    *H04L 9/30*     (2006.01)
    *H04L 9/32*     (2006.01)
    *H04W 4/06*     (2009.01)
    *H04W 12/03*     (2021.01)
    *H04W 12/06*     (2021.01)
    *H04W 12/121*     (2021.01)
    *H04W 24/08*     (2009.01)
    *H04W 56/00*     (2009.01)
    *H04W 74/0833*     (2024.01)

(52) U.S. Cl.
    CPC ............ *H04L 9/3247* (2013.01); *H04W 4/06* (2013.01); *H04W 12/03* (2021.01); *H04W 12/121* (2021.01); *H04W 24/08* (2013.01); *H04W 56/004* (2013.01); *H04W 56/0055* (2013.01); *H04W 74/0833* (2013.01); *H04L 2209/80* (2013.01)

(58) Field of Classification Search
    CPC ........... H04W 56/004; H04W 56/0055; H04W 74/0833; H04W 12/108; H04W 12/122; H04W 56/0045; G04R 20/02; G04R 20/14; H04L 9/30; H04L 9/3247; H04L 2209/80
    See application file for complete search history.

(56) References Cited

U.S. PATENT DOCUMENTS

| | | | |
|---|---|---|---|
| 2019/0113625 A1* | 4/2019 | Farmer | G01S 19/072 |
| 2019/0254064 A1* | 8/2019 | Islam | H04W 74/004 |
| 2021/0103058 A1* | 4/2021 | Dries | H04L 41/06 |
| 2021/0314077 A1* | 10/2021 | Tjahjono | H04L 63/0823 |

OTHER PUBLICATIONS

Qualcomm Incorporated: "DL and UL NR Positioning Procedures", 3GPP TSG-RAN WG2 Meeting #107bis, R2-1913395 (Positioning Procedures + Draft LPP CR), 3GPP, Mobile Competence Centre, 650, Route Des Lucioles, F-06921 Sophia-Antipolis Cedex, France, vol. RAN WG2, No. Chongqing, China, Oct. 14, 2019-Oct. 18, 2019, Oct. 4, 2019, pp. 1-53, XP051804974, Par. 3, p. 2-5, 5, 6, 7, lines 4-5, 11, 2, 8-20, figure 4, p. 16, paragraph 3.2, Section 3, figure 1.

* cited by examiner

200

| yyyy | MM | ww | D | hh | mm | ss | f ... |

| yyyy | MM | ww | D | hh | mm | ss | f ... |

| yyyy | MM | ww | D | hh | mm | ss | f ... |

| yyyy | ••• | mm | ss | 0.f | 0.xf | 0.xxf | 0.xxxf |

FIG. 2D

| Current Time (UTC) | Local Time | Accuracy/ Uncertainty | Source of Time | DigSig |

FIG. 2E

METHOD AND APPARATUS FOR ACQUISITION OF RELIABLE TIME IN A WIRELESS NETWORK

BACKGROUND

Field

The present disclosure relates generally to the field of wireless communications in a network, and more specifically to the broadcast and reliable acquisition of time through the wireless network.

Information

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include code division multiple access (CDMA) systems, time division multiple access (TDMA) systems, frequency division multiple access (FDMA) systems, and orthogonal frequency division multiple access (OFDMA) systems. A wireless multiple-access communications system may include a number of base stations, each simultaneously supporting communication for multiple communication devices, which may each be referred to as user equipments (UEs).

These multiple access technologies have been adopted in various telecommunication standards to provide a common protocol that enables different wireless devices to communicate on a municipal, national, regional, and even global level. An example of an emerging telecommunication standard is new radio (NR), for example, 5G radio access. NR is a set of enhancements to the LTE mobile standard promulgated by Third Generation Partnership Project (3GPP). It is designed to better support mobile broadband Internet access by improving spectral efficiency, lowering costs, improving services, making use of new spectrum, and better integrating with other open standards using OFDMA with a cyclic prefix (CP) on the downlink (DL) and on the uplink (UL) as well as support beamforming, multiple-input multiple-output (MIMO) antenna technology, and carrier aggregation.

As part of providing 4G or 5G wireless access to UEs, a wireless network might provide a current time (e.g. a UTC or GPS time) to UEs, which might be very accurate (e.g. accurate to 1 microsecond (μs)) or less accurate (e.g. accurate to 1 second). For example, this might be of use when other timing sources (e.g. timing from a GNSS constellation) are unavailable (e.g. in the case of GNSS, due to GNSS system faults, unavailability of GNSS signals, or jamming or spoofing). However, such timing support may itself be subject to loss of reliability, e.g. due to spoofing.

SUMMARY

Accurate and reliable time is acquired by a user equipment (UE) from a base station in a wireless network. The base station may obtain the time, e.g., Coordinated Universal Time (UTC) time or a Global Navigation Satellite System (GNSS) time, and ciphers at least a portion of the time before broadcasting the time. The UE determines a propagation delay between the UE and the base station based on a timing advance, known locations of the UE and the base station, or a measured round trip propagation time (RTT) between the UE and the base station. A corrected time can be determined based on the time received from the base station and the propagation delay. A digital signature included with the time broadcast by the base station increases reliability. Spoofing of the broadcast time by an attacking device may be detected by the UE based on the propagation delay being outside an expected range.

In one implementation, a method performed by a User Equipment (UE) for supporting acquisition of time in a wireless network, includes receiving a message broadcast from a base station, the message comprising a current time, wherein at least a portion of the current time is ciphered; obtaining an unciphered current time by deciphering the at least the portion of the current time; determining a propagation delay between the base station and the UE; and determining a corrected current time based on the unciphered current time and the propagation delay.

In one implementation, a User Equipment (UE) configured for supporting acquisition of time in a wireless network, includes a wireless transceiver configured to wirelessly communicate with base stations in the wireless network; at least one memory; at least one processor coupled to the wireless transceiver and the at least one memory, wherein the at least one processor is configured to: receive, via the wireless transceiver, a message broadcast from a base station, the message comprising a current time, wherein at least a portion of the current time is ciphered; obtain an unciphered current time by deciphering the at least the portion of the current time; determine a propagation delay between the base station and the UE; and determine a corrected current time based on the unciphered current time and the propagation delay.

In one implementation, a User Equipment (UE) configured for supporting acquisition of time in a wireless network, includes means for receiving a message broadcast from a base station, the message comprising a current time, wherein at least a portion of the current time is ciphered; means for obtaining an unciphered current time by deciphering the at least the portion of the current time; means for determining a propagation delay between the base station and the UE; and means for determining a corrected current time based on the unciphered current time and the propagation delay.

In one implementation, a non-transitory computer readable storage medium including program code stored thereon, the program code is operable to configure at least one processor in a User Equipment (UE) for supporting acquisition of time in a wireless network, the program code comprising instructions to: receive a message broadcast from a base station, the message comprising a current time, wherein at least a portion of the current time is ciphered; obtain an unciphered current time by deciphering the at least the portion of the current time; determine a propagation delay between the base station and the UE; and determine a corrected current time based on the unciphered current time and the propagation delay.

In one implementation, a method performed by a base station for supporting acquisition of time by a User Equipment (UE) in a wireless network, includes obtaining a current time; ciphering at least a portion of the current time; and broadcasting a message comprising the current time, wherein the UE receives the message, obtains an unciphered current time by deciphering the at least the portion of the current time, and determines a propagation delay between the base station and the UE, wherein the UE determines a corrected current time based on the unciphered current time and the propagation delay.

In one implementation, a base station configured for supporting acquisition of time by a User Equipment (UE) in a wireless network, includes an external interface configured to wirelessly communicate with entities in the wireless network; at least one memory; at least one processor coupled to the external interface and the at least one memory, wherein the at least one processor is configured to: obtain a current time; cipher at least a portion of the current time; and broadcast a message comprising the current time, wherein the UE receives the message, obtains an unciphered current time by deciphering the at least the portion of the current time, and determines a propagation delay between the base station and the UE, wherein the UE determines a corrected current time based on the unciphered current time and the propagation delay.

In one implementation, a base station configured for supporting acquisition of time by a User Equipment (UE) in a wireless network, includes means for obtaining a current time; means for ciphering at least a portion of the current time; and means for broadcasting a message comprising the current time, wherein the UE receives the message, obtains an unciphered current time by deciphering the at least the portion of the current time, and determines a propagation delay between the base station and the UE, wherein the UE determines a corrected current time based on the unciphered current time and the propagation delay.

In one implementation, a non-transitory computer readable storage medium including program code stored thereon, the program code is operable to configure at least one processor in a base station for supporting acquisition of time by a User Equipment (UE) in a wireless network, the program code comprising instructions to: obtain a current time; cipher at least a portion of the current time; and broadcast a message comprising the current time, wherein the UE receives the message, obtains an unciphered current time by deciphering the at least the portion of the current time, and determines a propagation delay between the base station and the UE, wherein the UE determines a corrected current time based on the unciphered current time and the propagation delay.

BRIEF DESCRIPTION OF THE DRAWINGS

The accompanying drawings are presented to aid in the description of various aspects of the disclosure and are provided solely for illustration of the aspects and not limitation thereof.

FIG. 2A illustrates a format of a current time that may be broadcast in a message from a base station.

FIGS. 2B, 2C, and 2D illustrate ciphering of a current time that may be broadcast from a base station.

FIG. 2E illustrates additional information for a current time that may be broadcast from a base station.

Figure 1:
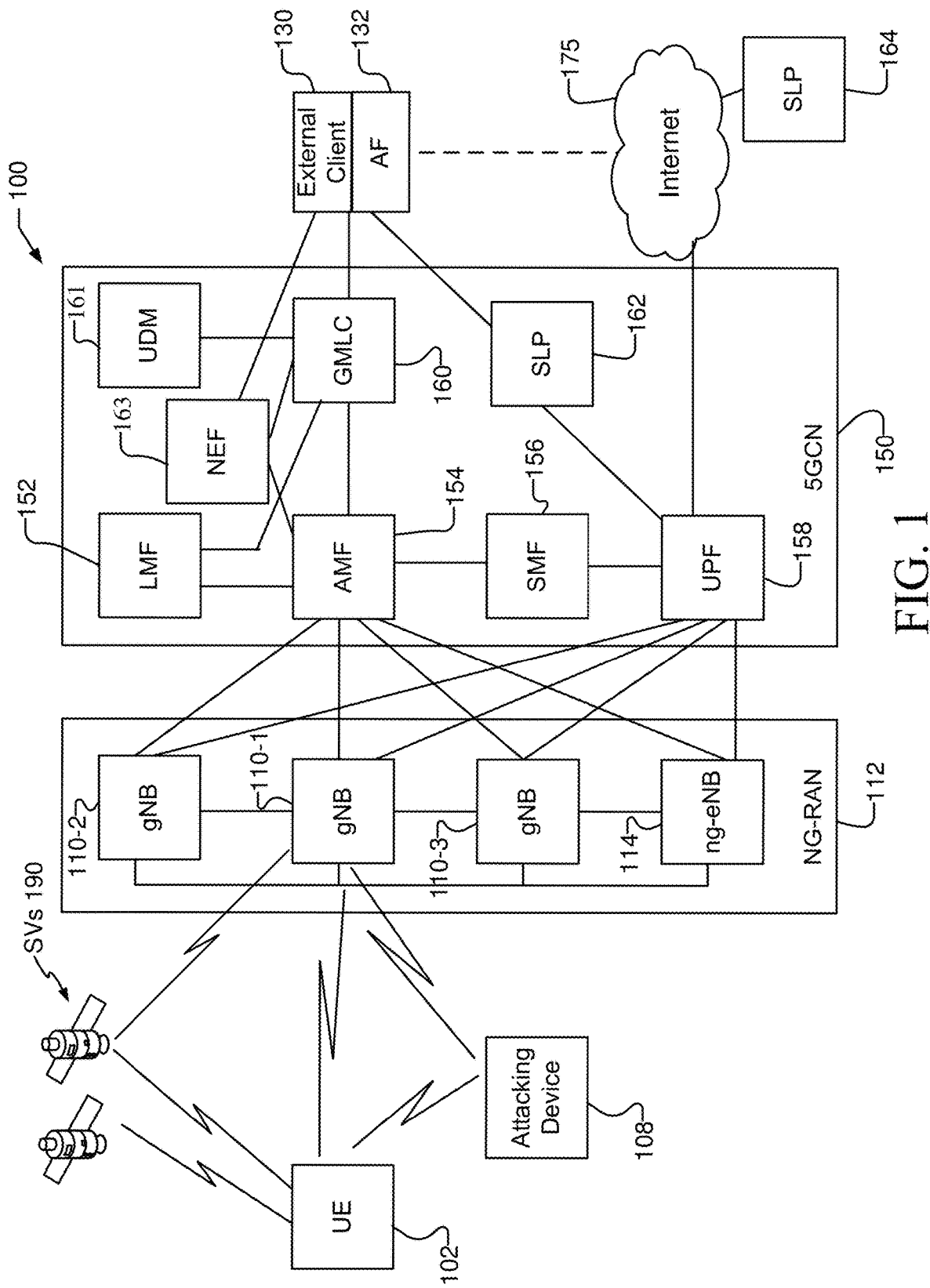
FIG. 1 shows a high-level system architecture of a wireless communications system in accordance with an aspect of the disclosure.

Elements, stages, steps, and/or actions with the same reference label in different drawings may correspond to one another (e.g., may be similar or identical to one another). Further, some elements in the various drawings are labelled using a numeric prefix followed by an alphabetic or numeric suffix. Elements with the same numeric prefix but different suffixes may be different instances of the same type of element. The numeric prefix without any suffix is used herein to reference any element with this numeric prefix. For example, different instances 110-1, 110-2, 110-3 of a base station are shown in FIG. 1. A reference to a base station 110 then refers to any of base stations 110-1, 110-2, 110-3.

DETAILED DESCRIPTION

Aspects of the disclosure are provided in the following description and related drawings directed to various examples provided for illustration purposes. Alternate aspects may be devised without departing from the scope of the disclosure. Additionally, well-known elements of the disclosure will not be described in detail or will be omitted so as not to obscure the relevant details of the disclosure.

The words "exemplary" and/or "example" are used herein to mean "serving as an example, instance, or illustration." Any aspect described herein as "exemplary" and/or "example" is not necessarily to be construed as preferred or advantageous over other aspects. Likewise, the term "aspects of the disclosure" does not require that all aspects of the disclosure include the discussed feature, advantage or mode of operation.

Those of skill in the art will appreciate that the information and signals described below may be represented using any of a variety of different technologies and techniques. For example, data, instructions, commands, information, signals, bits, symbols, and chips that may be referenced throughout the description below may be represented by voltages, currents, electromagnetic waves, magnetic fields or particles, optical fields or particles, or any combination thereof, depending in part on the particular application, in part on the desired design, in part on the corresponding technology, etc.

Further, many aspects are described in terms of sequences of actions to be performed by, for example, elements of a computing device. It will be recognized that various actions described herein can be performed by specific circuits (e.g., application specific integrated circuits (ASICs)), by program instructions being executed by one or more processors, or by a combination of both. Additionally, the sequence(s) of actions described herein can be considered to be embodied entirely within any form of non-transitory computer-readable storage medium having stored therein a corresponding set of computer instructions that, upon execution, would cause or instruct an associated processor of a device to perform the functionality described herein. Thus, the various aspects of the disclosure may be embodied in a number of different forms, all of which have been contemplated to be within the scope of the claimed subject matter. In addition, for each of the aspects described herein, the corresponding form of any such aspects may be described herein as, for example, "logic configured to" perform the described action.

As used herein, the terms "user equipment" (UE) and "base station" are not intended to be specific or otherwise limited to any particular Radio Access Technology (RAT), unless otherwise noted. In general, a UE may be any wireless communication device (e.g., a mobile phone, router, tablet computer, laptop computer, consumer tracking device for tracking consumer items, packages, assets, or entities such as individuals and pets, wearable (e.g., smartwatch, glasses, augmented reality (AR)/virtual reality (VR) headset, etc.), vehicle (e.g., automobile, motorcycle, bicycle, etc.), Internet of Things (IoT) device, etc.) used by a user to communicate over a wireless communications network. A UE may be mobile or may (e.g., at certain times) be stationary, and may communicate with a Radio Access Network (RAN). As used herein, the term "UE" may be referred to interchangeably as an "access terminal" or "AT," a "client device," a "wireless device," a "subscriber device," a "subscriber terminal," a "subscriber station," a "user terminal" or UT, a "mobile terminal," a "mobile station," "mobile device," or variations thereof. Generally, UEs can communicate with a core network via a RAN, and through the core network the UEs can be connected with external networks such as the Internet and with other UEs. Of course, other mechanisms of connecting to the core network and/or the Internet are also possible for the UEs, such as over wired access networks, wireless local area network (WLAN) networks (e.g., based on IEEE 802.11, etc.) and so on.

A base station may operate according to one of several RATs in communication with UEs depending on the network in which it is deployed, and may be alternatively referred to as an access point (AP), a network node, a NodeB, an evolved NodeB (eNB), a New Radio (NR) Node B (also referred to as a gNB), etc. In addition, in some systems a base station may provide purely edge node signaling functions while in other systems it may provide additional control and/or network management functions. A communication link through which UEs can send signals to a base station is called an uplink (UL) channel (e.g., a reverse traffic channel, a reverse control channel, an access channel, etc.). A communication link through which the base station can send signals to UEs is called a downlink (DL) or forward link channel (e.g., a paging channel, a control channel, a broadcast channel, a forward traffic channel, etc.). As used herein the term traffic channel (TCH) can refer to either an UL/reverse or DL/forward traffic channel.

The term "base station" may refer to a single physical transmission point or to multiple physical transmission points that may or may not be co-located. For example, where the term "base station" refers to a single physical transmission point, the physical transmission point may be an antenna of the base station corresponding to a cell of the base station. Where the term "base station" refers to multiple co-located physical transmission points, the physical transmission points may be an array of antennas (e.g., as in a multiple-input multiple-output (MIMO) system or where the base station employs beamforming) of the base station. Where the term "base station" refers to multiple non-co-located physical transmission points, the physical transmission points may be a distributed antenna system (DAS) (a network of spatially separated antennas connected to a common source via a transport medium) or a remote radio head (RRH) (a remote base station connected to a serving base station). Alternatively, the non-co-located physical transmission points may be the serving base station receiving the measurement report from the UE and a neighbor base station whose reference RF signals the UE is measuring.

The acquisition of accurate and reliable time, such as Coordinated Universal Time (UTC) can be essential to many critical infrastructures and sectors of the modern economy, such as electrical power generation and distribution, telecommunications, modes of transportation, timestamping stock exchange transactions etc., as well as many other critical and non-critical use cases. Highly accurate time, for example, is often obtained from Global Navigation Satellite System (GNSS) signals. GNSS, however, may be unavailable in some locations, e.g., indoors, or may fail, e.g., due to spoofing or jamming.

The support of reliable timing provision by a wireless network as a fallback to failure (e.g. spoofing or jamming) of Global Navigation Satellite System (GNSS) is becoming an important area in 3GPP and other Standards Development Organizations (SDOs). In addition to overcoming GNSS timing failure, the use of timing acquisition through a wireless network also may be used indoors, where GNSS is sometimes unavailable. A critical component for timing provision via a wireless network is high accuracy and high reliability, e.g., avoiding spoofing of timing and enabling a recipient to know whether received timing is correct and precise.

As discussed herein, accurate and reliable time may be acquired through a wireless network in which a base station broadcasts a message that includes a current time, at least a portion of which is ciphered. The current time, for example, may be a Coordinated Universal Time (UTC) time, a Global Positioning System (GPS) time, a GLONASS time, a Beidou time, a Galileo time, a Global Navigation Satellite System (GNSS) time, or a local regional time (e.g. an Eastern Standard Time (EST) or a Pacific Daylight Time (PDT) in the United States). A receiving entity, e.g., a UE, may decipher the current time. Due to the propagation time of the broadcast message, the unciphered current time obtained by the UE, however, may not be accurate. Accordingly, the UE may determine a propagation delay between the base station and itself, e.g., based on a timing advance obtained from the base station, known locations of the UE and the base station, or a measured round trip propagation time (RTT) between the UE and the base station. A corrected current time may then be determined based on the unciphered current time and the propagation delay. The reliability of the current time may be authenticated, e.g., using a digital signature of the base station that is included in the broadcast message. Further, the UE may further verify the reliability of the current time by determining that the message with the current time is received directly from the base station and not via an attacking device, e.g., in a replay attack. For example, the UE and base station may perform an RTT measurement procedure to determine the propagation delay, and the UE may verify the absence of an attacking device using a replay attack by comparing the measured RTT to an expected range of RTT, e.g., based on an expected distance to the base station.

It is noted that a wireless network may use a variety of known techniques to obtain an accurate current time that may include a reference device or reference network able to determine accurate time from one or more GNSS constellations, one or more internal clock sources for the wireless network (e.g. an atomic clock) or an external server clock source that may provide time, e.g. using the Network Time Protocol (NTP).

FIG. 1 shows an architecture based on a non-roaming 5G NR network to support acquisition of reliable time by a UE through a wireless network as discussed herein. FIG. 1 illustrates a communication system 100 that comprises a UE 102 and components of a Fifth Generation (5G) network comprising a Next Generation Radio Access Network (NG-RAN) 112, which includes base stations (BSs) sometimes referred to as New Radio (NR) NodeBs or gNBs 110-1, 110-2, 110-3, a next generation evolved NodeB (ng-eNB) 114, and a 5G Core Network (5GCN) 150 that is in communication with an external client 130. The architecture of a gNB 110 may be split into functional parts, e.g., including one or more of a gNB Central Unit (gNB-CU), one or more gNB Distributed Units (gNB-DUs), and one or more gNB Remote Units (gNB-RUs), any of which may be physically co-located or may be physically separate from other parts of the gNB 110. A 5G network may also be referred to as a New Radio (NR) network; NG-RAN 112 may be referred to as an NR RAN or a 5G RAN; and 5GCN 150 may be referred to as a Next Generation (NG) Core network (NGC). The communication system 100 may further utilize information from space vehicles (SVs) 190 for a Global Navigation Satellite System (GNSS) like GPS, GLONASS, Galileo or Beidou or some other local or regional Satellite Positioning System (SPS) such as IRNSS, EGNOS or WAAS. Additional components of the communication system 100 are described below. The communication system 100 may include additional or alternative components.

FIG. 1 shows a serving gNB 110-1 for the UE 102 and neighbor gNBs 110-2, 110-3, and ng-eNB 114. A neighbor gNB may be any gNB which is able to receive and measure uplink (UL) signals transmitted by the UE 102 and/or is able to transmit a downlink (DL) reference signal (RS), e.g., positioning reference signals (PRS), that can be received and measured by the UE 102 to support location of the UE 102.

It should be noted that FIG. 1 provides only a generalized illustration of various components, any or all of which may be utilized as appropriate, and each of which may be duplicated or omitted, as necessary. Specifically, although only one UE 102 is illustrated, it will be understood that many UEs (e.g., hundreds, thousands, millions, etc.) may utilize the communication system 100. Similarly, the communication system 100 may include a larger or smaller number of SVs 190, gNBs 110-1, 110-2, external clients 130, and/or other components. The illustrated connections that connect the various components in the communication system 100 include data and signaling connections which may include additional (intermediary) components, direct or indirect physical and/or wireless connections, and/or additional networks. Furthermore, components may be rearranged, combined, separated, substituted, and/or omitted, depending on desired functionality.

While FIG. 1 illustrates a 5G-based network, similar network implementations and configurations may be used for other communication technologies, such as 3G, Long Term Evolution (LTE), also referred to as 4G, and IEEE 802.11 WiFi etc. For example, where a Wireless Local Area Network (WLAN), e.g., IEEE 802.11 radio interface, is used, the UE 102 may communicate with an Access Network (AN), as opposed to an NG-RAN, and accordingly, component 112 is sometimes referred to herein as an AN or as a RAN, denoted by the term "RAN", "(R)AN" or "(R)AN 112". In the case of an AN (e.g. IEEE 802.11 AN), the AN may be connected to a Non-3GPP Interworking Function (N3IWF) (e.g. in 5GCN 150) (not shown in FIG. 1), with the N3IWF connected to AMF 154.

The UE 102 may be any electronic device and may be referred to as a device, a mobile device, a wireless device, a mobile terminal, a terminal, a mobile station (MS), a Secure User Plane Location (SUPL) Enabled Terminal (SET), or by some other name. The UE 102 may be a stand-alone device or may be embedded in another device, e.g., a factory tool, that is to be monitored or tracked. Moreover, UE 102 may correspond to a smart watch, digital glasses, fitness monitor, smart car, smart appliance, cellphone, smartphone, laptop, tablet, PDA, consumer tracking device for tracking consumer items, packages, assets, or entities such as individuals and pets, control device or some other portable or moveable device. The UE 102 may include a single entity or may include multiple entities such as in a personal area network where a user may employ audio, video and/or data I/O devices and/or body sensors and a separate wireline or wireless modem. Typically, though not necessarily, the UE 102 may support wireless communication using one or more Radio Access Technologies (RATs) such as GSM, Code Division Multiple Access (CDMA), Wideband CDMA (WCDMA), LTE, High Rate Packet Data (HRPD), IEEE 802.11 WiFi (also referred to as Wi-Fi), Bluetooth® (BT), Worldwide Interoperability for Microwave Access (WiMAX), 5G new radio (NR) (e.g., using the NG-RAN 112 and 5GCN 150), etc. The UE 102 may also support wireless communication using a Wireless Local Area Network (WLAN) which may connect to other networks (e.g. the Internet) using a Digital Subscriber Line (DSL) or packet cable for example. The use of one or more of these RATs may allow the UE 102 to communicate with an external client 130 (e.g. via elements of 5GCN 150 not shown in FIG. 1, or possibly via a Gateway Mobile Location Center (GMLC) 160, and/or allow the external client 130 to receive location information regarding the UE 102 (e.g., via the GMLC 160).

The UE 102 may enter a connected state with a wireless communication network that may include the NG-RAN 112. In one example, the UE 102 may communicate with a cellular communication network by transmitting wireless signals to, or receiving wireless signals from a cellular transceiver, in the NG-RAN 112, such as a gNB 110-1. A transceiver provides user and control planes protocol terminations toward the UE 102 and may be referred to as a base station, a base transceiver station, a radio base station, a radio transceiver, a radio network controller, a transceiver function, a base station subsystem (BSS), an extended service set (ESS), or by some other suitable terminology.

In particular implementations, the UE 102 may have circuitry and processing resources capable of obtaining location related measurements. Location related measurements obtained by UE 102 may include measurements of signals received from satellite vehicles (SVs) 190 belonging to a Satellite Positioning System (SPS) or Global Navigation Satellite System (GNSS) such as GPS, GLONASS, Galileo or Beidou and/or may include measurements of signals received from terrestrial transmitters fixed at known locations (e.g., such as gNBs). UE 102 or gNB 110-1 to which UE 102 may send the measurements, may then obtain a location estimate for the UE 102 based on these location related measurements using any one of several position methods such as, for example, GNSS, Assisted GNSS (A-GNSS), Advanced Forward Link Trilateration (AFLT), Angle of Departure (AOD), Time Difference Of Arrival (TDOA), Round-Trip Time (RTT), WLAN (also referred to as WiFi) positioning, or Enhanced Cell ID (ECID) or combinations thereof. In some of these techniques (e.g. A-GNSS, AFLT, AOD, RTT, and TDOA), pseudoranges or timing differences may be measured at UE 102 relative to three or more terrestrial transmitters (e.g. gNBs) fixed at known locations or relative to four or more SVs 190 with accurately known orbital data, or combinations thereof, based at least in part, on pilots, positioning reference signals (PRS) or other positioning related signals transmitted by the transmitters or satellites and received at the UE 102.

The location server in FIG. 1 may correspond to, e.g., Location Management Function (LMF) 152 or Secure User Plane Location (SUPL) Location Platform (SLP) 162, may be capable of providing positioning assistance data to UE 102 including, for example, information regarding signals to be measured (e.g., expected signal timing, signal coding, signal frequencies, signal Doppler), locations and identities of terrestrial transmitters (e.g. gNBs) and/or signal, timing and orbital information for GNSS SVs to facilitate positioning techniques such as A-GNSS, AFLT, AOD, TDOA, RTT, and ECID. The facilitation may include improving signal acquisition and measurement accuracy by UE 102 and, in some cases, enabling UE 102 to compute its estimated location based on the location measurements. For example, a location server (e.g. LMF 152 or SLP 162) may comprise an almanac, also referred to as a base station almanac (BSA), which indicates locations and identities of cellular transceivers and/or local transceivers in a particular region or regions such as a particular venue, and may provide information descriptive of signals transmitted by a cellular base station or AP (e.g. a gNB) such as transmission power and signal timing. A UE 102 may obtain measurements of signal strengths (e.g. received signal strength indication (RSSI)) for signals received from cellular transceivers and/or local transceivers and/or may obtain a signal to noise ratio (S/N), a reference signal received power (RSRP), a reference signal received quality (RSRQ), a time of arrival (TOA), an angle of arrival (AOA), an angle of departure (AOD), a receive time-transmission time difference (Rx-Tx), or a round trip signal propagation time (RTT) between UE 102 and a cellular transceiver (e.g. a gNB) or a local transceiver (e.g. a WiFi access point (AP)). A UE 102 may use these measurements together with assistance data (e.g. terrestrial almanac data or GNSS satellite data such as GNSS Almanac and/or GNSS Ephemeris information) received from a location server (e.g. LMF 152 or SLP 162) or broadcast by a base station (e.g. a gNB 110-1, 110-2) in NG-RAN 112 to determine a location for UE 102.

In some implementations, network entities are used to assist in location of a UE 102. For example, entities in a network such as gNBs 110-1, 110-2 may measure UL signals transmitted by UE 102. The UL signals may include or comprise UL reference signals such as UL positioning reference signals (PRSs) or UL Sounding Reference Signals (SRSs). The entities obtaining the location measurements (e.g. gNBs 110-1, 110-2) may then transfer the location measurements to the UE 102 or LMF 152, which may use the measurements to determine real time differences (RTDs) for multiple transceiver pairs. Examples of location measurements that may use UL signals can include an RSSI, RSRP, RSRQ, TOA, Rx-Tx, AOA and RTT.

An estimate of a location of the UE 102 may be referred to as a location, location estimate, location fix, fix, position, position estimate or position fix, and may be geographic, thus providing location coordinates for the UE 102 (e.g., latitude and longitude) which may or may not include an altitude component (e.g., height above sea level, height above or depth below ground level, floor level or basement level). Alternatively, a location of the UE 102 may be expressed as a civic location (e.g., as a postal address or the designation of some point or small area in a building such as a particular room or floor).

As shown in FIG. 1, pairs of gNBs in NG-RAN 112 may be connected to one another, e.g., directly as shown in FIG. 1 or indirectly via other gNBs 110-1, 110-2. Access to the 5G network is provided to UE 102 via wireless communication between the UE 102 and one or more of the gNBs 110-1, 110-2, which may provide wireless communication access to the 5GCN 150 on behalf of the UE 102 using 5G (e.g. NR). In FIG. 1, the serving gNB for UE 102 is assumed to be gNB 110-1, although other gNBs (e.g. gNB 110-2, 110-3, or ng-eNB 114) may act as a serving gNB if UE 102 moves to another location or may act as a secondary gNB to provide additional throughout and bandwidth to UE 102.

As noted, while FIG. 1 depicts nodes configured to communicate according to 5G communication protocols, nodes configured to communicate according to other communication protocols, such as, for example, LTE protocols, may be used. Such nodes, configured to communicate using different protocols, may be controlled, at least in part, by the 5GCN 150. Thus, the NG-RAN 112 may include any combination of gNBs, evolved Node Bs (eNBs) supporting LTE, or other types of base stations or access points. As an example, NG-RAN 112 may include one or more ng-eNBs 114, which provide LTE wireless access to UE 102 and may connect to entities in 5GCN 150 such as AMF 154.

The gNBs 110-1, 110-2, 110-3, and ng-eNB 114 can communicate with the Access and Mobility Management Function (AMF) 154, which, for positioning functionality, may communicate with a Location Management Function (LMF) 152. The AMF 154 may support mobility of the UE 102, including cell change and handover and may participate in supporting a signaling connection to the UE 102 and possibly helping establish and release Protocol Data Unit (PDU) sessions for UE 102 supported by the UPF 158. Other functions of AMF 154 may include: termination of a control plane (CP) interface from NG-RAN 112; termination of Non-Access Stratum (NAS) signaling connections from UEs such as UE 102, NAS ciphering and integrity protection; registration management; connection management; reachability management; mobility management; access authentication and authorization.

The gNB 110-1 may support positioning of the UE 102 when UE 102 accesses the NG-RAN 112. The gNB 110-1 may also process location service requests for the UE 102, e.g., received directly or indirectly from the GMLC 160. In some embodiments, a node/system that implements the gNB 110-1 may additionally or alternatively implement other types of location-support modules, such as an Enhanced Serving Mobile Location Center (E-SMLC) or a Secure User Plane Location (SUPL) Location Platform (SLP) 162. It will be noted that in some embodiments, at least part of the positioning functionality (including derivation of UE 102's location) may be performed at the UE 102 (e.g., using signal measurements for signals transmitted by wireless nodes, and assistance data provided to the UE 102).

The GMLC 160 may support a location request for the UE 102 received from an external client 130 and may forward such a location request to a serving AMF 154 for UE 102. The AMF 154 may then forward the location request to either gNB 110-1 or LMF 152 which may obtain one or more location estimates for UE 102 (e.g. according to the request from external client 130) and may return the location estimate(s) to AMF 154, which may return the location estimate(s) to external client 130 via GMLC 160. GMLC 160 may contain subscription information for an external client 130 and may authenticate and authorize a location request for UE 102 from external client 130. GMLC 160 may further initiate a location session for UE 102 by sending a location request for UE 102 to AMF 154 and may include in the location request an identity for UE 102 and the type of location being requested (e.g. such as a current location or a sequence of periodic or triggered locations).

As illustrated, a Unified Data Management (UDM) 161 may be connected to the GMLC 160. The UDM 161 is analogous to a Home Subscriber Server (HSS) for LTE access, and if desired, the UDM 161 may be combined with an HSS. The UDM 161 is a central database that contains user-related and subscription-related information for UE 102 and may perform the following functions: UE authentication, UE identification, access authorization, registration and mobility management, subscription management and Short Message Service management.

As further illustrated in FIG. 1, an external client 130 may be connected to the core network 150 via the GMLC 160 and/or the SLP 162. The external client 130 may optionally be connected to the core network 150 and/or to an SLP 164, that is external to 5GCN 150, via the Internet 175. The external client 130 may be a server, a web server, or a user device, such as a personal computer, a UE, etc.

A Network Exposure Function (NEF) 163 may be connected to the GMLC 160 and the AMF 154. In some implementations, the NEF 163 may be connected to communicate directly with the external client 130 or with an Application Function (AF) 132. The NEF 163 may support secure exposure of capabilities and events concerning 5GCN 150 and UE 102 to an external client 130 or AF 132 and may enable secure provision of information from external client 130 or AF 132 to 5GCN 150. The NEF 163, for example, may also function to obtain a current or last known location for a UE 102, may obtain an indication of a change in location for a UE 102, or an indication of when a UE 102 becomes available (or reachable). An external client 130 or an AF 132 may access NEF 163 in order to obtain location information for UE 102.

The LMF 152 and the gNB 110-1 may communicate using a New Radio Position Protocol A (NRPPa). NRPPa may be defined in 3GPP TS 38.455, with NRPPa messages being transferred between the gNB 110-1 and the LMF 152. Further, the LMF 152 and UE 102 may communicate using the LTE Positioning Protocol (LPP) defined in 3GPP TS 37.355, where LPP messages are transferred between the UE 102 and the LMF 152 via the serving AMF 154 and the serving gNB 110-1 for UE 102. The LPP protocol may be used to support positioning of UE 102 using UE assisted and/or UE based position methods such as Assisted GNSS (A-GNSS), Real Time Kinematic (RTK), Wireless Local Area Network (WLAN), Angle of Departure (AOD), Time Difference of Arrival (TDOA), Round-Trip Time (RTT), and/or Enhanced Cell Identity (ECID). The NRPPa protocol may be used to support positioning of UE 102 using network based position methods such as ECID (when used with measurements obtained by or received from a gNB 110-1, 110-2, 110-3, or ng-eNB 114) and/or may be used by LMF 152 to obtain location related information from gNBs 110 such as parameters defining positioning reference signal (PRS) transmission from gNBs for support of TDOA.

GNBs 110-1, 110-2, 110-3, or ng-eNB 114 may communicate with AMF 154 using a Next Generation Application Protocol (NGAP), e.g. as defined in 3GPP Technical Specification (TS) 38.413). NGAP may enable AMF 154 to request a location of a UE 102 from a gNB 110-1 for UE 102 and may enable gNB 110-1 to return a location for UE 102 to the AMF 154.

GNBs 110-1, 110-2, 110-3, or ng-eNB 114 may communicate with one another using an Xn Application Protocol (XnAP), e.g. as defined in 3GPP TS 38.423. XnAP may allow one gNB 110 to request another gNB 110 to obtain UL location measurements for a UE 102 and to return the UL location measurements. XnAP may also enable a gNB 110 to request another gNB 110 to transmit a downlink (DL) RS or PRS to enable a UE 102 to obtain DL location measurements of the transmitted DL RS or PRS.

A gNB (e.g. gNB 110-1) may communicate with a UE 102 using a Radio Resource Control (RRC) protocol, e.g. as defined in 3GPP TS 38.331. RRC may allow a gNB (e.g. gNB 110-1) to request location measurements from the UE 102 of DL RSs or DL PRSs transmitted by the gNB 110-1 and/or by other gNBs 110-2, 110-3, or ng-eNB 114 and to return some or all of the location measurements. RRC may also enable a gNB (e.g. gNB 110-1) to request the UE 102 to transmit an UL RS or PRS to enable the gNB 110-1 or other gNBs 110-2, 110-3, or ng-eNB 114 to obtain UL location measurements of the transmitted UL RS or PRS.

As illustrated, a Session Management Function (SMF) 156 connects the AMF 154 and the UPF 158. SMF 156 may manage the establishment, modification and release of PDU sessions for UE 102, perform IP address allocation and management for UE 102, act as a Dynamic Host Configuration Protocol (DHCP) server for UE 102, and select and control a UPF 158 on behalf of UE 102.

The User Plane Function (UPF) 158 may support voice and data bearers for UE 102 and may enable UE 102 voice and data access to other networks such as the Internet 175. UPF 158 functions may include: external PDU session point of interconnect to a Data Network, packet (e.g. Internet Protocol (IP)) routing and forwarding, packet inspection and user plane part of policy rule enforcement, Quality of Service (QoS) handling for user plane, downlink packet buffering and downlink data notification triggering. UPF 158 may be connected to SLP 162 to enable location support of location of UE 102 using the SUPL location solution defined by the Open Mobile Alliance (OMA). SLP 162 may be further connected to or accessible from external client 130.

In order to support acquisition of reliable time by UE 102, one or more of gNBs 110 and/or ng-eNB 114 may include a GNSS receiver that is able to receive, decode and process signals from space vehicles (SVs) belonging to one or more GNSS constellations. For example, the signals may be navigation signals and may indicate an accurate time (e.g. GPS time or UTC time). In some other cases, a gNB 110 may be connected to a GNSS reference network that is able to provide an accurate GNSS time to the gNB 110. Further, gNBs 110 (and/or ng-eNB 114) may be able to exchange timing information in order to: (i) provide accurate time to a gNB 110 or ng-eNB 114 that does not have a GNSS receiver and is not connected to a GNSS reference network or has a GNSS receiver but is currently unable to receive signals from GNSS SVs; (ii) compare time information in order to detect if time determination by one or more gNBs 110 (or ng-eNB 114) may be in error (e.g. due to external jamming or spoofing); and/or (iii) increase timing accuracy by combining (e.g. averaging) time determination from multiple gNBs 110. Additionally or alternatively, one or more gNBs 110 and/or ng-eNB 114 may receive accurate timing information (e.g. using NTP) from AMF 154 or UPF 158. AMF 154 and/or UPF 158 may in turn receive accurate timing from some other entity like UDM 161 or NEF 163, that may in turn contain or be connected to a source of accurate time (e.g. an atomic clock) or may receive time from some external time source (e.g. a GNSS reference network or a secure server owned and operated by a government agency) Timing information which is obtained by a gNB 110 or ng-eNB 114 (e.g. which is received from UDM 161 or NEF 163 via AMF 154 or UPF 158) may include an identification of a source of the time (e.g. may identify a government run atomic clock source or a GNSS reference network) and may indicate a level of accuracy (e.g. may indicate that the time is accurate to 1 µs, 1 millisecond (ms) or 1 second). Determination or provision of an accurate current time by or to a gNB 110 or ng-eNB 114 may enable the gNB 110 or ng-eNB 114 to provide accurate time to a UE 102 as described herein.

It should be understood that while FIG. 1 shows a network architecture for a non-roaming UE, with suitable, well-known, changes, a corresponding network architecture may be provided for a roaming UE.

As discussed above, acquisition of accurate and reliable time can be essential to many critical infrastructures and sectors of the modern economy, as well as many other critical and non-critical use cases. Highly accurate time, for example, may be received by UEs, such as UE 102, from GNSS signals from SVs 190. In some situations, however, signals from SVs 190 may be unavailable, such as indoor or in urban canyon locations. Additionally, signals from SVs 190 may be unavailable due to attacks, such as spoofing or jamming.

A current time may be acquired by the UE 102 through the wireless system 100. For example, the gNBs 110 may broadcast a message, which may be received by the UE 102, and that may include the current time. The gNBs 110, for example, may obtain the current time from signals from SVs 190 or from entities, such as AMF 154 or UPF 158 in the core network 150, as described previously. By way of example, the current time may be a UTC time, a GPS time, a GLONASS time, a Beidou time, a Galileo time, a GNSS time or a local time (e.g. EST or PDT). The gNBs 110 may periodically provide the current time to the UE 102 in one or more messages, e.g., in a system information block (SIB).

FIG. 2A, by way of example, illustrates the format of a current time 200 that may be broadcast in a message from a gNB 110. The current time 200 may be a UTC time, a GPS time, a GLONASS time, a Beidou time, a Galileo time, a GNSS time, or a local time (e.g. EST or PDT) etc. The current time 200 may be expressed according to ISO 8601 or any other desired format. As illustrated in FIG. 2A, in the case of a UTC time, the current time 200 may include a year (yyyy), month (MM), week (ww), day (D), hour (hh), minute (mm), second (ss), and fraction of second (f . . . ). The fraction of the second (f . . . ) may be a decimal fraction and may include as many decimal places as desired. UTC time can accommodate addition or subtraction of a leap second by including a "60" value or omitting a "59" value, respectively, for the second (ss) field, as is well known. Of course, other formats may be used if desired, for example, the week may not be included and days may be expressed using two digits (DD), etc. In the case of a GPS time, Galileo time or Beidou time, the time may be expressed as a number of seconds that have elapsed since some starting time (e.g. 00:00 UTC (midnight) of January 5th to 6th 1980 in the case of GPS). Moreover, in some instances the current time 200 may be provided sometimes as a time interval since a previously provided time.

The timing information broadcast by a gNB 110 may be completely ciphered or a portion of the timing information may be ciphered. A UE 102 with a subscription to receiving ciphered time may receive a ciphering key from a gNB 110 or from an entity in the 5GCN 150 (e.g. AMF 154), e.g. which may be provided (e.g. by AMF 154) when the UE 102 performs a Registration with the 5GCN 150. The UE 102 may use the ciphering key to decipher the ciphered timing information or the portion of the timing information that is ciphered. The ciphering may use any ciphering algorithm, such as one of the Advanced Encryption Standard (AES) algorithms defined by the United States National Institute of Standards and Technology (NIST). For example, in one embodiment, the AES Counter mode algorithm may be used. In this case a different counter might be used in each broadcast message (or SIB) that conveys a current time. Since the number of ciphered bits in a broadcast message may be less than the number of bits in the cipher key (e.g. in the case of the variants described below for FIGS. 2C and 2D), it may be easier, more convenient or more secure in some cases to cipher consecutive broadcast messages (or portions of consecutive broadcast message) using a common ciphertext stream (e.g. in the case of AES counter mode) and to indicate the portion of the ciphertext stream that is used for each broadcast message.

Ciphering by the gNBs 110, for example, would enable a subscription based service for highly accurate timing information and may assist in ensuring the reliability of the timing information. In some implementations, only lower order bits or fields may be ciphered, which would allow a UE 102 without a ciphering key to obtain an approximate time (e.g., accurate to 1 second if only fractional seconds are ciphered), while a UE 102 with a ciphering key can obtain a more accurate time (e.g. accurate to 1 µs).

FIGS. 2B, 2C, and 2D, by way of example, illustrate formats of a current UTC time 200 broadcast in a message from a gNB 110, with shading represented ciphered portions of the current time 200. As illustrated in FIG. 2B, all of the current time 200 may be ciphered. On the other hand, as illustrated with shading in FIG. 2C, only the fraction of seconds may be ciphered, which permits any UE 102 to obtain the current time with an accuracy of 1 second, while UEs 102 with a ciphering key may obtain a more accurate time. FIG. 2D illustrates an extended format of the current time 200 showing individual units of the fraction of the second, e.g., tenths, hundredths, thousandths, ten thousandths, etc., and illustrates with shading that some fractions (e.g., tenths and hundredths) may be unciphered, and lower orders (e.g., thousandths and below) may be ciphered.

FIG. 2E illustrates additional information that may be included by a gNB 110 along with a current time in a message (e.g. a SIB) broadcast to a UE 102. The information can include the current time (e.g. UTC and as in any of FIGS. 2A-2D), a local transmission time at the gNB 110 (which may be used to more precisely indicate the current time as described below and whose inclusion or indication may be implicit if the message transmission is associated with, or part of, a local transmission time frame and/or subframe structure of the gNB 110), a source of the current time (e.g. GPS, Galileo, GLONASS, Beidou, GNSS, a local atomic clock, an external server with an atomic clock, a GNSS reference network, a local clock of the gNB 110), and/or an accuracy or uncertainty of the current time (e.g. 1 second, 1 ms or 1 µs) and, in some cases, a digital signature (DigSig). The purpose of the digital signature (DigSig) can be to improve the reliability of the current time received by the UE 102, which may be an important consideration, particularly for critical use cases. To make current time information more reliable, a UE 102 connected to a wireless network (e.g. 5GCN 150) may first authenticate the wireless network using existing (e.g. 3GPP) security mechanisms and establish a secure (e.g. ciphered) connection to the wireless network (e.g. to a serving gNB 110-1 and/or serving AMF 154). A network entity, (e.g., a serving AMF 154 or serving gNB 110-1) may then provide the UE 102 with a public ciphering key (also referred to as a public key) applicable to one gNB 110 (e.g. the serving gNB 110-1) or to many or all gNBs 110. A gNB 110 may then broadcast a current time (e.g., in a SIB message), and include the digital signature (DigSig) to authenticate the current time based on a corresponding private ciphering key (also referred to as a private key) known only to the network. The authentication might only be performed infrequently (e.g., by including DigSig once every minute or every five minutes) to reduce extra signaling and processing. The UE 102 may trust the received current time if the digital signature is authenticated by the UE 102 using the public key. The network and UE may use any standardized type of digital signature, such as based on the RSA algorithm or the Digital Signature Algorithm (DSA).

It is noted that a public key-private key form of authentication using a digital signature as described above can be more reliable than an authentication based on ciphering all or part of the current time (as shown in FIGS. 2B-2D). This is because ciphering would normally be based on a single ciphering key known to both a gNB 110 and a UE 102 which can be easily obtained by an attacking device (e.g. from the wireless network or from a UE 102). With a public key-private key pair, however, the private key is not disclosed to a UE 102 and can be known only within a wireless network.

Figure 3A:
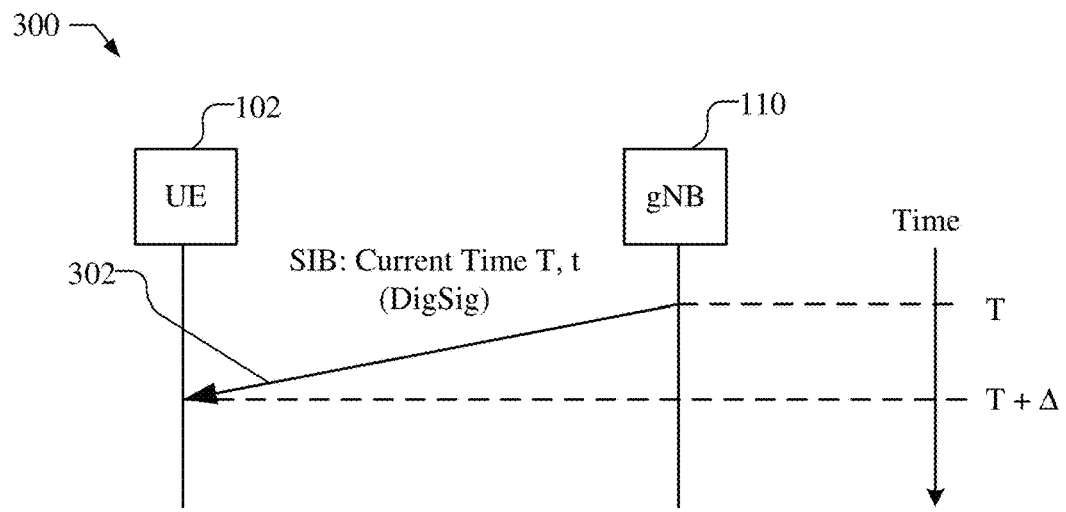
FIG. 3A illustrates a signaling flow for the broadcast and acquisition of time in a wireless network.

FIG. 3A illustrates a signaling flow 300 for the broadcast and acquisition of reliable time in a wireless network, including a gNB 110 and UE 102, where the vertical axis represents time (with time increasing in a downward direction) and the horizontal axis represents distance between entities. FIG. 3A is provided as a nonlimiting example. For example, FIG. 3A illustrates the use of a 5G network entity, i.e., gNB 110 or ng-eNB 114, but if desired, other types of networks may be used, such as an LTE network in which an eNB may be used in place of gNB 110. Additionally, it will be understood that additional signaling and processes may be present and that the message sent by gNB 110 may include additional components.

As illustrated, at or near to (e.g. within 1 μs or 1 ms of) a current time T, the gNB 110 broadcasts a message 302 that is received by the UE 102 at time T+Δ. The message 302 may be included in a system information block (SIB), and includes the current time T and may include an implicit or explicit indication of an associated local transmission time t at the gNB 110 (e.g. such as the start of a next subframe or end of a current subframe). The association can be that the current time is exactly T when the local time is exactly t. An implicit local time t may be defined in (e.g.) a 3GPP TS and may not be included explicitly in message 302. A local time t can enable a more accurate conveyance of a current time T and may not require that a gNB 110 broadcast the message 302 at exactly time T. Without a local time t, gNB 110 may need to broadcast message 302 at or as near to time T as possible and UE 102 may need to timestamp the arrival of message 302. The current time T, for example, may be a UTC time, a GPS time, a GLONASS time, a Beidou time, a Galileo time, a GNSS time or a local regional time (e.g. EST or PDT). For example, the gNB 110 may obtain the current time T as described previously—e.g. may obtain T periodically from an SV 190 or another network entity, such as AMF 154 shown in FIG. 1, and may maintain the time T using a local clock for short periods in between updates from the SV 190 or other network entity. The local clock, for example, may also maintain the local transmission time t for the gNB 110 in the NG-RAN 112. As discussed above, at least a portion of the current time T may be ciphered by the gNB 110, as described for FIGS. 2B-2D.

In some implementations, the message 302 may include additional information, e.g. as described for FIG. 2E. In one example, the message 302 may include or reference a local time t (e.g. as described above) that may indicate an alignment (or association) of the current time T with a subframe boundary or a slot boundary transmitted by the gNB 110. In one example, the message 302 may include an uncertainty of the current time T. In one example, the message 302 may include the source of the current time T, e.g., whether the current time T was obtained from an SV or network entity, and whether the current time is a UTC time, a GPS time, a GLONASS time, a Beidou time, a Galileo time, a GNSS time, etc. The message 302 may include further additional information (e.g. a digital signature as described for FIG. 2E) and/or any combination of the foregoing.

Since the broadcast message 302 with the current time T will arrive at a UE 102 after a signal propagation delay Δ from the gNB 110, the current time T in message 302 obtained by the UE 102 at time T+Δ may not be sufficiently accurate for some use cases. This may apply whether or not message 302 includes an implicit or explicit local time t. When a local time t is not included (implicitly or explicitly), UE 102 may just assume the current time T applies to the time of receipt of the message 302 (e.g. the time of receipt of the start of the message 302 or the end of the message 302) at T+Δ and may thus have an error equal to Δ. When a local time t is included or indicated (implicitly or explicitly), UE 102 may associate the current time T with a particular transmission time t received from gNB 110 such as the start or end of a current or next subframe or slot. This association would typically be correct for transmission at gNB 110 but would be delayed by time Δ when the local transmission time t indication (e.g. start or end of a subframe or slot) has arrived at the UE 102, which would again cause an error of Δ.

Accordingly, provision of a current time T that is highly accurate may require an ability for the UE 102 to determine the propagation delay Δ between itself and the gNB 110. With knowledge of the propagation delay Δ, the UE 102 may add the propagation delay Δ to the received current time T to obtain the correct current time T+Δ at either the time of receipt by the UE 102 of the broadcast message 302 or the time of receipt by the UE 102 of the implicit or explicit local time t.

The UE 102 may determine the propagation delay Δ between the broadcasting gNB 110 and itself in various ways. For example, the UE 102 may obtain a timing advance (TA) from the gNB 110 in another message (not shown in FIG. 3A), such as a message for a Radio Resource Control (RRC) protocol or a Medium Access Control (MAC) protocol for the NR radio interface. The TA may indicate a time interval by which transmission by the UE 102 to the gNB 110 is to be in advance of transmission timing received from the gNB 110. For example, if UE 102 receives the start of new subframe from gNB 110 at a local UE time T1, the UE 102 may support transmission timing towards the gNB 110 such that UE 102 transmits the start of a new subframe towards gNB 110 at a local UE time T1-TA. The TA value can be individual to each UE 102 and can be used by gNB 110 to ensure that transmission from all supported UEs 102 is received in a synchronized manner by gNB 110 (e.g. where the gNB 110 receives the start of a new subframe from all supported UEs 102 at the same time). In some cases, a timing advance offset can be added to the TA value by all UEs 102 without affecting the usage to synchronize time of arrival of transmissions from different UEs 102 at gNB 110. Typically (and as is well known), the TA value equals the round trip signal propagation time (RTT) between the UE 102 and the gNB 110. Hence the one way propagation delay can be obtained as half of the TA value (and thus $\Delta$=TA/2). A limitation of using a timing advance is that the UE 102 would normally need to be in an RRC CONNECTED state and have an RRC signaling connection to gNB 110.

Accordingly, use of a timing advance may not be suitable for a UE 102 in an RRC IDLE state or an RRC INACTIVE state which receives the current time T from gNB 110.

In another implementation, the UE 102 may determine a range, e.g., a distance, to the gNB 110 using known positioning techniques, and may convert the range to the propagation delay $\Delta$ based on the speed of the wireless signal ($\Delta$=range/c, where c is the speed of light).

For example, in some implementations, the UE 102 may obtain its location in a positioning session with a location server (e.g. LMF 152 or SLP 162) using known positioning techniques, such as A-GNSS, WiFi, DL-TDOA, DL-AOD, Multi-Cell RTT, ECID, etc. e.g., in a UE based positioning technique, and may obtain the location of the broadcasting gNB 110. The UE 102 may determine the range to the gNB 110 based on the distance between the locations of the UE 102 and the gNB 110. In some implementations, the location of the gNB 110 may be obtained by the UE 102 from a broadcast SIB message from the gNB 110 that includes the location of the gNB 110 or from an LPP assistance data message that includes the location of the gNB 110 that is received from a location server (e.g. LMF 152 or SLP 162), via the gNB 110, during a positioning session. The location of the UE 102 may be determined by a location server, e.g., LMF 152 or SLP 162, using known positioning techniques, such as A-GNSS, WiFi, DL-TDOA, DL-AOD, Multi-Cell RTT, ECID, etc., e.g., in a UE assisted positioning technique, in response to a mobile originated location request (MO-LR), and the location server may then send the location to the UE 102 in a MO-LR response message. The location of the UE 102 may also be determined by the UE 102 without interacting with a location server using known positioning techniques, such as GNSS, A-GNSS, WiFi, DL-TDOA, DL-AOD, Multi-Cell RTT, ECID, etc., in a UE based or a standalone positioning technique.

In another example, the UE 102 may determine a range to the gNB 110 based on a round trip propagation time (RTT) between the UE 102 and the gNB 110 (e.g., propagation delay $\Delta$ is half the RTT). The RTT, and thus, the propagation delay $\Delta$, for example, may be measured using a Random Access Channel (RACH). To restrict the RACH procedure only to UEs that are subscribed to high accuracy current time T, ciphering of a gNB RACH response message may be performed using a ciphering key known only to UEs subscribed to high accuracy current time. For example, the same ciphering key may be used to both cipher part or all of the current time as in FIGS. 2B-2D and to cipher part or all of the gNB RACH response message. This may limit loading on the gNB 110 to support RTT determination.

Figure 3B:
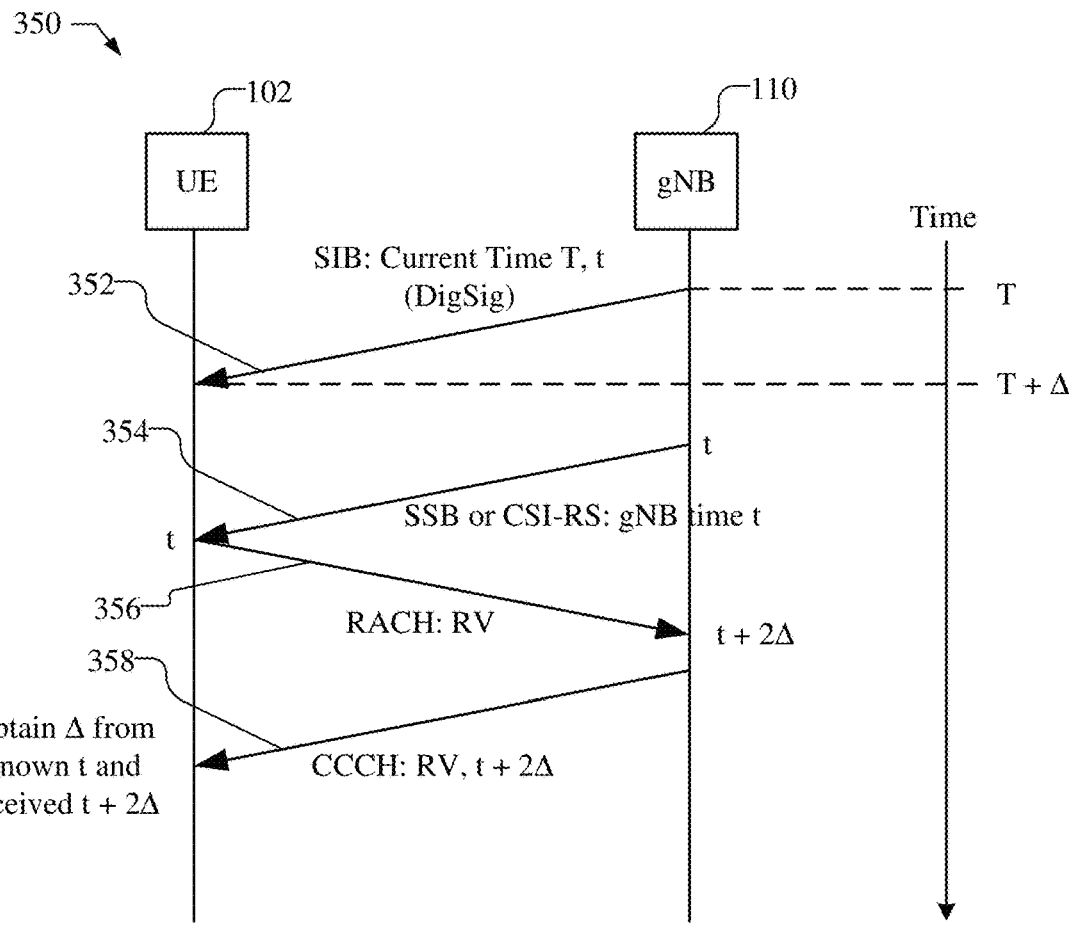
FIG. 3B illustrates a signaling flow for the broadcast and acquisition of time in a wireless network and determination of a propagation delay between the base station and a UE.

FIG. 3B, is similar to FIG. 3A, and illustrates a signaling flow 350 for the broadcast and acquisition of reliable time in a wireless network, including an RTT procedure to determine a propagation delay $\Delta$ between the gNB 110 and UE 102. FIG. 3B is provided as a nonlimiting example. For example, it will be understood that additional signaling and processes may be present and that the messages sent between the gNB 110 and UE 102 may include additional components. A benefit of the procedure shown in FIG. 3B is that it may be used by a UE 102 that is in an RRC IDLE or RRC INACTIVE state, and where a timing advance may not be available.

As illustrated, similar to message 302 shown in FIG. 3A, at or near to a current time T the gNB 110 broadcasts a message 352 that is received by the UE 102 at time T+$\Delta$. The message 352 may be the same as or similar to message 302 in FIG. 3A. Thus, the message 352 may be included in a SIB, at least a portion of the current time T may be ciphered, and the message 352 may include additional information, such as an implicit or explicit local NR transmission time t at the gNB 110, an implicit or explicit indication of an alignment of the current time T to a base station subframe or slot boundary, an uncertainty of the current time T, a source of the current time T, or a combination thereof. The UE 102 may decipher the current time T and, if also ciphered, the additional information based on a previously obtained ciphering key to obtain an unciphered current time T (and unciphered additional information).

The gNB 110 may transmit a message or signal 354 to the UE 102 at a local time t at the gNB 110. The message or signal 354, for example, may be a Synchronization Signal Block (SSB) or a Channel State Information Reference Signal (CSI-RS). The message or signal 354 may include or may indicate the local time t of transmission. The UE 102 may associate a local timing in the UE, e.g., an internal timing source or internal clock of the UE 102, with the local transmission time of the gNB 110 based on the received local transmission time t and a local time of receipt in the UE 102 of the message or signal 354.

In response to the message or signal 354, the UE 102 may send a message 356 to the gNB 110, which may be, e.g., an RRC message that is a RACH request message. The message 356 may be transmitted by UE 102 on a RACH for the gNB 110. The UE 102 may include a random variable (RV) in the message 356. e.g. a random bit string comprising 8 to 16 bits. The message 356 is transmitted at a first time (e.g. which can correspond to the time of transmission of the start or the end of the message 356), which may be either in the local time of the UE or an associated local transmission time for the gNB 110. The message 356 is received by the gNB 110 at a second time, e.g., local time t+2$\Delta$. It is noted that FIG. 3B illustrates the first time as occurring at receipt of message or signal 354 at UE 102 and thus where the first time corresponds to the local time t included in or indicated by the message or signal 354. However, it is also possible for the first time to occur shortly after the arrival at UE 102 of the message or signal 354 (e.g. 1 to 100 ms later) in which case the first time can correspond to some local transmission time for the gNB 110 that is known by UE 102 and exceeds t.

The gNB 110 obtains (e.g. measures) the time of arrival of the message 356 (e.g. the time of arrival of the start or end of the message 356) and returns a response message 358 to the UE 102 in response to the message 356. The response message 358, for example, may be an RRC message transmitted on a Common Control Channel (CCCH) for gNB 110. As discussed above, to restrict the RACH procedure only to UEs that are subscribed to high accuracy current time T, the response message 358 may be ciphered using a ciphering key known only to UEs subscribed to high accuracy current time. The UE 102 may thus decipher part or all of the response message 358 if ciphered. The response message 358 may include the random variable (RV) from message 356 and includes a second time, e.g., a local time of reception (t+2Δ in this example) of the message 356 at the gNB 110. Note that transmission and reception times would need to be measured consistently in all procedures described herein, such that times for the same message apply to the same part of the message, e.g. the start or the end of the message. Thus, the first and second times described here might both apply to the start of message 356 or might both apply to the end of message 356.

The UE 102 receives the response message 358 and recognizes the random variable (RV). The UE 102 can then obtain the propagation delay Δ based on the first time (e.g. known value of t) and the second time obtained from the response message 358 (e.g. value of t+2Δ in this example). With knowledge of the propagation delay Δ, the UE 102 may add the propagation delay Δ to the current time T received in message 352 to obtain the correct current time T+Δ either at the time of receipt of the broadcast message 352 or at the associated local time t if this was implicitly or explicitly included or indicated for message 352. It should be understood that the RTT procedure illustrated by messages 354, 356, and 358 (as well as any positioning procedure to determine a location of the UE 102) may not necessarily occur after receipt of message 352. For example, the RTT procedure (or a positioning procedure) is performed to obtain the propagation delay Δ and may occur before or after receipt of the current time T. Moreover, the RTT procedure (or positioning procedure) does not necessarily need to be performed close in time to the receipt of the current time T, if the UE 102 is not moving or is moving slowly.

If the UE 102 does not receive the response message 358 (e.g. following some maximum expected response time after transmitting the message 356), the UE 102 may retransmit the message 356 (not shown in FIG. 3B) at a later time t' and wait to receive a response message (not shown in FIG. 3B) similar to response message 358. This may occur, for example, if the gNB 110 does not correctly receive the message 356, e.g. due to interference or due to a too low transmission power from UE 102 for transmission of message 356. For the retransmission of message 356 and assuming gNB 110 sends a response message for this similar to response message 358, UE 102 can obtain the propagation delay Δ as described above using the time t' instead of the time t.

The reliability of a current time T received by the UE 102 may be an important consideration, particularly for critical use cases. To make current time information reliable, a UE 102 connected to a wireless network may first authenticate the wireless network using existing security mechanisms. A network entity, (e.g., an AMF 154 or gNB 110) may then provide the UE 102 with a public ciphering key applicable to one gNB 110 (e.g. the serving gNB 110-1) or to many or all gNBs 110. A gNB 110 may then broadcast a current time T, e.g., in the SIB message 302 or 352, and include a digital signature (DigSig) to authenticate the current time T based on a corresponding private key known only to the network. The authentication might only be performed infrequently (e.g., once every minute or every 5 minutes) to reduce extra signaling and processing. The UE 102 may trust the received current time T if the digital signature is authenticated using the public key.

Use of a digital signature included with a current time T may, thus, increase reliability of the current time T. The digital signature, for example, can prevent spoofing of the current time T by some attacking entity except for a replay attack, since an attacking entity would not be able to include a correct digital signature in a message similar to message 302 or message 352 that is transmitted towards UE 102 by the attacking entity if the included current T is a for a future time not yet transmitted by a gNB 110. However, in a replay attack, an attacking entity may obtain a current time T that is broadcast from a gNB 110 and resend the current time T and the digital signature to the UE 102 at a later (delayed) time, thereby inducing an incorrect time in the UE 102 that is earlier than the correct current time. By way of example, in FIG. 1, an attacking device 108 may receive broadcast message containing a current time T (along with the digital signature, etc.) from the gNB 110-1 and may send the message to the UE 102 in a replay attack. A replay attack cannot be detected via a digital signature alone because the digital signature is included in the replayed message. Accordingly, when the UE 102 receives the replayed message from the attacking device 108, the UE 102 may believe that the current time is T+Δ, when in fact the current time may be much later due to the delay.

Figure 4A:
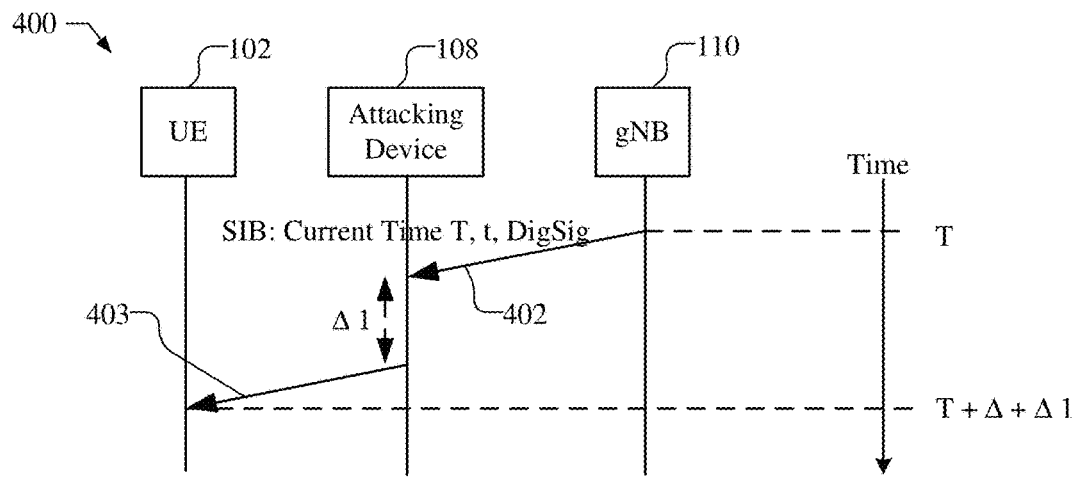
FIG. 4A illustrates a signaling flow for the broadcast and acquisition of time in a wireless network in which an attacking device is present and performing a replay attack

FIG. 4A, is similar to FIG. 3A, and illustrates a signaling flow 400 for the broadcast and acquisition of reliable time in a wireless network including the gNB 110 and UE 102, where an attacking device 108 is present and performing a replay attack.

As illustrated, at or near to (e.g. within 1 μs or 1 ms of) a current time T the gNB 110 broadcasts a message 402 that is received by the UE 102 at or near to time T+Δ. The message 402 may be the same as or similar to messages 302 and 352 described for FIGS. 3A and 3B. Thus, the message 402 may be a SIB message and may include the current time T, an optional implicit or explicit local time t, and a digital signature (DigSig). The message 402 may additionally include or indicate an alignment of the current time T to a base station subframe or slot boundary, an uncertainty of the current time, a source of the current time, or a combination thereof. The attacking device 108 may receive the message 402, and after a delay Δ1 may send a message 403 in a replay attack, which is received by the UE 102 at a time T+Δ+Δ1. The delay Δ can comprise the propagation time from the gNB 110 to the attacking device 108 plus the propagation time from the attacking device 108 to the UE 102. The delay Δ1 can include the delay between receiving (e.g. the start of) message 402 and transmitting (e.g. the start of) message 403 at the attacking device 108. The message 403 may be a copy of the message 402, and thus, may include the current time T (which may be at least partially ciphered by the gNB 110), as well as the digital signature (DigSig) for the gNB 110. The UE 102 may decipher the at least the portion of the current time to obtain an unciphered current time.

Without detection of the attacking device 108 by the UE 102, the UE 102 may inappropriately rely on the received current time T in message 403, which may have an error of at least Δ1. Accordingly, it may be desirable for the UE 102 to verify the reliability of the current time T by determining that a message with a current time T is received directly from the gNB 110 and not via the attacking device 108, e.g., in a replay attack.

Verification of the reliability of the current time T may be performed by UE 102 by periodically verifying that a propagation delay between the UE 102 and the gNB 110 is within an expected range or is equal to an expected value. If UE 102 is in an RRC CONNECTED state, UE 102 can periodically receive a Timing Advance (TA) from gNB 110 which, as described previously, can be used to determine a propagation delay (as half of the TA). Because communication between gNB 110 and UE 102 in an RRC CONNECTED can be ciphered in a manner impossible (or very difficult) for an attacking device 108 to decipher or modify, an attacking device 108 may be unable to falsify or spoof a timing advance and hence if a replay attack is performed, a UE 102 may receive a timing advance which the UE 102 can then treat as described further down to determine whether an attacking device 108 may be present.

However, if a UE 102 is in an RRC IDLE or RRC INACTIVE state, the UE 102 may not receive a timing advance from the gNB 110 and may need to measure a propagation delay with a gNB 110 using a procedure similar to that described for FIG. 3B but with some additions to enable detection of the attacking device 108 when this is present. The UE 102 may then periodically obtain the gNB 110 to UE 102 propagation delay $\Delta$ using a RACH procedure, similar to that shown in FIG. 3B. If an attacking device 108 were to block the RACH procedure or were to return a false RACH response, the UE 102 could detect this (e.g. using the digital signature or lack of a RACH response) and determine the presence of an attacking device 108. For example, the gNB 110 may digitally sign, i.e., include a digital signature (DigSig), in a RACH response message, as well as in a broadcast message with a current time. Accordingly, for an effective attack, the attacking device 108 would have to enable the RACH procedure by acting as a man-in-the-middle. If the attacking device 108 can successfully perform a man-in-the-middle replay attack, any error inserted into the propagation delay by the attacking device 108 will necessarily be small, e.g., less than 100 us or less than 10 μs, e.g., limited by a greatest possible range from the UE 102 to the gNB 110. Moreover, the UE 102 may detect spoofing even when a current time error is very small by comparing an expected propagation delay with a measured propagation delay, which may further reduce any possible error, e.g., to less than 1 μs. This technique is further elaborated below.

Figure 4B:
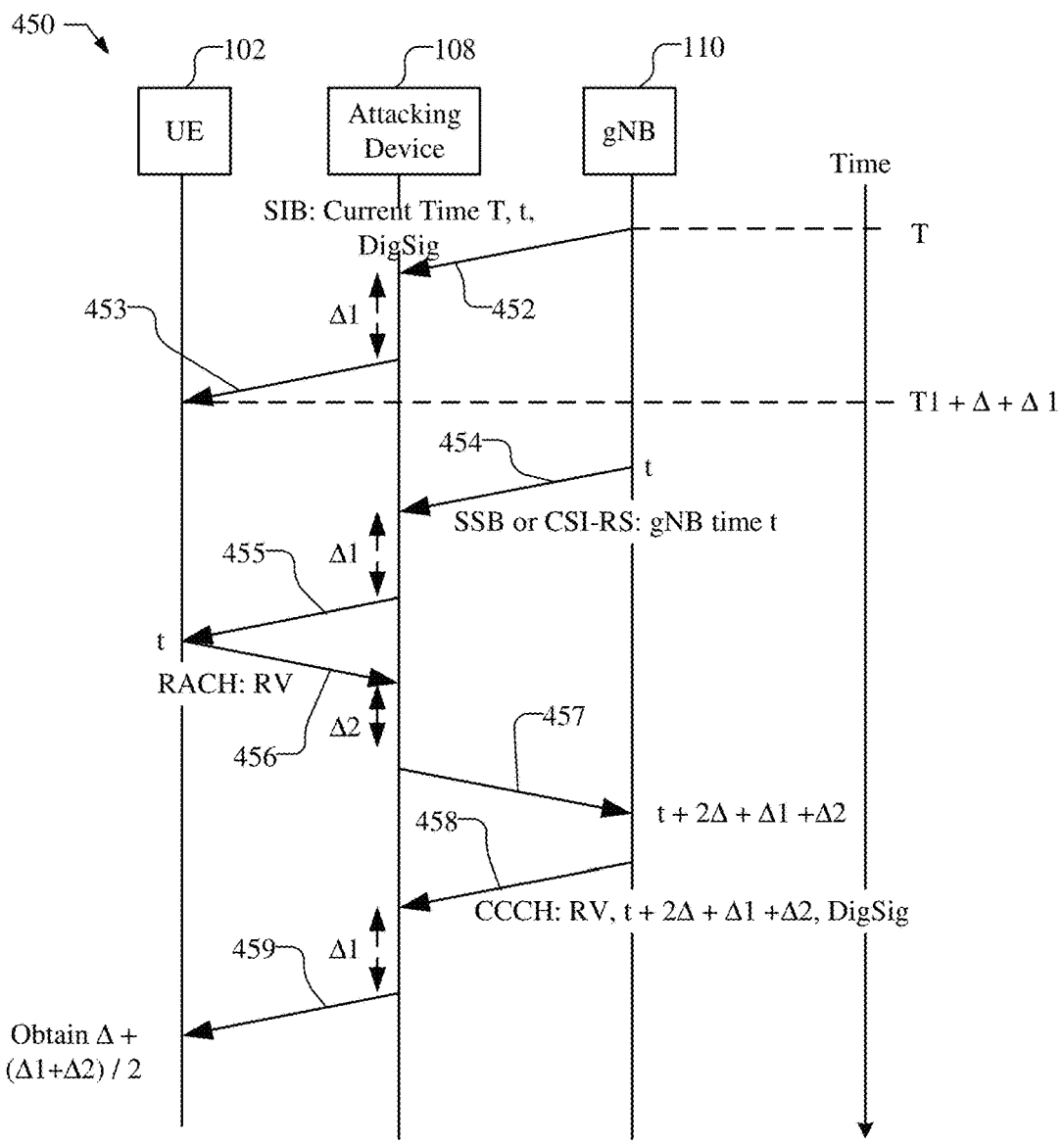
FIG. 4B illustrates a signaling flow for the broadcast and acquisition of time in a wireless network and determination of a propagation delay between the base station and a UE with increased reliability in the presence of a replay attack.

FIG. 4B, is similar to FIG. 4A, and illustrates a signaling flow 450 for the broadcast and acquisition of reliable time in a wireless network where an attacking device 108 is present and performing a replay attack, and the detection of the replay attack using an RTT procedure. FIG. 4B is provided as a nonlimiting example. For example, it will be understood that additional signaling and processes may be present and that the messages sent between the gNB 110 and UE 102 may include additional components. The procedure in FIG. 4B for determining an RTT and a propagation delay can be the same as the procedure described for FIG. 3B from the perspective of the UE 102 and gNB 110, except that an attacking device 108 is present in FIG. 4B which would typically affect the times and timing measurements obtained by the UE 102. A benefit of the procedure shown in FIG. 4B is that it may be used by a UE 102 that is in an RRC IDLE or RRC INACTIVE state, and where a timing advance may not be available.

As illustrated in FIG. 4B, similar to messages 402 and 403 shown in FIG. 4A, at or near to a current time T, the gNB 110 broadcasts a message 452 that is received by an attacking device 108 and is copied and sent as a message 453 to the UE 102 after a delay $\Delta 1$ in a replay attack so that the UE 102 receives the current time T at time T+$\Delta$+$\Delta 1$ in the copied message 453. The message 452 (and thus the message 453) includes the current time T, a portion of which may be ciphered, as well as an optional explicit or implicit local NR transmission time t at the gNB 110, and a digital signature (DigSig). The message 452 (and thus the message 453) may additionally include an implicit or explicit indication of an alignment of the current time T to a base station subframe or slot boundary, an uncertainty of the current time T, a source of the current time T, or a combination thereof. The UE 102 may decipher the at least the portion of the current time T to obtain an unciphered current time T.

Similar to the RTT procedure discussed in FIG. 3B, the gNB 110 may transmit a message or signal 454 (e.g. an SSB message or a CSI-RS signal) to the UE 102 at a local time t at the gNB 110. The message or signal 454 is received by the attacking device 108, copied and sent as a message or signal 455 to the UE 102 after a delay $\Delta 1$. The message or signal 454, and thus the message or signal 455 may include or indicate the local time t of transmission by the gNB 110, and the UE 102 may set its internal timing to match the time t from the gNB 110. Note that the attacking device 108 cannot vary the delay $\Delta 1$ in transmission of message or signal 455 versus the delay $\Delta 1$ in transmission of message 453 and transmission of message 459 (described later) without being detected by the UE 102 which could then infer the presence of attacking device 108 or at least some serious error with transmission from gNB 110. If the attacking device 108 were to vary the delay $\Delta 1$, the UE 102 could detect a corresponding variation in the local transmission time t at the gNB 110 (which is typically conveyed implicitly or explicitly in message or signal 455 and messages 453 and 459) compared to a local time source in the UE 102. Although a local time source in UE 102 may not be as precise as a local time t in gNB 110, it can be precise enough to detect a significant change in the local time t of the gNB 110 (e.g. of 10 μs or more) which could occur from the perspective of UE 102 if the attacking device 108 were to vary the delay $\Delta 1$.

In response to the message or signal 455, the UE 102 may send a message 456 to the gNB 110, which may be, e.g., an RRC message that is RACH request message. The message 456 may be transmitted by UE 102 on a RACH for the gNB 110. The UE 102 may include a random variable (RV) in the message 456. e.g. a random bit string comprising 8 to 16 bits. The message 456 is transmitted at a first time, which may be either in the local time of the UE or an associated local transmission time for the gNB 110. The attacking device 108 may receive the message 456, and send a copied message 457 to the gNB 110 after a delay $\Delta 2$. The gNB 110 thus receives the copied message 457 at a local time t+2$\Delta$+$\Delta 1$+$\Delta 2$, referred to here as a second time. It should be noted that if the delay $\Delta 2$ is equal to delay $\Delta 1$, then the total propagation delay $\Delta$+$\Delta 1$ for the reception of signal 453 could be determined by UE 102 based on the round trip time (RTT) between the UE 102 and the gNB 110, including the delay 2×$\Delta 1$ inserted by the attacking device 108. Accordingly, it may be presumed that delay $\Delta 2$ is different than $\Delta 1$. Note also that FIG. 4B (like FIG. 3B) illustrates the first time as occurring at receipt of message or signal 455 at UE 102 and thus where the first time corresponds to the time t included in or indicated by the message or signal 455. However, it is also possible for the first time to occur shortly after the arrival at UE 102 of the message or signal 455 (e.g. 1 to 100 ms later) in which case the first time can correspond to some local transmission time for the gNB 110 that is known by UE 102 and exceeds t.

The gNB 110 obtains (e.g. measures) the time of arrival of the copied message 457 (i.e. measures the second time) and returns a response message 458 to the UE 102, e.g., an RRC message transmitted on a CCCH for gNB 110. The response message 458 includes the random variable (RV), a digital signature (DigSig), and the second time which, in FIG. 4B, is the local time of reception t+2Δ+Δ1+Δ2 of the copied message 457 at the gNB 110. The response message 458 may be ciphered by the gNB 110. The attacking device 108 receives the response message 458, and sends a message 459 that is a copy of the response message 458 to the UE 102, e.g., after a delay Δ1. The inclusion of the digital signature (DigSig) in the response message 458 verifies that the gNB 110 originated the response message 458. Accordingly, the attacking device 108 cannot change the response message 458 or the UE 102 will detect the change in message 459 when the digital signature verification fails. Moreover, the attacking device 108 cannot block the response message 458 or the UE 102 will detect the attack from the lack of any response message. Accordingly, the UE 102 receives the copied response message 459 with the random variable (RV) and the second time (corresponding in FIG. 4B to the local time of reception t+2Δ+Δ1+Δ2 of the copied message 457 at the gNB 110). The UE 102 may obtain a propagation delay as Δ+(Δ1+Δ2)/2.

Similar to the signaling flow 350 in FIG. 3B, if the UE 102 does not receive the copied response message 459 (e.g. following some maximum expected response time after transmitting the message 456), the UE 102 may retransmit the message 456 (not shown in FIG. 4B) at a later time t' and wait to receive a response message (not shown in FIG. 4B) similar to the copied response message 459. This may occur, for example, if the gNB 110 does not correctly receive the copied message 457, e.g. due to interference or low transmission power for sending of either the message 456 by UE 102 or sending of the copied message 457 by the attacking device 108. For the retransmission of message 456 and assuming gNB 110 sends a response message for this similar to response message 458, UE 102 can obtain a propagation delay Δ+(Δ1+Δ2)/2 as described above using the time t' instead of the time t.

If the attacking device 108 inserts too large of a delay Δ1 and/or Δ2 into the propagation delay, the UE 102 can detect the attack. For example, wireless cells have a limited size, which limits the possible amount of propagation time. The largest possible range between the UE 102 and the gNB 110 without relaying may be, e.g., 30 km based on large cell sizes, which converts to a propagation delay of approximately 100 μs. When relaying is present, which would typically only occur in a rural area, the largest possible range may increase (e.g. to 100 km), in which case a UE 102 can adjust an expectation of the largest possible range based on a known environment (e.g. urban, suburban or rural) or an approximate known location of UE 102 for which an environment may be configured in the UE 102 by a network operator or UE vendor. Thus, if the UE 102 detects a total propagation delay of more than 100 μs and relaying is not present, the UE 102 could infer that an attacking device has likely inserted additional delay into the propagation delay and, thus, the current time T received at message 453 is unreliable and should be discarded. The UE 102 may further use smaller or larger thresholds for the detection of an attack, e.g., 10 us in an urban or suburban environment or 1 ms or a rural environment where relaying may be present. Thus, to avoid detection, the attacking device 108 cannot block the procedure shown in FIG. 4B, nor can it spoof the response message 458, and the attacking device 108 is then limited in the amount of error that it can insert into the propagation delay to less than a threshold used by a UE 102 to verify a propagation delay, which may be 10-100 μs in most environments.

Additionally, if the UE 102 knows its own location, e.g., from a previous position estimate, and knows the location of the gNB 110, the UE 102 may independently determine an expected propagation delay Δ based on the distance between the two locations. The UE 102 may then detect spoofing by the attacking device 108 based on a mismatch between the expected value of the propagation delay Δ with the measured value of the propagation delay Δ (e.g. as obtained according to the procedure in FIG. 4B or using a timing advance) If the mismatch is greater than a threshold, e.g., 1 μs, the UE 102 could determine that an attacking device has likely inserted additional delay into the propagation delay and, thus, the current time T received at message 453 is unreliable and should be discarded. With this additional location based verification, a UE 102 can verify the presence or absence of an attacking device 108 with high probability because the delay added by an attacking device 108 (for a replay or man-in-the-middle attack) would typically be much larger than the threshold (e.g. 1 μs) used by a UE 102 to verify a measured propagation delay.

The comparison of the measured propagation delay as described above with an expected propagation delay can also be performed by a UE 102 when the propagation delay is obtained by UE 102 using a timing advance value provided by the gNB 110 to the UE 102 when the UE 102 is in an RRC CONNECTED state and as described previously. The timing advance provided by the gNB 110 to the UE 102 would also then include the delays Δ1 and Δ2 if the attacking device is performing a man-in-the-middle attack on UE 102, since all signaling between the UE 102 and gNB 110 would then be received, copied and forwarded by the attacking device 108 (e.g. as shown in FIG. 4B), and hence a timing advance determination by gNB 110 would include the delays added by the attacking device 108. The UE 102 can then obtain the propagation delay as half the timing advance and compare this with an expected value based on a maximum possible range between the UE 102 and gNB 110 or a calculated range between the UE 102 and gNB 110 based on known locations of the UE 102 and gNB 110. The inference of the presence of an attacking device 108 can then be just the same as that described previously for the RTT procedure in FIG. 4B.

It is noted that the UE 102 could use an RTT between the UE 102 and the gNB 110 instead of the propagation delay (e.g. for the procedure in FIG. 4B) as a means to determine the presence or absence of the attacking device 108. The RTT is double the propagation delay and thus can be measured or obtained by the UE 102 in a similar manner as the propagation delay. Likewise, an expected range for the RTT would be double an expected range of the propagation delay. Hence, various statements herein concerning use of a propagation delay to detect the presence of the attacking device 108 can also apply to use of an RTT.

Figure 5:
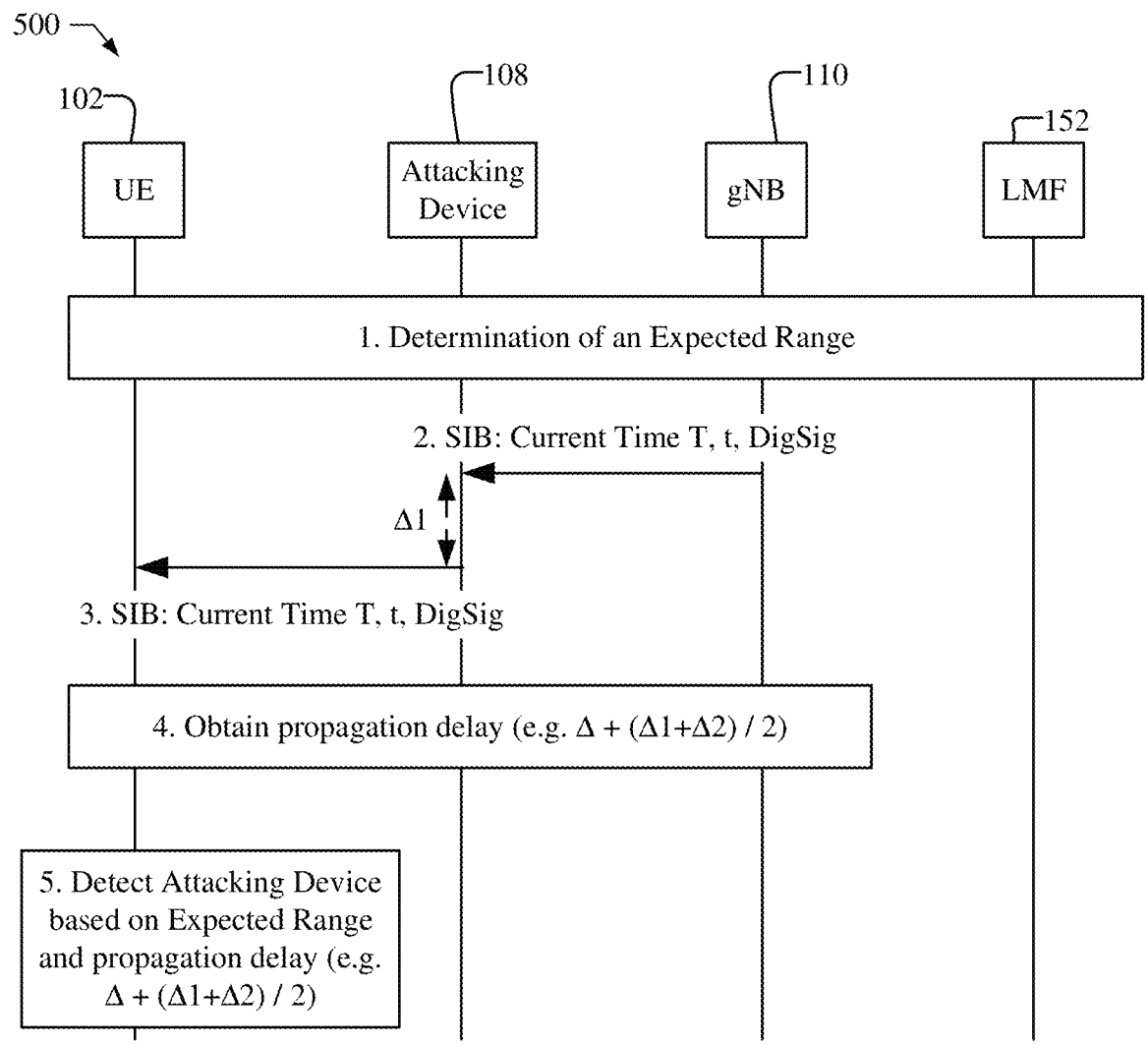
FIG. 5 illustrates a signaling flow for the broadcast and acquisition of time in a wireless network and the detection of a replay attack by an attacking device.

FIG. 5 illustrates a signaling flow 500 for the broadcast and acquisition of reliable time in a wireless network including UE 102, gNB 110, and LMF 152, and the detection of a replay attack by an attacking device 108.

At stage 1, the UE 102 determines an expected range between the UE 102 and the gNB 110. The determination of the expected range may be based on, e.g., known locations of the UE 102 and the gNB 110. The location of UE 102 may be determined by UE 102 or by LMF 152 (which may then provide the location to UE 102) using a positioning session between UE 102 and LMF 152 (or SLP 162, not shown in FIG. 5) using known positioning techniques, such as DL-TDOA, DL-AOD, Multi-cell RTT, A-GNSS, WiFi, ECID, etc. The UE 102 may obtain the location of gNB 110 from LMF 152 (or from SLP 162), from gNB 110 (e.g. if included by gNB 110 in messages containing the current time T or in other broadcast messages) or from information available from an Internet web server for PLMNs whose gNB locations have been approximately determined. In some implementations, the UE 102 may thereby determine the expected range between the UE 102 and the gNB 110. In other implementations, the LMF 152 may determine the expected range and may provide the expected range to the UE 102.

At stage 2, the gNB 110 broadcasts the current time T, along with an implicit or explicit indication of a local time of transmission t at the gNB 110, and a digital signature (DigSig), e.g., in an SIB message, which may be received and stored by the attacking device 108.

At stage 3, the attacking device 108 sends to the UE 102 a copy of the SIB message with the current time T, along with the implicit or explicit indication of the local time of transmission t, and the digital signature (DigSig) after a delay Δ1.

At stage 4, the UE 102 obtains the total propagation delay between the UE 102 and the gNB 110, including the delay inserted by the attacking device (e.g., Δ+(Δ1+Δ2)/2). The total propagation delay, for example, may be measured as discussed in FIG. 4B (e.g. if the UE 102 is in an RRC IDLE or RRC INACTIVE state) or may be determined by UE 102 from a timing advance provided by gNB 110 (e.g. if UE 102 is in an RRC CONNECTED state).

At stage 5, the UE 102 may detect the presence of the attacking device 108 based on the expected range obtained at stage 1 and the total propagation delay (e.g. Δ+(Δ1+Δ2)/2), measured in stage 4. For example, an expected propagation delay may be determined based on the expected range between the UE 102 and the gNB 110 and the expected propagation delay may be compared to the measured propagation delay from stage 4. A mismatch greater than a threshold (e.g., 100 μs 10 us or 1 μs) may indicate the presence of an attacking device and unreliability of the current time received at stage 2. In another example, a measured range may be determined based on the total propagation delay measured in stage 4 and compared to the expected range between the UE 102 and the gNB 110. A mismatch greater than a threshold distance e.g., 30 km, 3 km or 300 meters) may indicate the presence of an attacking device and unreliability of the current time received at stage 2.

Accordingly, the UE 102 may receive an accurate current time in a wireless network and can verify that the current time is reliable. If spoofing occurs, the UE 102 may either detect the spoofing and, thus, know that the received current time is unreliable, or the amount of error successfully inserted by spoofing may be minimal (e.g. less than 100 μs 10 us or 1 μs) and not significantly impair the current time obtained by the UE 102.

Figure 6:
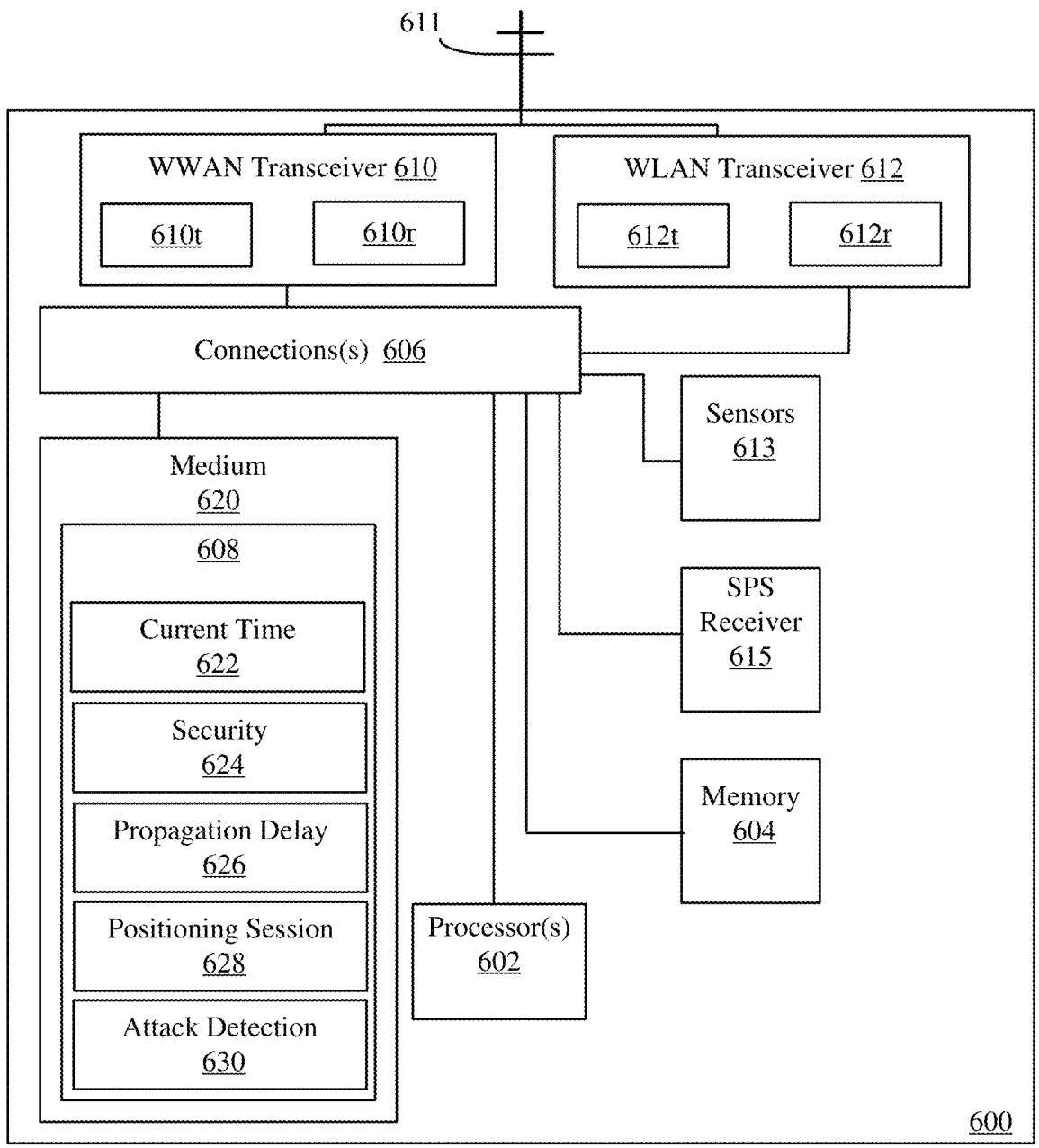
FIG. 6 shows a schematic block diagram illustrating certain exemplary features of a UE configured for supporting acquisition of a current time from a wireless network.

FIG. 6 shows a schematic block diagram illustrating certain exemplary features of a UE 600, e.g., which may be UE 102 shown in FIGS. 1, 3A, 3B, 4A, 4B, and 5, that is configured for supporting acquisition of a current time from a wireless network, e.g., as discussed herein. The UE 600, for example, may perform the signal flows shown in FIGS. 3A, 3B, 4A, 4B, and 5 and the process flow shown in FIG. 8 and algorithms disclosed herein. The UE 600 may, for example, include one or more processors 602, memory 604, an external interface such as at least one wireless transceivers (e.g., wireless network interface) illustrated as WWAN transceiver 610 and WLAN transceiver 612, SPS receiver 615, and one or more sensors 613, which may be operatively coupled with one or more connections 606 (e.g., buses, lines, fibers, links, etc.) to non-transitory computer readable medium 620 and memory 604. The SPS receiver 615, for example, may receive and process SPS signals from SVs 190 shown in FIG. 1. The one or more sensors 613, for example, may be an inertial measurement unit (IMU) that may include one or more accelerometers, one or more gyroscopes, a magnetometer, etc. The UE 600 may further include additional items, which are not shown, such as a user interface that may include e.g., a display, a keypad or other input device, such as virtual keypad on the display, through which a user may interface with the UE. In certain example implementations, all or part of UE 600 may take the form of a chipset, and/or the like.

The at least one wireless transceivers may be a transceiver 610 for a WWAN communication system and a transceiver 612 for a WLAN communication system, or may be a combined a transceiver for both WWAN and WLAN. The WWAN transceiver 610 may include a transmitter 610*t* and receiver 610*r* coupled to one or more antennas 611 for transmitting (e.g., on one or more uplink channels and/or one or more sidelink channels) and/or receiving (e.g., on one or more downlink channels and/or one or more sidelink channels) wireless signals and transducing signals from the wireless signals to wired (e.g., electrical and/or optical) signals and from wired (e.g., electrical and/or optical) signals to the wireless signals. The WLAN transceiver 612 may include a transmitter 612*t* and receiver 612*r* coupled to one or more antennas 611 or to separate antennas, for transmitting (e.g., on one or more uplink channels and/or one or more sidelink channels) and/or receiving (e.g., on one or more downlink channels and/or one or more sidelink channels) wireless signals and transducing signals from the wireless signals to wired (e.g., electrical and/or optical) signals and from wired (e.g., electrical and/or optical) signals to the wireless signals. The transmitters 610*t* and 612*t* may include multiple transmitters that may be discrete components or combined/integrated components, and/or the receivers 610*r* and 612*r* may include multiple receivers that may be discrete components or combined/integrated components. The WWAN transceiver 610 may be configured to communicate signals (e.g., with base stations and/or one or more other devices) according to a variety of radio access technologies (RATs) such as 6G New Radio (NR), GSM (Global System for Mobiles), UMTS (Universal Mobile Telecommunications System), AMPS (Advanced Mobile Phone System), CDMA (Code Division Multiple Access), WCDMA (Wideband CDMA), LTE (Long-Term Evolution), LTE Direct (LTE-D), 3GPP LTE-V2X (PC5), etc. New Radio may use mm-wave frequencies and/or sub-6 GHz frequencies. The WLAN transceiver 612 may be configured to communicate signals (e.g., with access points and/or one or more other devices) according to a variety of radio access technologies (RATs) such as 3GPP LTE-V2X (PC5), IEEE 802.11 (including IEEE 802.11p), WiFi, WiFi Direct (WiFi-D), Bluetooth®, Zigbee etc. The transceivers 610 and 612 may be communicatively coupled to a transceiver interface, e.g., by optical and/or electrical connection, which may be at least partially integrated with the transceivers 610 and 612.

In some embodiments, UE 600 may include antenna 611, which may be internal or external. UE antenna 611 may be used to transmit and/or receive signals processed by wireless transceivers 610 and 612. In some embodiments, UE antenna 611 may be coupled to wireless transceivers 610 and 612. In some embodiments, measurements of signals received (transmitted) by UE 600 may be performed at the point of connection of the UE antenna 611 and wireless transceivers 610 and 612. For example, the measurement point of reference for received (transmitted) RF signal measurements may be an input (output) terminal of the receiver 610*r* (transmitter 610*t*) and an output (input) terminal of the UE antenna 611. In a UE 600 with multiple UE antennas 611 or antenna arrays, the antenna connector may be viewed as a virtual point representing the aggregate output (input) of multiple UE antennas. In some embodiments, UE 600 may measure received signals including signal strength and TOA measurements and the raw measurements may be processed by the one or more processors 602.

The one or more processors 602 may be implemented using a combination of hardware, firmware, and software. For example, the one or more processors 602 may be configured to perform the functions discussed herein by implementing one or more instructions or program code 608 on a non-transitory computer readable medium, such as medium 620 and/or memory 604. In some embodiments, the one or more processors 602 may represent one or more circuits configurable to perform at least a portion of a data signal computing procedure or process related to the operation of UE 600.

The medium 620 and/or memory 604 may store instructions or program code 608 that contain executable code or software instructions that when executed by the one or more processors 602 cause the one or more processors 602 to operate as a special purpose computer programmed to perform the techniques disclosed herein. As illustrated in UE 600, the medium 620 and/or memory 604 may include one or more components or modules that may be implemented by the one or more processors 602 to perform the methodologies described herein. While the components or modules are illustrated as software in medium 620 that is executable by the one or more processors 602, it should be understood that the components or modules may be stored in memory 604 or may be dedicated hardware either in the one or more processors 602 or off the processors.

A number of software modules and data tables may reside in the medium 620 and/or memory 604 and be utilized by the one or more processors 602 in order to manage both communications and the functionality described herein. It should be appreciated that the organization of the contents of the medium 620 and/or memory 604 as shown in UE 600 is merely exemplary, and as such the functionality of the modules and/or data structures may be combined, separated, and/or be structured in different ways depending upon the implementation of the UE 600.

The medium 620 and/or memory 604 may include a current time module 622 that when implemented by the one or more processors 602 configures the one or more processors 602 to receive, e.g., via the wireless transceiver 610, a current time in a message, such as an SIB message, broadcast by a base station. The one or more processors 602 may be further configured to determine a corrected current time based on the received current time and a determined propagation delay. At least a portion of the current time may be ciphered. The current time may be, e.g., a UTC time, a GPS time, a GLONASS time, a Beidou time, a Galileo time, a GNSS time. The message may further include a local transmission time for the base station. The one or more processors 602 may be further configured to receive in the message additional information, such as at least one of an alignment of the current time to a base station subframe or slot boundary, an uncertainty of the current time, a source of the current time, or a combination thereof. The one or more processors 602 may be further configured to receive in the message a digital signature of the base station.

The medium 620 and/or memory 604 may include a security module 624 that when implemented by the one or more processors 602 configures the one or more processors 602 to decipher messages from the base station, including at least a portion of the current time to obtain an unciphered current time, and/or messages received from the base station for determining the propagation delay between the UE and the base station. The one or more processors 602 may be further configured to authenticate messages sent from the base station based on a digital signature for the base station included in the messages. The one or more processors 602, for example, may be configured to receive, e.g., via the wireless transceiver 610, a public ciphering key for the base station from the wireless network, e.g., after connecting to and authenticating the wireless network, and the public ciphering key may be used to decipher messages and the digital signature.

The medium 620 and/or memory 604 may include a propagation delay module 626 that when implemented by the one or more processors 602 configures the one or more processors 602 to determine a propagation delay between the base station and the UE. For example, the one or more processors 602 may be configured to receive, via the wireless a timing advance from the base station and to use the timing advance as the propagation delay, i.e., the propagation delay equals the timing advance. In another example, the one or more processors 602 may obtain a location of the UE, e.g., from a positioning session, and a location of the base station and determine the propagation delay based on the distance between the location of the UE and the location of the base station. The one or more processors 602 may be configured to obtain the location of the UE and the location of the base station by being configured to receive a broadcast from the base station with the location of the base station in an SIB, receive a LPP assistance data message containing the location of the base station, receive an MO-LR response message containing the location of the UE, performing a positioning session to determine the location of the UE, or a combination thereof. In another example, the one or more processors 602 may be configured to measure a RTT between the UE and the base station, and determine the propagation delay based on half of the RTT. For example, the one or more processors 602 may be configured to perform the RTT procedure illustrated in FIGS. 3B and 4B. The one or more processors 602 may be configured to receive, via the transceiver 610, a first message from the base station that includes the local transmission time for the base station and may associate the local timing in the UE with the local transmission time for the base station, e.g., based on the received local transmission time for the base station and a local time of receipt in the UE of the message. The one or more processors 602 may be configured to transmit, via the transceiver 610, a second message to the base station, such as a RACH request message, that includes a random variable, and receive, via the transceiver 610, a third message from the base station in response, e.g., a RACH response message, that includes the random variable and the local transmission time for the base station at which the request message was received at the base station. The third message may be ciphered and may include a digital signature for the base station. The one or more processors 602 may be configured to determine the RTT based on the times provided by the base station in the first time and the third message.

The medium 620 and/or memory 604 may include positioning session module 628 that when implemented by the one or more processors 602 configures the one or more processors 602 to engage in a positioning session with a location server through a serving base station, e.g., via the wireless transceiver 610, including receiving positioning capabilities request message, receiving positioning assistance data and/or broadcast location information from the base stations, receiving a request of location information, performing positioning measurements of received PRS signals from one or more base stations, such as TDOA, AOD, Multi-RTT, ECID, etc. and to report location information, such as positioning measurements, e.g., for a UE-assisted positioning process, or determine a position estimate for a UE based positioning process.

The medium 620 and/or memory 604 may include attack detection module 630 that when implemented by the one or more processors 602 configures the one or more processors 602 to detect the presence of an attacking device in the wireless network. The presence of the attacking device may be detected based on a measured RTT determined for the propagation delay being outside an expected range. The expected range, for example, may be a maximum RTT value that is based on a maximum expected distance to the base station. The expected range, for example, may be determined based on a determined distance between an estimated location of the UE, e.g., determined in a positioning session, and the location of the base station.

The methodologies described herein may be implemented by various means depending upon the application. For example, these methodologies may be implemented in hardware, firmware, software, or any combination thereof. For a hardware implementation, the one or more processors 602 may be implemented within one or more application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, electronic devices, other electronic units designed to perform the functions described herein, or a combination thereof.

For a firmware and/or software implementation, the methodologies may be implemented with modules (e.g., procedures, functions, and so on) that perform the functions described herein. Any machine readable medium tangibly embodying instructions may be used in implementing the methodologies described herein. For example, software codes may be stored in a non-transitory computer readable medium 620 or memory 604 that is connected to and executed by the one or more processors 602. Memory may be implemented within the one or more processors or external to the one or more processors. As used herein the term "memory" refers to any type of long term, short term, volatile, nonvolatile, or other memory and is not to be limited to any particular type of memory or number of memories, or type of media upon which memory is stored.

If implemented in firmware and/or software, the functions may be stored as one or more instructions or program code 608 on a non-transitory computer readable medium, such as medium 620 and/or memory 604. Examples include computer readable media encoded with a data structure and computer readable media encoded with a computer program code 608. For example, the non-transitory computer readable medium including program code 608 stored thereon may include program code 608 to support acquisition of a current time by the UE from a wireless network in a manner consistent with disclosed embodiments. Non-transitory computer readable medium 620 includes physical computer storage media. A storage medium may be any available medium that can be accessed by a computer. By way of example, and not limitation, such non-transitory computer readable media can comprise RAM, ROM, EEPROM, CD-ROM or other optical disk storage, magnetic disk storage or other magnetic storage devices, or any other medium that can be used to store desired program code 608 in the form of instructions or data structures and that can be accessed by a computer; disk and disc, as used herein, includes compact disc (CD), laser disc, optical disc, digital versatile disc (DVD), floppy disk and Blu-ray disc where disks usually reproduce data magnetically, while discs reproduce data optically with lasers. Combinations of the above should also be included within the scope of computer readable media.

In addition to storage on computer readable medium 620, instructions and/or data may be provided as signals on transmission media included in a communication apparatus. For example, a communication apparatus may include a wireless transceiver 610 having signals indicative of instructions and data. The instructions and data are configured to cause one or more processors to implement the functions outlined in the claims. That is, the communication apparatus includes transmission media with signals indicative of information to perform disclosed functions.

Memory 604 may represent any data storage mechanism. Memory 604 may include, for example, a primary memory and/or a secondary memory. Primary memory may include, for example, a random access memory, read only memory, etc. While illustrated in this example as being separate from one or more processors 602, it should be understood that all or part of a primary memory may be provided within or otherwise co-located/coupled with the one or more processors 602. Secondary memory may include, for example, the same or similar type of memory as primary memory and/or one or more data storage devices or systems, such as, for example, a disk drive, an optical disc drive, a tape drive, a solid state memory drive, etc.

In certain implementations, secondary memory may be operatively receptive of, or otherwise configurable to couple to a non-transitory computer readable medium 620. As such, in certain example implementations, the methods and/or apparatuses presented herein may take the form in whole or part of a computer readable medium 620 that may include computer implementable program code 608 stored thereon, which if executed by one or more processors 602 may be operatively enabled to perform all or portions of the example operations as described herein. Computer readable medium 620 may be a part of memory 604.

Figure 7:
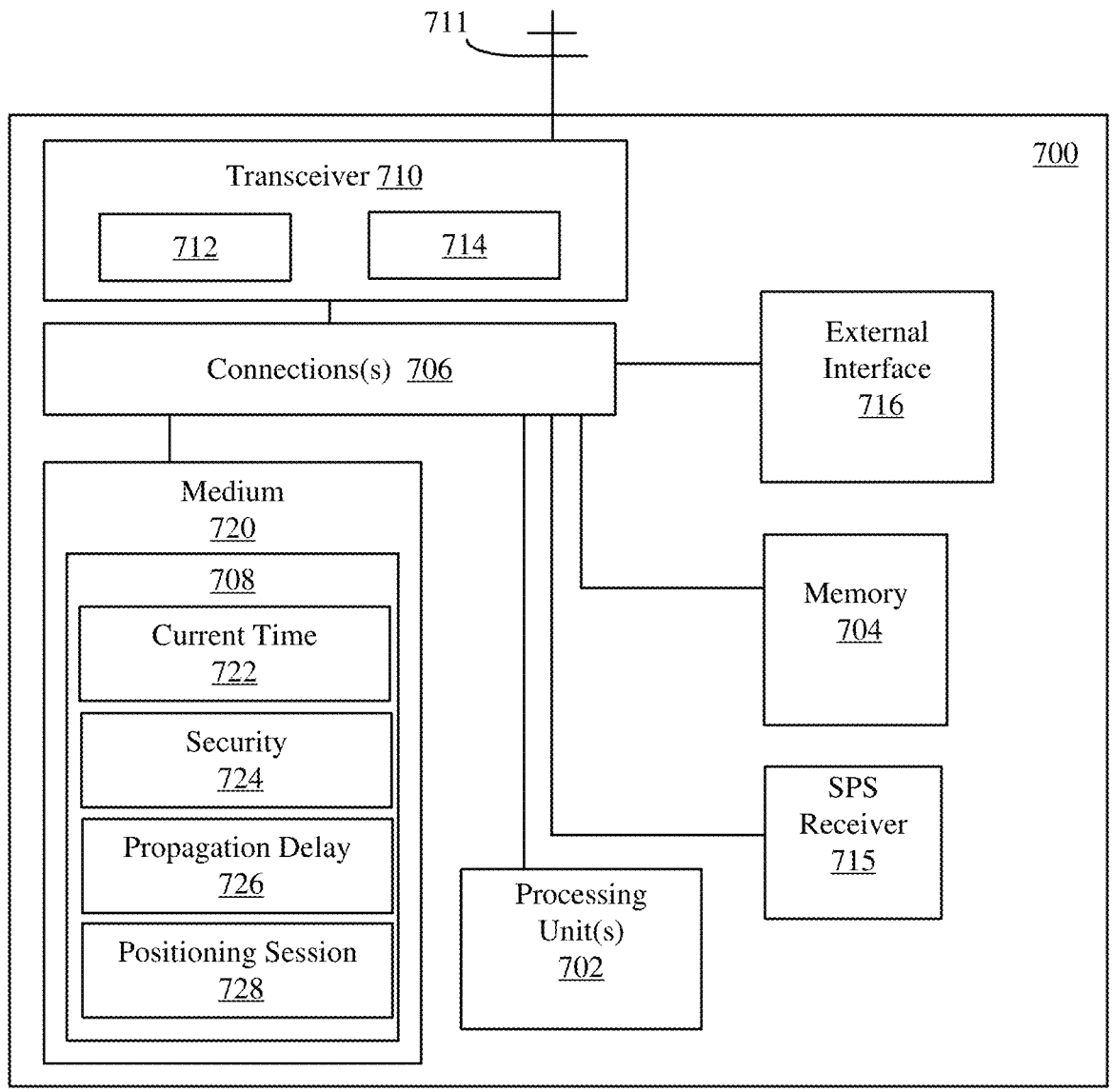
FIG. 7 shows a schematic block diagram illustrating certain exemplary features of a base station configured for supporting acquisition of a current time from a wireless network.

FIG. 7 shows a schematic block diagram illustrating certain exemplary features of a base station 700, which may be a gNB, an ng-eNB (e.g. ng-eNB 114) or eNB and may be, for example, the gNB 110 shown in FIGS. 1, 3A, 3B, 4A, 4B, and 5. The base station 700 is configured for supporting the broadcast of a current time and acquisition of the current time by a UE, e.g., as discussed herein. The base station 700 may be configured to perform the signal flows shown in FIGS. 3A, 3B, 4A, 4B, and 5 and the process flow shown in FIG. 9 and algorithms disclosed herein. Base station 700 may, for example, include one or more processors 702, memory 704, a communications interface, which may include a transceiver 710 (e.g., wireless network interface) and an external interface 716 (e.g., wireline or wireless network interface to other base stations and/or the core network), and an SPS receiver 715, which may be operatively coupled with one or more connections 706 (e.g., buses, lines, fibers, links, etc.) to non-transitory computer readable medium 720 and memory 704. The base station 700 may further include additional items, which are not shown, such as a user interface that may include e.g., a display, a keypad or other input device, such as virtual keypad on the display, through which a user may interface with the UE. In certain example implementations, all or part of base station 700 may take the form of a chipset, and/or the like. Transceiver 710 may, for example, include a transmitter 712 enabled to transmit one or more signals over one or more types of wireless communication networks and a receiver 714 to receive one or more signals transmitted over the one or more types of wireless communication networks. The external interface 716 may be a wired or wireless interface capable of connecting to other base stations in the RAN or network entities, such as AMF 154 and LMF 152 shown in FIG. 1. The SPS receiver 715, for example, may receive and process SPS signals from SVs 190 shown in FIG. 1 to obtain a current time, e.g., a UTC time, a GPS time, a GLONASS time, a Beidou time, a Galileo time, and a GNSS time.

In some embodiments, base station 700 may include antenna 711, which may be internal or external. Antenna 711 may be used to transmit and/or receive signals processed by transceiver 710. In some embodiments, antenna 711 may be coupled to transceiver 710. In some embodiments, measurements of signals received (transmitted) by base station 700 may be performed at the point of connection of the antenna 711 and transceiver 710. For example, the measurement point of reference for received (transmitted) RF signal measurements may be an input (output) terminal of the receiver 714 (transmitter 712) and an output (input) terminal of the antenna 711. In a base station 700 with multiple antennas 711 or antenna arrays, the antenna connector may be viewed as a virtual point representing the aggregate output (input) of multiple antennas. In some embodiments, base station 700 may measure received signals including signal strength and TOA measurements and the raw measurements may be processed by the one or more processors 702.

The one or more processors 702 may be implemented using a combination of hardware, firmware, and software. For example, the one or more processors 702 may be configured to perform the functions discussed herein by implementing one or more instructions or program code 708 on a non-transitory computer readable medium, such as medium 720 and/or memory 704. In some embodiments, the one or more processors 702 may represent one or more circuits configurable to perform at least a portion of a data signal computing procedure or process related to the operation of base station 700.

The medium 720 and/or memory 704 may store instructions or program code 708 that contain executable code or software instructions that when executed by the one or more processors 702 cause the one or more processors 702 to operate as a special purpose computer programmed to perform the techniques disclosed herein. As illustrated in base station 700, the medium 720 and/or memory 704 may include one or more components or modules that may be implemented by the one or more processors 702 to perform the methodologies described herein. While the components or modules are illustrated as software in medium 720 that is executable by the one or more processors 702, it should be understood that the components or modules may be stored in memory 704 or may be dedicated hardware either in the one or more processors 702 or off the processors.

A number of software modules and data tables may reside in the medium 720 and/or memory 704 and be utilized by the one or more processors 702 in order to manage both communications and the functionality described herein. It should be appreciated that the organization of the contents of the medium 720 and/or memory 704 as shown in base station 700 is merely exemplary, and as such the functionality of the modules and/or data structures may be combined, separated, and/or be structured in different ways depending upon the implementation of the base station 700.

The medium 720 and/or memory 704 may include a current time module 722 that when implemented by the one or more processors 702 configures the one or more processors 702 to obtain a current time, e.g., from SVs 190 via the SPS receiver 715, or from a network entity, such as AMF 154 via external interface 716. The current time may be, e.g., a UTC time, a GPS time, a GLONASS time, a Beidou time, a Galileo time, a GNSS time. The one or more processors 702 may be further configured to broadcast the current time, e.g., via the wireless transceiver 710, in message, such as an SIB message. At least a portion of the current time may be ciphered. The broadcast message may further include a local transmission time for the base station. The one or more processors 702 may be further configured to broadcast in the message additional information, such as at least one of an alignment of the current time to a subframe or slot boundary, an uncertainty of the current time, a source of the current time, or a combination thereof. The one or more processors 702 may be further configured to broadcast the message with a digital signature for the base station.

The medium 720 and/or memory 704 may include a security module 724 that when implemented by the one or more processors 702 configures the one or more processors 702 to cipher messages from the base station, including at least a portion of the current time, and/or messages transmitted to the UE for determining the propagation delay between the UE and the base station. The one or more processors 702 may be further configured to include a digital signature for the base station in one or more messages to the UE. The one or more processors 702 may be further configured to send, via the transceiver 710, a public ciphering key for the base station to the UE, where the digital signature is based on a private ciphering key that corresponds to the public ciphering key.

The medium 720 and/or memory 704 may include a propagation delay module 726 that when implemented by the one or more processors 702 configures the one or more processors 702 to assist the UE in determining the propagation delay. For example, the one or more processors 702 may be configured to obtain and send, via the wireless a timing advance to the UE, where the propagation delay equals the timing advance. In another example, the one or more processors 702 may send a message to the UE that includes at least one of a location of the UE and a location of the base station, where the propagation delay can be determined based on the distance between the location of the UE and the location of the base station. The one or more processors 702 may be configured, for example, to broadcast the location of the base station in an SIB, forward a LPP assistance data message containing the location of the base station, send to the UE an MO-LR response message containing the location of the UE, transfer LPP messages between the UE and a location performing for the UE to determine the location of the UE, or a combination thereof. In another example, the one or more processors 702 may be configured to assist the UE in measuring a RTT between the UE and the base station, wherein the propagation delay equals half of the RTT. For example, the one or more processors 702 may be configured to perform the RTT procedure illustrated in FIGS. 3B and 4B. The one or more processors 702 may be configured to send, via the transceiver 710, a first message to the UE with a local transmission time for the base station. The one or more processors 702 may be configured to receive, via the transceiver 710, a second message from the UE, such as a RACH request message, that includes a random variable, and to send, via the transceiver 710, a third message to the UE in response, e.g., a RACH response message, that includes the random variable and the local transmission time at which the base station received the request message. The third message may be ciphered and may include a digital signature for the base station.

The medium 720 and/or memory 704 may include positioning session module 728 that when implemented by the one or more processors 702 configures the one or more processors 702 to engage in a positioning session with the UE and a location server, e.g., via the wireless transceiver 710 and external interface 716. The positioning session, for example, may include the transfer of LPP positioning messages, and transmission of PRS signals to the UE for measurements and/or receipt and measurement of uplink PRS signals from the UE and forwarding the UL measurements to the location server via external interface 716 or the UE via transceiver 710.

The methodologies described herein may be implemented by various means depending upon the application. For example, these methodologies may be implemented in hardware, firmware, software, or any combination thereof. For a hardware implementation, the one or more processors 702 may be implemented within one or more application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, electronic devices, other electronic units designed to perform the functions described herein, or a combination thereof.

For a firmware and/or software implementation, the methodologies may be implemented with modules (e.g., procedures, functions, and so on) that perform the functions described herein. Any machine readable medium tangibly embodying instructions may be used in implementing the methodologies described herein. For example, software codes may be stored in a non-transitory computer readable medium 720 or memory 704 that is connected to and executed by the one or more processors 702. Memory may be implemented within the one or more processors or external to the one or more processors. As used herein the term "memory" refers to any type of long term, short term, volatile, nonvolatile, or other memory and is not to be limited to any particular type of memory or number of memories, or type of media upon which memory is stored.

If implemented in firmware and/or software, the functions may be stored as one or more instructions or program code 708 on a non-transitory computer readable medium, such as medium 720 and/or memory 704. Examples include computer readable media encoded with a data structure and computer readable media encoded with a computer program code 708. For example, the non-transitory computer readable medium including program code 708 stored thereon may include program code 708 to support the broadcast of the current time and acquisition of the current time by a UE in a manner consistent with disclosed embodiments. Non-transitory computer readable medium 720 includes physical computer storage media. A storage medium may be any available medium that can be accessed by a computer. By way of example, and not limitation, such non-transitory computer readable media can comprise RAM, ROM, EEPROM, CD-ROM or other optical disk storage, magnetic disk storage or other magnetic storage devices, or any other medium that can be used to store desired program code 708 in the form of instructions or data structures and that can be accessed by a computer; disk and disc, as used herein, includes compact disc (CD), laser disc, optical disc, digital versatile disc (DVD), floppy disk and Blu-ray disc where disks usually reproduce data magnetically, while discs reproduce data optically with lasers. Combinations of the above should also be included within the scope of computer readable media.

In addition to storage on computer readable medium 720, instructions and/or data may be provided as signals on transmission media included in a communication apparatus. For example, a communication apparatus may include a transceiver 710 having signals indicative of instructions and data. The instructions and data are configured to cause one or more processors to implement the functions outlined in the claims. That is, the communication apparatus includes transmission media with signals indicative of information to perform disclosed functions.

Memory 704 may represent any data storage mechanism. Memory 704 may include, for example, a primary memory and/or a secondary memory. Primary memory may include, for example, a random access memory, read only memory, etc. While illustrated in this example as being separate from one or more processors 702, it should be understood that all or part of a primary memory may be provided within or otherwise co-located/coupled with the one or more processors 702. Secondary memory may include, for example, the same or similar type of memory as primary memory and/or one or more data storage devices or systems, such as, for example, a disk drive, an optical disc drive, a tape drive, a solid state memory drive, etc.

In certain implementations, secondary memory may be operatively receptive of, or otherwise configurable to couple to a non-transitory computer readable medium 720. As such, in certain example implementations, the methods and/or apparatuses presented herein may take the form in whole or part of a computer readable medium 720 that may include computer implementable program code 708 stored thereon, which if executed by one or more processors 702 may be operatively enabled to perform all or portions of the example operations as described herein. Computer readable medium 720 may be a part of memory 704.

Figure 8:
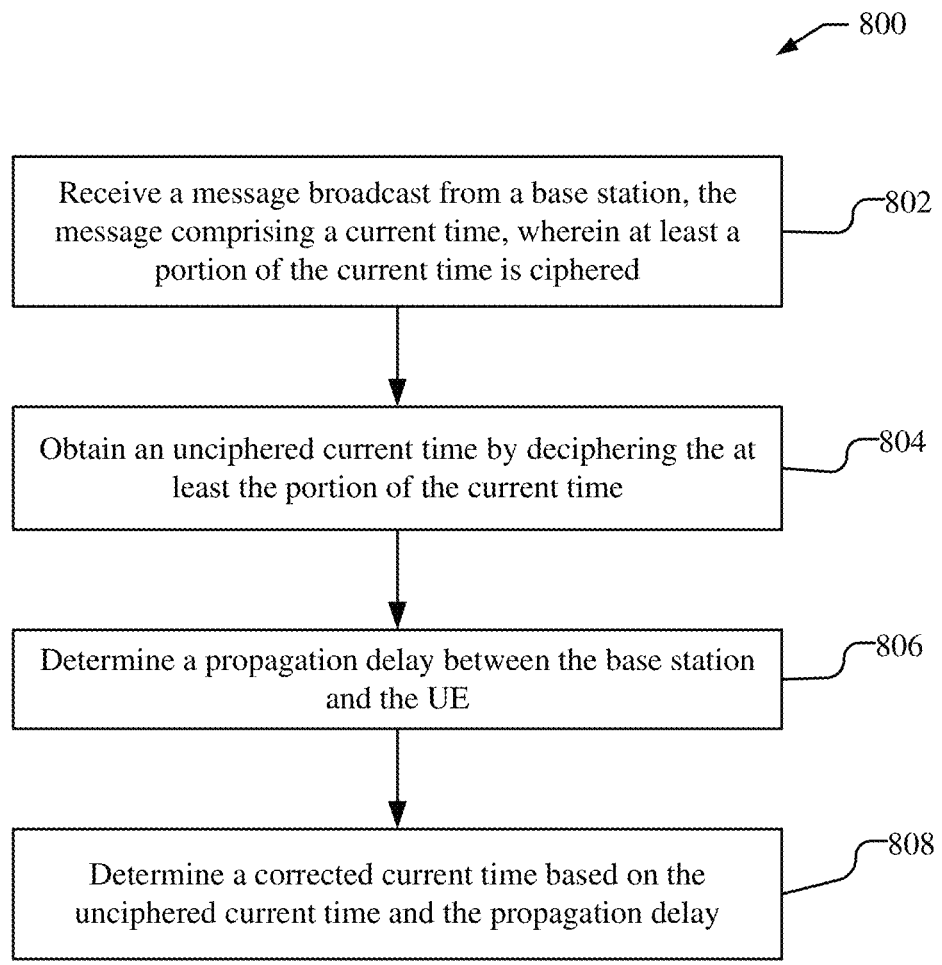
FIG. 8 shows a flowchart for an exemplary method for supporting acquisition of time by a UE in wireless network performed by a UE.

FIG. 8 shows a flowchart for an exemplary method 800 for supporting acquisition of reliable time by a User Equipment (UE) in wireless network, performed by the UE, such as the UE 102 shown in FIGS. 1, 3A, 3B, 4A, 4B, 5, and 6 in a manner consistent with disclosed implementations.

At block 802, the UE receives a message broadcast from a base station (e.g. a gNB 110 or ng-eNB 114), the message comprising a current time, where at least a portion of the current time is ciphered, e.g., as illustrated in message 302 in FIG. 3A, message 352 in FIG. 3B, messages 402 and 403 in FIG. 4A, and messages 452 and 453 in FIG. 4B. The current time, for example, may include a Coordinated Universal Time (UTC) time, a Global Positioning System (GPS) time, a GLONASS time, a Beidou time, a Galileo time, a Global Navigation Satellite System (GNSS) time, or a local regional time. The message may further include at least one of an implicit or explicit alignment of the current time to a base station subframe or slot boundary, an uncertainty of the current time, a source of the current time, or a combination thereof, e.g. as described for FIG. 2E. A means for receiving a message broadcast from a base station, the message comprising a current time, wherein at least a portion of the current time is ciphered may include, e.g., the wireless transceiver 610 and one or more processors 602 with dedicated hardware or implementing executable code or software instructions in memory 604 and/or medium 620 in UE 600, such as the current time module 622, shown in FIG. 6.

At block 804, the UE obtains an unciphered current time by deciphering the at least the portion of the current time, e.g., as discussed in FIGS. 2B-2E, 3A, 3B, 4A, and 4B. A means for obtaining an unciphered current time by deciphering the at least the portion of the current time may include, e.g., the one or more processors 602 with dedicated hardware or implementing executable code or software instructions in memory 604 and/or medium 620 in UE 600, such as the security module 624, shown in FIG. 6.

At block 806, the UE determines a propagation delay between the base station and the UE, e.g., as discussed in FIGS. 3A, 3B, 4A and 4B. A means for determining a propagation delay between the base station and the UE may include, e.g., the wireless transceiver 610 and one or more processors 602 with dedicated hardware or implementing executable code or software instructions in memory 604 and/or medium 620 in UE 600, such as the propagation delay module 626, shown in FIG. 6.

At block 808, the UE determines a corrected current time based on the unciphered current time and the propagation delay, e.g., as discussed in FIGS. 3A, 3B, 4A and 4B. A means for determining a corrected current time based on the unciphered current time and the propagation delay may include, e.g., the one or more processors 602 with dedicated hardware or implementing executable code or software instructions in memory 604 and/or medium 620 in UE 600, such as the security module 624, shown in FIG. 6.

In one implementation, the UE may determine the propagation delay by obtaining a timing advance from the base station, where the propagation delay is determined from the timing advance (e.g. is determined as half the value of the timing advance), e.g., as discussed in FIGS. 3A and 3B. A means for obtaining a timing advance from the base station, wherein the propagation delay is determined from the timing advance may include, e.g., the wireless transceiver 610 and one or more processors 602 with dedicated hardware or implementing executable code or software instructions in memory 604 and/or medium 620 in UE 600, such as the propagation delay module 626, shown in FIG. 6.

In one implementation, the UE may determine the propagation delay by obtaining a location of the UE and a location of the base station, wherein the propagation delay is determined based on a distance between the location of the UE and the location of the base station, e.g., as discussed in FIGS. 3A, 3B, 4A and 4B. A means for obtaining a location of the UE and a location of the base station, wherein the propagation delay is determined based on a distance between the location of the UE and the location of the base station may include, e.g., the wireless transceiver 610 and one or more processors 602 with dedicated hardware or implementing executable code or software instructions in memory 604 and/or medium 620 in UE 600, such as the propagation delay module 626, shown in FIG. 6. As discussed for FIG. 3A, the UE may obtain the location of the UE and the location of the base station by at least one of receiving a broadcast from the base station of the location of the base station in a System Information Block (SIB); receiving a Long Term Evolution (LTE) positioning protocol (LPP) assistance data message containing the location of the base station; receiving a Mobile Originated Location Request (MO-LR) response message containing the location of the UE; or performing a positioning session to determine the location of the UE. A means for receiving a broadcast from the base station of the location of the base station in a System Information Block (SIB) may include, e.g., the wireless transceiver 610 and one or more processors 602 with dedicated hardware or implementing executable code or software instructions in memory 604 and/or medium 620 in UE 600, such as the positioning session module 628, shown in FIG. 6. A means for receiving a Long Term Evolution (LTE) positioning protocol (LPP) assistance data message containing the location of the base station may include, e.g., the wireless transceiver 610 and one or more processors 602 with dedicated hardware or implementing executable code or software instructions in memory 604 and/or medium 620 in UE 600, such as the positioning session module 628, shown in FIG. 6. A means for receiving a Mobile Originated Location Request (MO-LR) response message containing the location of the UE may include, e.g., the wireless transceiver 610 and one or more processors 602 with dedicated hardware or implementing executable code or software instructions in memory 604 and/or medium 620 in UE 600, such as the positioning session module 628, shown in FIG. 6. A performing a positioning session to determine the location of the UE may include, e.g., the wireless transceiver 610 and one or more processors 602 with dedicated hardware or implementing executable code or software instructions in memory 604 and/or medium 620 in UE 600, such as the positioning session module 628, shown in FIG. 6.

In one implementation, the UE may determine the propagation delay by measuring a round trip propagation time (RTT) between the UE and the base station, wherein the propagation delay equals half of the RTT, e.g., as discussed in FIGS. 3A, 3B, 4A and 4B. A means for measuring a round trip propagation time (RTT) between the UE and the base station, wherein the propagation delay equals half of the RTT may include, e.g., the wireless transceiver 610 and one or more processors 602 with dedicated hardware or implementing executable code or software instructions in memory 604 and/or medium 620 in UE 600, such as the propagation delay module 626, shown in FIG. 6.

In one implementation, the UE may measure the RTT by receiving a first message from the base station that indicates a first local transmission time for the base station, e.g., as illustrated by message 354 in FIG. 3B and message 455 in FIG. 4B. A means for receiving a first message from the base station that indicates a first local transmission time for the base station may include, e.g., the wireless transceiver 610 and one or more processors 602 with dedicated hardware or implementing executable code or software instructions in memory 604 and/or medium 620 in UE 600, such as the propagation delay module 626, shown in FIG. 6. The UE may associate a local timing in the UE with a local transmission time for the base station based on the first local transmission time for the base station and a local time of receipt in the UE of the first message, e.g., as discussed in FIGS. 3B and 4B. A means for associating a local timing in the UE with a local transmission time for the base station based on the first local transmission time for the base station and a local time of receipt in the UE of the first message may include, e.g., the wireless transceiver 610 and one or more processors 602 with dedicated hardware or implementing executable code or software instructions in memory 604 and/or medium 620 in UE 600, such as the propagation delay module 626, shown in FIG. 6. The UE may transmit a second message to the base station on a Random Access Channel (RACH), the second message comprising a random variable, the second message transmitted at a first time, where the first time is either a local time in the UE or an associated local transmission time for the base station, e.g., as illustrated by message 356 in FIG. 3B and message 456 in FIG. 4B. A means for transmitting a second message to the base station on a Random Access Channel (RACH), the second message comprising a random variable, the second message transmitted at a first time, wherein the first time is either a local time in the UE or an associated local transmission time for the base station may include, e.g., the wireless transceiver 610 and one or more processors 602 with dedicated hardware or implementing executable code or software instructions in memory 604 and/or medium 620 in UE 600, such as the propagation delay module 626, shown in FIG. 6. The UE may receive a third message from the base station in response to the second message, the third message comprising a second time and the random variable, wherein the second time is the local transmission time for the base station at which the second message was received at the base station, e.g., as illustrated by message 358 in FIG. 3B and message 459 in FIG. 4B. A means for receiving a third message from the base station in response to the second message, the third message comprising a second time and the random variable, wherein the second time is the local transmission time for the base station at which the second message was received at the base station may include, e.g., the wireless transceiver 610 and one or more processors 602 with dedicated hardware or implementing executable code or software instructions in memory 604 and/or medium 620 in UE 600, such as the propagation delay module 626, shown in FIG. 6. The UE may determine the RTT based on the first time and the second time, e.g., as discussed in FIGS. 3B and 4B. A means for determining the RTT based on the first time and the second time may include, e.g., the wireless transceiver 610 and one or more processors 602 with dedicated hardware or implementing executable code or software instructions in memory 604 and/or medium 620 in UE 600, such as the propagation delay module 626, shown in FIG. 6.

In some implementations, the third message may be ciphered, e.g., as discussed in FIGS. 3B and 4B. The third message may further include a digital signature for the base station, and the UE may authenticate the third message based on the digital signature for the base station, e.g., as discussed in FIGS. 3B and 4B. A means for authenticating the third message based on the digital signature for the base station may include, e.g., the one or more processors 602 with dedicated hardware or implementing executable code or software instructions in memory 604 and/or medium 620 in UE 600, such as the security module 624, shown in FIG. 6.

An attacking device may be present in the wireless network between the UE and the base station, wherein the message is received via the attacking device in a replay attack, e.g., as illustrated in FIGS. 4A, 4B and 5. The UE may determine the propagation delay from the timing advance or by measuring the RTT (as described previously) and may detect the presence of the attacking device based on the propagation delay being outside an expected range, e.g., as discussed in FIGS. 4B and 5. A means for determining the propagation delay from the timing advance or by measuring the RTT may include, e.g., the one or more processors 602 with dedicated hardware or implementing executable code or software instructions in memory 604 and/or medium 620 in UE 600, such as the propagation delay module 626, shown in FIG. 6. A means for detecting the presence of the attacking device based on the propagation delay being outside an expected range may include, e.g., the one or more processors 602 with dedicated hardware or implementing executable code or software instructions in memory 604 and/or medium 620 in UE 600, such as the attack detection module 630, shown in FIG. 6. The expected range, for example, may include a maximum propagation delay based on a maximum expected distance to the base station. The UE may obtain an estimated location of the UE and the location of the base station, e.g., as discussed in stage 1 of FIG. 5. The UE may determine a distance estimate between the estimated location of the UE and the location of the base station, e.g., as discussed in stage 1 of FIG. 5. The UE may determine the expected range based on the distance estimate, e.g., as discussed in stage 1 of FIG. 5. A means for obtaining an estimated location of the UE and the location of the base station may include, e.g., the wireless transceiver 610 and one or more processors 602 with dedicated hardware or implementing executable code or software instructions in memory 604 and/or medium 620 in UE 600, such as the positioning session module 628, shown in FIG. 6. A means for determining a distance estimate between the estimated location of the UE and the location of the base station may include, e.g., the wireless transceiver 610 and one or more processors 602 with dedicated hardware or implementing executable code or software instructions in memory 604 and/or medium 620 in UE 600, such as the propagation delay module 626, shown in FIG. 6. A means for determining the expected range based on the distance estimate may include, e.g., the wireless transceiver 610 and one or more processors 602 with dedicated hardware or implementing executable code or software instructions in memory 604 and/or medium 620 in UE 600, such as the propagation delay module 626, shown in FIG. 6.

In one implementation, the message further includes a digital signature for the base station, e.g., as illustrated in message 302 in FIG. 3A, message 352 in FIG. 3B, message 402 in FIG. 4A, and messages 452 and 453 in FIG. 4B. The UE may authenticate the current time in the message based on the digital signature for the base station, e.g., as discussed in FIG. 3B. A means for authenticating the current time in the message based on the digital signature for the base station may include, e.g., the one or more processors 602 with dedicated hardware or implementing executable code or software instructions in memory 604 and/or medium 620 in UE 600, such as the security module 624, shown in FIG. 6. The UE, for example, may receive a public ciphering key for the base station from the wireless network, wherein the digital signature is based on a private ciphering key that corresponds to the public ciphering key, wherein authenticating the current time uses the public ciphering key, e.g., as discussed in FIGS. 3A, 3B, 4A, and 4B. A means for receiving a public ciphering key for the base station from the wireless network, wherein the digital signature is based on a private ciphering key that corresponds to the public ciphering key, wherein authenticating the current time uses the public ciphering key may include, e.g., the one or more processors 602 with dedicated hardware or implementing executable code or software instructions in memory 604 and/or medium 620 in UE 600, such as the security module 624, shown in FIG. 6.

Figure 9:
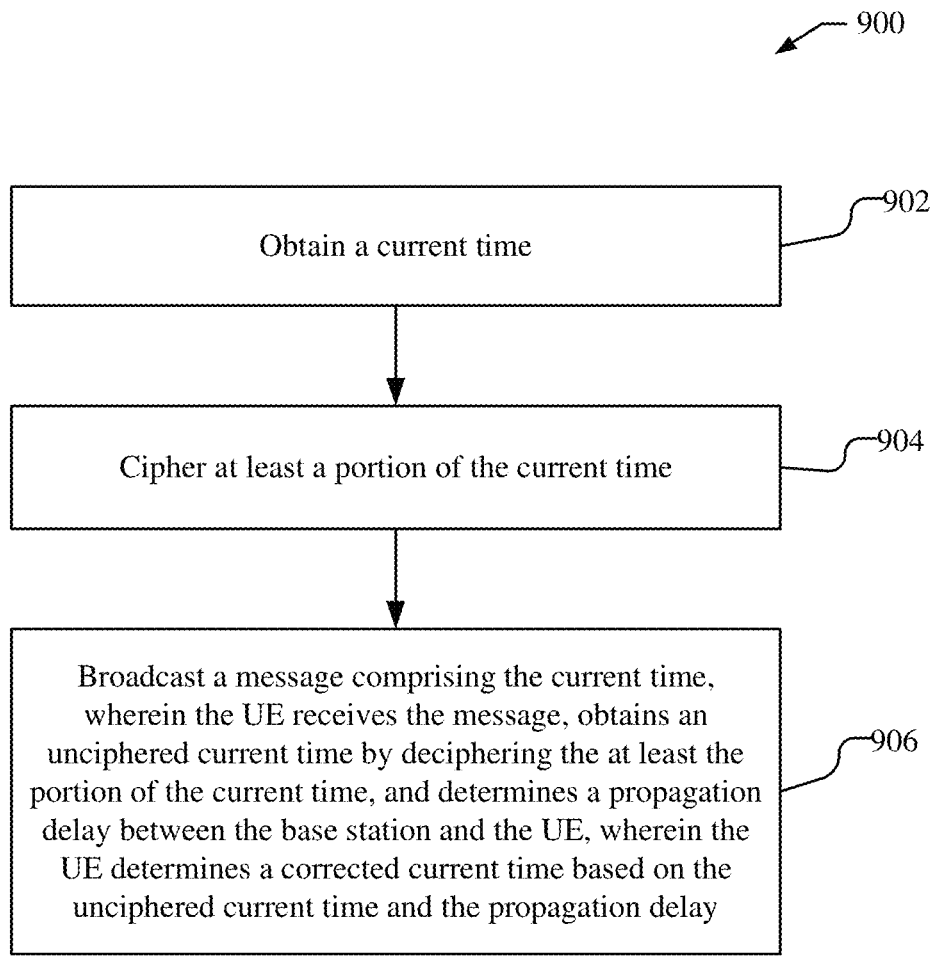
FIG. 9 shows a flowchart for an exemplary method for supporting acquisition of time by a UE in wireless network performed by a base station.

FIG. 9 shows a flowchart for an exemplary method 900 for supporting acquisition of reliable time by a User Equipment (UE) in wireless network, performed by a base station, such as the gNB 110 shown in FIGS. 1, 3A, 3B, 4A, 4B, 5, and 7 in a manner consistent with disclosed implementations.

At block 902, the base station may obtain a current time, e.g., as discussed in association with FIG. 1 and FIG. 3A. The current time, for example, may include a Coordinated Universal Time (UTC) time, a Global Positioning System (GPS) time, a GLONASS time, a Beidou time, a Galileo time, a Global Navigation Satellite System (GNSS) time, or a local regional time. A means for obtaining a current time may include, e.g., the SPS receiver 715 or the external transceiver 716 and one or more processors 702 with dedicated hardware or implementing executable code or software instructions in memory 704 and/or medium 720 in base station 700, such as the current time module 722, shown in FIG. 7.

At block 904, the base station ciphers at least a portion of the current time, e.g., as discussed for message 302 FIG. 3A and message 352 in FIG. 3B. A means for ciphering at least a portion of the current time may include, e.g., the one or more processors 702 with dedicated hardware or implementing executable code or software instructions in memory 704 and/or medium 720 in base station 700, such as the security module 724, shown in FIG. 7.

At block 906, the base station broadcasts a message comprising the current time, wherein the UE receives the message, obtains an unciphered current time by deciphering the at least the portion of the current time, and determines a propagation delay between the base station and the UE, wherein the UE determines a corrected current time based on the unciphered current time and the propagation delay, e.g., as discussed for message 302 FIG. 3A, message 352 in FIG. 3B, message 402 in FIG. 4A, and message 452 in FIG. 4B. In some implementations, the base station may include in the message at least one of an implicit or explicit alignment of the current time to a subframe or slot boundary for the base station, an uncertainty of the current time, a source from which the current time is obtained, or a combination thereof. A means for broadcasting a message comprising the current time and a means for including in the message at least one of an alignment of the current time to a subframe or slot boundary for the base station, an uncertainty of the current time, a source from which the current time is obtained, or a combination thereof may include, e.g., the transceiver 710 and one or more processors 702 with dedicated hardware or implementing executable code or software instructions in memory 704 and/or medium 720 in base station 700, such as the current time module 722, shown in FIG. 7.

In one implementation, the base station may assist the UE in determining the propagation delay by sending a timing advance to the UE, where the timing advance enables determination of the propagation delay by the UE (e.g. where the propagation delay is obtained as half of the timing advance), e.g., as discussed in FIGS. 3A and 4A. A means for sending a timing advance to the UE, wherein the timing advance enables determination of the propagation delay by the UE may include, e.g., the transceiver 710 and one or more processors 702 with dedicated hardware or implementing executable code or software instructions in memory 704 and/or medium 720 in base station 700, such as the propagation delay module 726, shown in FIG. 7.

In one implementation, the base station may assist the UE in determining the propagation delay by sending a message to the UE comprising at least one of a location of the UE and a location of the base station, wherein the propagation delay is determined by the UE based on a distance between the location of the UE and the location of the base station, e.g., as discussed for FIG. 3A. A means for sending a message to the UE comprising at least one of a location of the UE and a location of the base station, wherein the propagation delay is determined by the UE based on a distance between the location of the UE and the location of the base station may include, e.g., the transceiver 710 and one or more processors 702 with dedicated hardware or implementing executable code or software instructions in memory 704 and/or medium 720 in base station 700, such as the propagation delay module 726, shown in FIG. 7. As described for FIG. 3A, the base station, for example, may send the message to the UE comprising at least one of the location of the UE and the location of the base station by broadcasting the location of the base station in a System Information Block (SIB); forwarding a Long Term Evolution (LTE) positioning protocol (LPP) assistance data message to the UE containing the location of the base station; sending a Mobile Originated Location Request (MO-LR) response message to the UE containing the location of the UE; or transferring LPP messages between the UE and a location server for the UE (e.g. an LMF 152 or SLP 162) to determine the location of the UE, or any combination thereof. A means for broadcasting the location of the base station in a System Information Block (SIB) may include, e.g., the transceiver 710 and one or more processors 702 with dedicated hardware or implementing executable code or software instructions in memory 704 and/or medium 720 in base station 700, such as the positioning session module 728, shown in FIG. 7. A means for forwarding a Long Term Evolution (LTE) positioning protocol (LPP) assistance data message to the UE containing the location of the base station may include, e.g., the transceiver 710 and one or more processors 702 with dedicated hardware or implementing executable code or software instructions in memory 704 and/or medium 720 in base station 700, such as the positioning session module 728, shown in FIG. 7. A means for sending a Mobile Originated Location Request (MO-LR) response message to the UE containing the location of the UE may include, e.g., the transceiver 710 and one or more processors 702 with dedicated hardware or implementing executable code or software instructions in memory 704 and/or medium 720 in base station 700, such as the positioning session module 728, shown in FIG. 7. A means for transferring LPP messages between the UE and a location server for the UE to determine the location of the UE may include, e.g., the transceiver 710 and one or more processors 702 with dedicated hardware or implementing executable code or software instructions in memory 704 and/or medium 720 in base station 700, such as the positioning session module 728, shown in FIG. 7.

In one implementation, the base station may assist the UE in determining the propagation delay by assisting the UE in measuring a round trip propagation time (RTT) between the UE and the base station, wherein the propagation delay equals half of the RTT, e.g., as discussed in FIGS. 3B and 4B. A means for assisting the UE in measuring a round trip propagation time (RTT) between the UE and the base station, wherein the propagation delay equals half of the RTT may include, e.g., the transceiver 710 and one or more processors 702 with dedicated hardware or implementing executable code or software instructions in memory 704 and/or medium 720 in base station 700, such as the propagation delay module 726, shown in FIG. 7.

In one implementation, the base station may assist the UE in measuring the RTT by sending a first message to the UE that indicates a first local transmission time for the base station, wherein the UE associates local timing in the UE with a local transmission time for the base station based on the first local transmission time for the base station and a local time of receipt in the UE of the first message, e.g., as illustrated by message 354 in FIG. 3B and message 454 in FIG. 4B. A means for sending a first message to the UE that indicates a first local transmission time for the base station, wherein the UE associates local timing in the UE with a local transmission time for the base station based on the first local transmission time for the base station and a local time of receipt in the UE of the first message may include, e.g., the transceiver 710 and one or more processors 702 with dedicated hardware or implementing executable code or software instructions in memory 704 and/or medium 720 in base station 700, such as the propagation delay module 726, shown in FIG. 7. The base station may receive a second message from the UE on a Random Access Channel (RACH), the second message comprising a random variable, the second message transmitted at a first time, wherein the first time is either a local time in the UE or an associated local transmission time for the base station, e.g., as illustrated by message 356 in FIG. 3B and message 457 in FIG. 4B. A means for receiving a second message from the UE on a Random Access Channel (RACH), the second message comprising a random variable, the second message transmitted at a first time, wherein the first time is either a local time in the UE or an associated local transmission time for the base station may include, e.g., the transceiver 710 and one or more processors 702 with dedicated hardware or implementing executable code or software instructions in memory 704 and/or medium 720 in base station 700, such as the propagation delay module 726, shown in FIG. 7. The base station may measure a second time, wherein the second time is the local transmission time for the base station at which the second message was received at the base station, e.g., as illustrated by message 356 in FIG. 3B and message 457 in FIG. 4B. A means for measuring a second time, wherein the second time is the local transmission time for the base station at which the second message was received at the base station may include, e.g., the transceiver 710 and one or more processors 702 with dedicated hardware or implementing executable code or software instructions in memory 704 and/or medium 720 in base station 700, such as the propagation delay module 726, shown in FIG. 7. The base station may send a third message to the UE in response to the second message, the third message comprising the second time and the random variable, wherein the UE determines the RTT based on the first time and the second time, e.g., as illustrated by message 358 in FIG. 3B and messages 458 and 459 in FIG. 4B. A means for sending a third message to the UE in response to the second message, the third message comprising the second time and the random variable may include, e.g., the transceiver 710 and one or more processors 702 with dedicated hardware or implementing executable code or software instructions in memory 704 and/or medium 720 in base station 700, such as the propagation delay module 726, shown in FIG. 7.

In some implementation, the base station may cipher the third message, e.g., as discussed in FIGS. 3B and 4B. A means for ciphering the third message may include, e.g., the transceiver 710 and one or more processors 702 with dedicated hardware or implementing executable code or software instructions in memory 704 and/or medium 720 in base station 700, such as the security module 724, shown in FIG. 7. The base station may include in the third message a digital signature for the base station, wherein the UE authenticates the third message based on the digital signature for the base station, e.g., as discussed in FIGS. 3B and 4B. A means for including in the third message a digital signature for the base station, wherein the UE authenticates the third message based on the digital signature for the base station may include, e.g., the transceiver 710 and one or more processors 702 with dedicated hardware or implementing executable code or software instructions in memory 704 and/or medium 720 in base station 700, such as the security module 724, shown in FIG. 7.

In some implementation, an attacking device may be present in the wireless network between the UE and the base station, wherein the message is received by the UE via the attacking device in a replay attack, e.g., as illustrated in FIGS. 4A and 4B. The UE may determine the propagation delay from the timing advance or by measuring the RTT (as described above) and may detect the presence of the attacking device based on the propagation delay being outside an expected range, e.g., as illustrated in FIGS. 4B and 5. The expected range, for example, may be a maximum propagation delay based on a maximum expected distance between the UE and the base station. The expected range, for example, may be based on an estimated location of the UE and the location of the base station obtained by the UE.

In one implementation, the base station may include in the message a digital signature for the base station, wherein the UE authenticates the current time in the message based on the digital signature for the base station, e.g., as illustrated in message 302 in FIG. 3A, message 352 in FIG. 3B, message 402 in FIG. 4A, and messages 452 and 453 in FIG. 4B. A means for including in the message a digital signature for the base station, wherein the UE authenticates the current time in the message based on the digital signature for the base station may include, e.g., the transceiver 710 and one or more processors 702 with dedicated hardware or implementing executable code or software instructions in memory 704 and/or medium 720 in base station 700, such as the current time module 722, shown in FIG. 7. The base station may send a public ciphering key for the base station to the UE, wherein the digital signature is based on a private ciphering key that corresponds to the public ciphering key, wherein the UE authenticates the current time using the public ciphering key, e.g., as discussed in FIGS. 3A and 3B. A means for sending a public ciphering key for the base station to the UE, wherein the digital signature is based on a private ciphering key that corresponds to the public ciphering key, wherein the UE authenticates the current time using the public ciphering key may include, e.g., the transceiver 710 and one or more processors 702 with dedicated hardware or implementing executable code or software instructions in memory 704 and/or medium 720 in base station 700, such as the security module 724, shown in FIG. 7.

Reference throughout this specification to "one example", "an example", "certain examples", or "exemplary implementation" means that a particular feature, structure, or characteristic described in connection with the feature and/or example may be included in at least one feature and/or example of claimed subject matter. Thus, the appearances of the phrase "in one example", "an example", "in certain examples" or "in certain implementations" or other like phrases in various places throughout this specification are not necessarily all referring to the same feature, example, and/or limitation. Furthermore, the particular features, structures, or characteristics may be combined in one or more examples and/or features.

Some portions of the detailed description included herein are presented in terms of algorithms or symbolic representations of operations on binary digital signals stored within a memory of a specific apparatus or special purpose computing device or platform. In the context of this particular specification, the term specific apparatus or the like includes a general purpose computer once it is programmed to perform particular operations pursuant to instructions from program software. Algorithmic descriptions or symbolic representations are examples of techniques used by those of ordinary skill in the signal processing or related arts to convey the substance of their work to others skilled in the art. An algorithm is here, and generally, is considered to be a self-consistent sequence of operations or similar signal processing leading to a desired result. In this context, operations or processing involve physical manipulation of physical quantities. Typically, although not necessarily, such quantities may take the form of electrical or magnetic signals capable of being stored, transferred, combined, compared or otherwise manipulated. It has proven convenient at times, principally for reasons of common usage, to refer to such signals as bits, data, values, elements, symbols, characters, terms, numbers, numerals, or the like. It should be understood, however, that all of these or similar terms are to be associated with appropriate physical quantities and are merely convenient labels. Unless specifically stated otherwise, as apparent from the discussion herein, it is appreciated that throughout this specification discussions utilizing terms such as "processing," "computing," "calculating," "determining" or the like refer to actions or processes of a specific apparatus, such as a special purpose computer, special purpose computing apparatus or a similar special purpose electronic computing device. In the context of this specification, therefore, a special purpose computer or a similar special purpose electronic computing device is capable of manipulating or transforming signals, typically represented as physical electronic or magnetic quantities within memories, registers, or other information storage devices, transmission devices, or display devices of the special purpose computer or similar special purpose electronic computing device.

In the preceding detailed description, numerous specific details have been set forth to provide a thorough understanding of claimed subject matter. However, it will be understood by those skilled in the art that claimed subject matter may be practiced without these specific details. In other instances, methods and apparatuses that would be known by one of ordinary skill have not been described in detail so as not to obscure claimed subject matter.

The terms, "and", "or", and "and/or" as used herein may include a variety of meanings that also are expected to depend at least in part upon the context in which such terms are used. Typically, "or" if used to associate a list, such as A, B or C, is intended to mean A, B, and C, here used in the inclusive sense, as well as A, B or C, here used in the exclusive sense. In addition, the term "one or more" as used herein may be used to describe any feature, structure, or characteristic in the singular or may be used to describe a plurality or some other combination of features, structures or characteristics. Though, it should be noted that this is merely an illustrative example and claimed subject matter is not limited to this example.

While there has been illustrated and described what are presently considered to be example features, it will be understood by those skilled in the art that various other modifications may be made, and equivalents may be substituted, without departing from claimed subject matter. Additionally, many modifications may be made to adapt a particular situation to the teachings of claimed subject matter without departing from the central concept described herein.

In view of this description, embodiments may include different combinations of features. Implementation examples are described in the following numbered clauses:

Clause 1. A method performed by a User Equipment (UE) for supporting acquisition of time in a wireless network, comprising: receiving a message broadcast from a base station, the message comprising a current time, wherein at least a portion of the current time is ciphered; obtaining an unciphered current time by deciphering the at least the portion of the current time; determining a propagation delay between the base station and the UE; and determining a corrected current time based on the unciphered current time and the propagation delay.

Clause 2. The method of clause 1, wherein the current time comprises a Coordinated Universal Time (UTC) time, a Global Positioning System (GPS) time, a GLONASS time, a Beidou time, a Galileo time, a Global Navigation Satellite System (GNSS) time, or a local regional time.

Clause 3. The method of any of clauses 1 or 2, wherein determining the propagation delay comprises one of the following: obtaining a timing advance from the base station, wherein the propagation delay is determined from the timing advance; obtaining a location of the UE and a location of the base station, wherein the propagation delay is determined based on a distance between the location of the UE and the location of the base station; or measuring a round trip propagation time (RTT) between the UE and the base station, wherein the propagation delay equals half of the RTT.

Clause 4. The method of clause 3, wherein obtaining the location of the UE and the location of the base station comprises at least one of the following: receiving a broadcast from the base station of the location of the base station in a System Information Block (SIB); receiving a Long Term Evolution (LTE) positioning protocol (LPP) assistance data message containing the location of the base station; receiving a Mobile Originated Location Request (MO-LR) response message containing the location of the UE; or performing a positioning session to determine the location of the UE.

Clause 5. The method of any of clauses 3 or 4, wherein measuring the RTT comprises: receiving a first message from the base station that indicates a first local transmission time for the base station; associating a local timing in the UE with a local transmission time for the base station based on the first local transmission time for the base station and a local time of receipt in the UE of the first message; transmitting a second message to the base station on a Random Access Channel (RACH), the second message comprising a random variable, the second message transmitted at a first time, wherein the first time is either a local time in the UE or an associated local transmission time for the base station; receiving a third message from the base station in response to the second message, the third message comprising a second time and the random variable, wherein the second time is the local transmission time for the base station at which the second message was received at the base station; and determining the RTT based on the first time and the second time.

Clause 6. The method of clause 5, wherein the third message is ciphered.

Clause 7. The method of any of clauses 5 or 6, wherein the third message further comprises a digital signature for the base station, the method further comprising: authenticating the third message based on the digital signature for the base station.

Clause 8. The method of any of clauses 3-7, wherein an attacking device is present in the wireless network between the UE and the base station, wherein the message is received via the attacking device in a replay attack, the method further comprising: determining the propagation delay from the timing advance or by measuring the RTT; and detecting the presence of the attacking device based on the propagation delay being outside an expected range.

Clause 9. The method of clause 8, wherein the expected range comprises a maximum propagation delay based on a maximum expected distance to the base station.

Clause 10. The method of any of clauses 8 or 9, further comprising: obtaining an estimated location of the UE and the location of the base station; determining a distance estimate between the estimated location of the UE and the location of the base station; and determining the expected range based on the distance estimate.

Clause 11. The method of any of clauses 1-10, wherein the message further comprises at least one of an implicit or explicit alignment of the current time to a base station subframe or slot boundary, an uncertainty of the current time, a source of the current time, or a combination thereof.

Clause 12. The method of any of clauses 1-11, wherein the message further comprises a digital signature for the base station, the method further comprising: authenticating the current time in the message based on the digital signature for the base station.

Clause 13. The method of clause 12, further comprising: receiving a public ciphering key for the base station from the wireless network, wherein the digital signature is based on a private ciphering key that corresponds to the public ciphering key, wherein authenticating the current time uses the public ciphering key.

Clause 14. A User Equipment (UE) configured for supporting acquisition of time in a wireless network, comprising: a wireless transceiver configured to wirelessly communicate with base stations in the wireless network; at least one memory; at least one processor coupled to the wireless transceiver and the at least one memory, wherein the at least one processor is configured to: receive, via the wireless transceiver, a message broadcast from a base station, the message comprising a current time, wherein at least a portion of the current time is ciphered; obtain an unciphered current time by deciphering the at least the portion of the current time; determine a propagation delay between the base station and the UE; and determine a corrected current time based on the unciphered current time and the propagation delay.

Clause 15. The UE of clause 14, wherein the current time comprises a Coordinated Universal Time (UTC) time, a Global Positioning System (GPS) time, a GLONASS time, a Beidou time, a Galileo time, a Global Navigation Satellite System (GNSS) time, or a local regional time.

Clause 16. The UE of any of clauses 14 or 15, wherein the at least one processor is configured to determine the propagation delay by one of the following: obtain, via the wireless transceiver, a timing advance from the base station, wherein the propagation delay is determined from the timing advance; obtain a location of the UE and a location of the base station, wherein the propagation delay is determined based on a distance between the location of the UE and the location of the base station; or measure a round trip propagation time (RTT) between the UE and the base station, wherein the propagation delay equals half of the RTT.

Clause 17. The UE of clause 16, wherein the at least one processor is configured to obtain the location of the UE and the location of the base station by at least one of the following: receive, via the wireless transceiver, a broadcast from the base station of the location of the base station in a System Information Block (SIB); receive, via the wireless transceiver, a Long Term Evolution (LTE) positioning protocol (LPP) assistance data message containing the location of the base station; receive, via the wireless transceiver, a Mobile Originated Location Request (MO-LR) response message containing the location of the UE; or perform a positioning session to determine the location of the UE.

Clause 18. The UE of any of clauses 16 or 17, wherein the at least one processor is configured to measure the RTT by being configured to: receive, via the wireless transceiver, a first message from the base station that indicates a first local transmission time for the base station; associate a local timing in the UE with a local transmission time for the base station based on the first local transmission time for the base station and a local time of receipt in the UE of the first message; transmit, via the wireless transceiver, a second message to the base station on a Random Access Channel (RACH), the second message comprising a random variable, the second message transmitted at a first time, wherein the first time is either a local time in the UE or an associated local transmission time for the base station; receive, via the wireless transceiver, a third message from the base station in response to the second message, the third message comprising a second time and the random variable, wherein the second time is the local transmission time for the base station at which the second message was received at the base station; and determine the RTT based on the first time and the second time.

Clause 19. The UE of clause 18, wherein the third message is ciphered.

Clause 20. The UE of any of clauses 18 or 19, wherein the third message further comprises a digital signature for the base station, the at least one processor is further configured to: authenticate the third message based on the digital signature for the base station.

Clause 21. The UE of any of clauses 16-20, wherein an attacking device is present in the wireless network between the UE and the base station, wherein the message is received via the attacking device in a replay attack, the at least one processor is further configured to: determine the propagation delay from the timing advance or by measuring the RTT; and detect the presence of the attacking device based on the propagation delay being outside an expected range.

Clause 22. The UE of clause 21, wherein the expected range comprises a maximum propagation delay based on a maximum expected distance to the base station.

Clause 23. The UE of any of clauses 21 or 22, wherein the at least one processor is further configured to: obtain an estimated location of the UE and the location of the base station; determine a distance estimate between the estimated location of the UE and the location of the base station; and determine the expected range based on the distance estimate.

Clause 24. The UE of any of clauses 14-23, wherein the message further comprises at least one of an implicit or explicit alignment of the current time to a base station subframe or slot boundary, an uncertainty of the current time, a source of the current time, or a combination thereof.

Clause 25. The UE of any of clauses 14-24, wherein the message further comprises a digital signature for the base station, wherein the at least one processor is further configured to: authenticate the current time in the message based on the digital signature for the base station.

Clause 26. The UE of clause 25, wherein the at least one processor is further configured to: receive a public ciphering key for the base station from the wireless network, wherein the digital signature is based on a private ciphering key that corresponds to the public ciphering key, wherein authenticating the current time uses the public ciphering key.

Clause 27. A User Equipment (UE) configured for supporting acquisition of time in a wireless network, comprising: means for receiving a message broadcast from a base station, the message comprising a current time, wherein at least a portion of the current time is ciphered; means for obtaining an unciphered current time by deciphering the at least the portion of the current time; means for determining a propagation delay between the base station and the UE; and means for determining a corrected current time based on the unciphered current time and the propagation delay.

Clause 28. The UE of clause 27, wherein the current time comprises a Coordinated Universal Time (UTC) time, a Global Positioning System (GPS) time, a GLONASS time, a Beidou time, a Galileo time, a Global Navigation Satellite System (GNSS) time, or a local regional time.

Clause 29. The UE of any of clauses 27 or 28, wherein the means for determining the propagation delay comprises one of the following: means for obtaining a timing advance from the base station, wherein the propagation delay is determined from the timing advance; means for obtaining a location of the UE and a location of the base station, wherein the propagation delay is determined based on a distance between the location of the UE and the location of the base station; or means for measuring a round trip propagation time (RTT) between the UE and the base station, wherein the propagation delay equals half of the RTT.

Clause 30. The UE of clause 29, wherein the means for obtaining the location of the UE and the location of the base station comprises at least one of the following: means for receiving a broadcast from the base station of the location of the base station in a System Information Block (SIB); means for receiving a Long Term Evolution (LTE) positioning protocol (LPP) assistance data message containing the location of the base station; means for receiving a Mobile Originated Location Request (MO-LR) response message containing the location of the UE; or means for performing a positioning session to determine the location of the UE.

Clause 31. The UE of any of clauses 29 or 30, wherein the means for measuring the RTT comprises: means for receiving a first message from the base station that indicates a first local transmission time for the base station; means for associating a local timing in the UE with a local transmission time for the base station based on the first local transmission time for the base station and a local time of receipt in the UE of the first message; means for transmitting a second message to the base station on a Random Access Channel (RACH), the second message comprising a random variable, the second message transmitted at a first time, wherein the first time is either a local time in the UE or an associated local transmission time for the base station; means for receiving a third message from the base station in response to the second message, the third message comprising a second time and the random variable, wherein the second time is the local transmission time for the base station at which the second message was received at the base station; and means for determining the RTT based on the first time and the second time.

Clause 32. The UE of clause 31, wherein the third message is ciphered.

Clause 33. The UE of any of clauses 31 or 32, wherein the third message further comprises a digital signature for the base station, the UE further comprising: means for authenticating the third message based on the digital signature for the base station.

Clause 34. The UE of any of clauses 29-33, wherein an attacking device is present in the wireless network between the UE and the base station, wherein the message is received via the attacking device in a replay attack, the UE further comprising: means for determining the propagation delay from the timing advance or by measuring the RTT; and means for detecting the presence of the attacking device based on the propagation delay being outside an expected range.

Clause 35. The UE of clause 34, wherein the expected range comprises a maximum propagation delay based on a maximum expected distance to the base station.

Clause 36. The UE of any of clauses 34 or 35, further comprising: means for obtaining an estimated location of the UE and the location of the base station; means for determining a distance estimate between the estimated location of the UE and the location of the base station; and means for determining the expected range based on the distance estimate.

Clause 37. The UE of any of clauses 27-36, wherein the message further comprises at least one of an implicit or explicit alignment of the current time to a base station subframe or slot boundary, an uncertainty of the current time, a source of the current time, or a combination thereof.

Clause 38. The UE of any of clauses 27-37, wherein the message further comprises a digital signature for the base station, the UE further comprising: means for authenticating the current time in the message based on the digital signature for the base station.

Clause 39. The UE of clause 38, further comprising: means for receiving a public ciphering key for the base station from the wireless network, wherein the digital signature is based on a private ciphering key that corresponds to the public ciphering key, wherein authenticating the current time uses the public ciphering key.

Clause 40. A non-transitory computer readable storage medium including program code stored thereon, the program code is operable to configure at least one processor in a User Equipment (UE) for supporting acquisition of time in a wireless network, the program code comprising instructions to: receive a message broadcast from a base station, the message comprising a current time, wherein at least a portion of the current time is ciphered; obtain an unciphered current time by deciphering the at least the portion of the current time; determine a propagation delay between the base station and the UE; and determine a corrected current time based on the unciphered current time and the propagation delay.

Clause 41. The non-transitory computer readable storage medium of clause 40, wherein the current time comprises a Coordinated Universal Time (UTC) time, a Global Positioning System (GPS) time, a GLONASS time, a Beidou time, a Galileo time, a Global Navigation Satellite System (GNSS) time, or a local regional time.

Clause 42. The non-transitory computer readable storage medium of any of clauses 40 or 41, wherein the instructions to determine the propagation delay comprises instructions for one of the following: obtain a timing advance from the base station, wherein the propagation delay is determined from the timing advance; obtain a location of the UE and a location of the base station, wherein the propagation delay is determined based on a distance between the location of the UE and the location of the base station; or measure a round trip propagation time (RTT) between the UE and the base station, wherein the propagation delay equals half of the RTT.

Clause 43. The non-transitory computer readable storage medium of clause 42, wherein the instructions to obtain the location of the UE and the location of the base station comprises instructions for at least one of the following: receive a broadcast from the base station of the location of the base station in a System Information Block (SIB); receive a Long Term Evolution (LTE) positioning protocol (LPP) assistance data message containing the location of the base station; receive a Mobile Originated Location Request (MO-LR) response message containing the location of the UE; or perform a positioning session to determine the location of the UE.

Clause 44. The non-transitory computer readable storage medium of any of clauses 42 or 43, wherein the instructions to measure the RTT comprises instructions to: receive a first message from the base station that indicates a first local transmission time for the base station; associate a local timing in the UE with a local transmission time for the base station based on the first local transmission time for the base station and a local time of receipt in the UE of the first message; transmit a second message to the base station on a Random Access Channel (RACH), the second message comprising a random variable, the second message transmitted at a first time, wherein the first time is either a local time in the UE or an associated local transmission time for the base station; receive a third message from the base station in response to the second message, the third message comprising a second time and the random variable, wherein the second time is the local transmission time for the base station at which the second message was received at the base station; and determine the RTT based on the first time and the second time.

Clause 45. The non-transitory computer readable storage medium of clause 44, wherein the third message is ciphered.

Clause 46. The non-transitory computer readable storage medium of any of clauses 44 or 45, wherein the third message further comprises a digital signature for the base station, the program code further comprising instructions to: authenticate the third message based on the digital signature for the base station.

Clause 47. The non-transitory computer readable storage medium of any of clauses 42-46, wherein an attacking device is present in the wireless network between the UE and the base station, wherein the message is received via the attacking device in a replay attack, the program code further comprising instructions to: determine the propagation delay from the timing advance or by measuring the RTT; and detect the presence of the attacking device based on the propagation delay being outside an expected range.

Clause 48. The non-transitory computer readable storage medium of clause 47, wherein the expected range comprises a maximum propagation delay based on a maximum expected distance to the base station.

Clause 49. The non-transitory computer readable storage medium of any of clauses 47 or 48, wherein the program code further comprises instructions to: obtain an estimated location of the UE and the location of the base station; determine a distance estimate between the estimated location of the UE and the location of the base station; and determine the expected range based on the distance estimate.

Clause 50. The non-transitory computer readable storage medium of any of clauses 40-49, wherein the message further comprises at least one of an implicit or explicit alignment of the current time to a base station subframe or slot boundary, an uncertainty of the current time, a source of the current time, or a combination thereof.

Clause 51. The non-transitory computer readable storage medium of any of clauses 40-50, wherein the message further comprises a digital signature for the base station, the program code further comprising instructions to: authenticate the current time in the message based on the digital signature for the base station.

Clause 52. The non-transitory computer readable storage medium of clause 51, wherein the program code further comprises instructions to: receive a public ciphering key for the base station from the wireless network, wherein the digital signature is based on a private ciphering key that corresponds to the public ciphering key, wherein authenticating the current time uses the public ciphering key.

Clause 53. A method performed by a base station for supporting acquisition of time by a User Equipment (UE) in a wireless network, comprising: obtaining a current time; ciphering at least a portion of the current time; and broadcasting a message comprising the current time, wherein the UE receives the message, obtains an unciphered current time by deciphering the at least the portion of the current time, and determines a propagation delay between the base station and the UE, wherein the UE determines a corrected current time based on the unciphered current time and the propagation delay.

Clause 54. The method of clause 53, wherein the current time comprises a Coordinated Universal Time (UTC) time, a Global Positioning System (GPS) time, a GLONASS time, a Beidou time, a Galileo time, a Global Navigation Satellite System (GNSS) time, or a local regional time.

Clause 55. The method of any of clauses 53 or 54, further comprising assisting the UE in determining the propagation delay by performing one of the following: sending a timing advance to the UE, wherein the timing advance enables determination of the propagation delay by the UE; sending a message to the UE comprising at least one of a location of the UE and a location of the base station, wherein the propagation delay is determined by the UE based on a distance between the location of the UE and the location of the base station; or assisting the UE in measuring a round trip propagation time (RTT) between the UE and the base station, wherein the propagation delay equals half of the RTT.

Clause 56. The method of clause 55, wherein sending the message to the UE comprising at least one of the location of the UE and the location of the base station comprises at least one of the following: broadcasting the location of the base station in a System Information Block (SIB); forwarding a Long Term Evolution (LTE) positioning protocol (LPP) assistance data message to the UE containing the location of the base station; sending a Mobile Originated Location Request (MO-LR) response message to the UE containing the location of the UE; or transferring LPP messages between the UE and a location server for the UE to determine the location of the UE.

Clause 57. The method of any of clauses 55 or 56, wherein assisting the UE in measuring the RTT comprises: sending a first message to the UE that indicates a first local transmission time for the base station, wherein the UE associates local timing in the UE with a local transmission time for the base station based on the first local transmission time for the base station and a local time of receipt in the UE of the first message; receiving a second message from the UE on a Random Access Channel (RACH), the second message comprising a random variable, the second message transmitted at a first time, wherein the first time is either a local time in the UE or an associated local transmission time for the base station; measuring a second time, wherein the second time is the local transmission time for the base station at which the second message was received at the base station; and sending a third message to the UE in response to the second message, the third message comprising the second time and the random variable, wherein the UE determines the RTT based on the first time and the second time.

Clause 58. The method of clause 57, further comprising ciphering the third message.

Clause 59. The method of any of clauses 57 or 58, further comprising including in the third message a digital signature for the base station, wherein the UE authenticates the third message based on the digital signature for the base station.

Clause 60. The method of any of clauses 55-59, wherein an attacking device is present in the wireless network between the UE and the base station, wherein the message is received by the UE via the attacking device in a replay attack, wherein the UE determines the propagation delay from the timing advance or by measuring the RTT; and wherein the UE detects the presence of the attacking device based on the propagation delay being outside an expected range.

Clause 61. The method of clause 60, wherein the expected range comprises a maximum propagation delay based on a maximum expected distance between the UE and the base station.

Clause 62. The method of any of clauses 60 or 61, wherein the expected range is based on an estimated location of the UE and the location of the base station obtained by the UE.

Clause 63. The method of any of clauses 53-62, further comprising including in the message at least one of an implicit or explicit alignment of the current time to a subframe or slot boundary for the base station, an uncertainty of the current time, a source from which the current time is obtained, or a combination thereof.

Clause 64. The method of any of clauses 53-63, further comprising including in the message a digital signature for the base station, wherein the UE authenticates the current time in the message based on the digital signature for the base station.

Clause 65. The method of clause 64, further comprising: sending a public ciphering key for the base station to the UE, wherein the digital signature is based on a private ciphering key that corresponds to the public ciphering key, wherein the UE authenticates the current time using the public ciphering key.

Clause 66. A base station configured for supporting acquisition of time by a User Equipment (UE) in a wireless network, comprising: an external interface configured to wirelessly communicate with entities in the wireless network; at least one memory; at least one processor coupled to the external interface and the at least one memory, wherein the at least one processor is configured to: obtain a current time; cipher at least a portion of the current time; and broadcast a message comprising the current time, wherein the UE receives the message, obtains an unciphered current time by deciphering the at least the portion of the current time, and determines a propagation delay between the base station and the UE, wherein the UE determines a corrected current time based on the unciphered current time and the propagation delay.

Clause 67. The base station of clause 66, wherein the current time comprises a Coordinated Universal Time (UTC) time, a Global Positioning System (GPS) time, a GLONASS time, a Beidou time, a Galileo time, a Global Navigation Satellite System (GNSS) time, or a local regional time.

Clause 68. The base station of any of clauses 66 or 67, wherein the at least one processor is further configured to assist the UE in determining the propagation delay by being configured for one of the following: send a timing advance to the UE, wherein the timing advance enables determination of the propagation delay by the UE; send a message to the UE comprising at least one of a location of the UE and a location of the base station, wherein the propagation delay is determined by the UE based on a distance between the location of the UE and the location of the base station; or assist the UE in measuring a round trip propagation time (RTT) between the UE and the base station, wherein the propagation delay equals half of the RTT.

Clause 69. The base station of clause 68, wherein the at least one processor is further configured to send the message to the UE comprising at least one of the location of the UE and the location of the base station by being configured for at least one of the following: broadcast the location of the base station in a System Information Block (SIB); forward a Long Term Evolution (LTE) positioning protocol (LPP) assistance data message to the UE containing the location of the base station; send a Mobile Originated Location Request (MO-LR) response message to the UE containing the location of the UE; or transfer LPP messages between the UE and a location server for the UE to determine the location of the UE.

Clause 70. The base station of any of clauses 68 or 69, wherein the at least one processor is further configured to assist the UE in measuring the RTT by being configured to: send a first message to the UE that indicates a first local transmission time for the base station, wherein the UE associates local timing in the UE with a local transmission time for the base station based on the first local transmission time for the base station and a local time of receipt in the UE of the first message; receive a second message from the UE on a Random Access Channel (RACH), the second message comprising a random variable, the second message transmitted at a first time, wherein the first time is either a local time in the UE or an associated local transmission time for the base station; measure a second time, wherein the second time is the local transmission time for the base station at which the second message was received at the base station; and send a third message to the UE in response to the second message, the third message comprising the second time and the random variable, wherein the UE determines the RTT based on the first time and the second time.

Clause 71. The base station of clause 70, wherein the at least one processor is further configured to cipher the third message.

Clause 72. The base station of any of clauses 70 or 71, wherein the at least one processor is further configured to include in the third message a digital signature for the base station, wherein the UE authenticates the third message based on the digital signature for the base station.

Clause 73. The base station of any of clauses 68-72, wherein an attacking device is present in the wireless network between the UE and the base station, wherein the message is received by the UE via the attacking device in a replay attack, wherein the UE determines the propagation delay from the timing advance or by measuring the RTT; and wherein the UE detects the presence of the attacking device based on the propagation delay being outside an expected range.

Clause 74. The base station of clause 73, wherein the expected range comprises a maximum propagation delay based on a maximum expected distance between the UE and the base station.

Clause 75. The base station of any of clauses 73 or 74, wherein the expected range is based on an estimated location of the UE and the location of the base station obtained by the UE.

Clause 76. The base station of any of clauses 66-75, wherein the at least one processor is further configured to include in the message at least one of an implicit or explicit alignment of the current time to a subframe or slot boundary for the base station, an uncertainty of the current time, a source from which the current time is obtained, or a combination thereof.

Clause 77. The base station of any of clauses 66-76, wherein the at least one processor is further configured to include in the message a digital signature for the base station, wherein the UE authenticates the current time in the message based on the digital signature for the base station.

Clause 78. The base station of clause 77, wherein the at least one processor is further configured to: send a public ciphering key for the base station to the UE, wherein the digital signature is based on a private ciphering key that corresponds to the public ciphering key, wherein the UE authenticates the current time using the public ciphering key.

Clause 79. A base station configured for supporting acquisition of time by a User Equipment (UE) in a wireless network, comprising: means for obtaining a current time; means for ciphering at least a portion of the current time; and means for broadcasting a message comprising the current time, wherein the UE receives the message, obtains an unciphered current time by deciphering the at least the portion of the current time, and determines a propagation delay between the base station and the UE, wherein the UE determines a corrected current time based on the unciphered current time and the propagation delay.

Clause 80. The base station of clause 79, wherein the current time comprises a Coordinated Universal Time (UTC) time, a Global Positioning System (GPS) time, a GLONASS time, a Beidou time, a Galileo time, a Global Navigation Satellite System (GNSS) time, or a local regional time.

Clause 81. The base station of any of clauses 79 or 80, further comprising means for assisting the UE in determining the propagation delay comprising one of the following: means for sending a timing advance to the UE, wherein the timing advance enables determination of the propagation delay by the UE; means for sending a message to the UE comprising at least one of a location of the UE and a location of the base station, wherein the propagation delay is determined by the UE based on a distance between the location of the UE and the location of the base station; or means for assisting the UE in measuring a round trip propagation time (RTT) between the UE and the base station, wherein the propagation delay equals half of the RTT.

Clause 82. The base station of clause 81, wherein the means for sending the message to the UE comprising at least one of the location of the UE and the location of the base station comprises at least one of the following: means for broadcasting the location of the base station in a System Information Block (SIB); means for forwarding a Long Term Evolution (LTE) positioning protocol (LPP) assistance data message to the UE containing the location of the base station; means for sending a Mobile Originated Location Request (MO-LR) response message to the UE containing the location of the UE; or means for transferring LPP messages between the UE and a location server for the UE to determine the location of the UE.

Clause 83. The base station of any of clauses 81 or 82, wherein the means for assisting the UE in measuring the RTT comprises: means for sending a first message to the UE that indicates a first local transmission time for the base station, wherein the UE associates local timing in the UE with a local transmission time for the base station based on the first local transmission time for the base station and a local time of receipt in the UE of the first message; means for receiving a second message from the UE on a Random Access Channel (RACH), the second message comprising a random variable, the second message transmitted at a first time, wherein the first time is either a local time in the UE or an associated local transmission time for the base station; means for measuring a second time, wherein the second time is the local transmission time for the base station at which the second message was received at the base station; and means for sending a third message to the UE in response to the second message, the third message comprising the second time and the random variable, wherein the UE determines the RTT based on the first time and the second time.

Clause 84. The base station of clause 83, further comprising means for ciphering the third message.

Clause 85. The base station of any of clauses 83 or 84, further comprising means for including in the third message a digital signature for the base station, wherein the UE authenticates the third message based on the digital signature for the base station.

Clause 86. The base station of any of clauses 81-85, wherein an attacking device is present in the wireless network between the UE and the base station, wherein the message is received by the UE via the attacking device in a replay attack, wherein the UE determines the propagation delay from the timing advance or by measuring the RTT; and wherein the UE detects the presence of the attacking device based on the propagation delay being outside an expected range.

Clause 87. The base station of clause 86, wherein the expected range comprises a maximum propagation delay based on a maximum expected distance between the UE and the base station.

Clause 88. The base station of any of clauses 86 or 87, wherein the expected range is based on an estimated location of the UE and the location of the base station obtained by the UE.

Clause 89. The base station of any of clauses 79-88, further comprising means for including in the message at least one of an implicit or explicit alignment of the current time to a subframe or slot boundary for the base station, an uncertainty of the current time, a source from which the current time is obtained, or a combination thereof.

Clause 90. The base station of any of clauses 79-89, further comprising means for including in the message a digital signature for the base station, wherein the UE authenticates the current time in the message based on the digital signature for the base station.

Clause 91. The base station of clause 90, further comprising: means for sending a public ciphering key for the base station to the UE, wherein the digital signature is based on a private ciphering key that corresponds to the public ciphering key, wherein the UE authenticates the current time using the public ciphering key.

Clause 92. A non-transitory computer readable storage medium including program code stored thereon, the program code is operable to configure at least one processor in a base station for supporting acquisition of time by a User Equipment (UE) in a wireless network, the program code comprising instructions to: obtain a current time; cipher at least a portion of the current time; and broadcast a message comprising the current time, wherein the UE receives the message, obtains an unciphered current time by deciphering the at least the portion of the current time, and determines a propagation delay between the base station and the UE, wherein the UE determines a corrected current time based on the unciphered current time and the propagation delay.

Clause 93. The non-transitory computer readable storage medium of clause 92, wherein the current time comprises a Coordinated Universal Time (UTC) time, a Global Positioning System (GPS) time, a GLONASS time, a Beidou time, a Galileo time, a Global Navigation Satellite System (GNSS) time, or a local regional time.

Clause 94. The non-transitory computer readable storage medium of any of clauses 92 or 93, further comprising instructions to assist the UE in determining the propagation delay comprising instructions for one of the following: send a timing advance to the UE, wherein the timing advance enables determination of the propagation delay by the UE; send a message to the UE comprising at least one of a location of the UE and a location of the base station, wherein the propagation delay is determined by the UE based on a distance between the location of the UE and the location of the base station; or assist the UE in measuring a round trip propagation time (RTT) between the UE and the base station, wherein the propagation delay equals half of the RTT.

Clause 95. The non-transitory computer readable storage medium of clause 94, wherein the instructions to send the message to the UE comprising at least one of the location of the UE and the location of the base station comprises instructions for at least one of the following: broadcast the location of the base station in a System Information Block (SIB); forward a Long Term Evolution (LTE) positioning protocol (LPP) assistance data message to the UE containing the location of the base station; send a Mobile Originated Location Request (MO-LR) response message to the UE containing the location of the UE; or transfer LPP messages between the UE and a location server for the UE to determine the location of the UE.

Clause 96. The non-transitory computer readable storage medium of any of clauses 94 or 95, wherein the instructions to assist the UE in measuring the RTT comprises instructions to: send a first message to the UE that indicates a first local transmission time for the base station, wherein the UE associates local timing in the UE with a local transmission time for the base station based on the first local transmission time for the base station and a local time of receipt in the UE of the first message; receive a second message from the UE on a Random Access Channel (RACH), the second message comprising a random variable, the second message transmitted at a first time, wherein the first time is either a local time in the UE or an associated local transmission time for the base station; measure a second time, wherein the second time is the local transmission time for the base station at which the second message was received at the base station; and send a third message to the UE in response to the second message, the third message comprising the second time and the random variable, wherein the UE determines the RTT based on the first time and the second time.

Clause 97. The non-transitory computer readable storage medium of clause 96, wherein the program code further comprises instructions to cipher the third message.

Clause 98. The non-transitory computer readable storage medium of any of clauses 96 or 97, wherein the program code further comprises instructions to include in the third message a digital signature for the base station, wherein the UE authenticates the third message based on the digital signature for the base station.

Clause 99. The non-transitory computer readable storage medium of any of clauses 94-98, wherein an attacking device is present in the wireless network between the UE and the base station, wherein the message is received by the UE via the attacking device in a replay attack, wherein the UE determines the propagation delay from the timing advance or by measuring the RTT; and wherein the UE detects the presence of the attacking device based on the propagation delay being outside an expected range.

Clause 100. The non-transitory computer readable storage medium of clause 99, wherein the expected range comprises a maximum propagation delay based on a maximum expected distance between the UE and the base station.

Clause 101. The non-transitory computer readable storage medium of any of clauses 99 or 100, wherein the expected range is based on an estimated location of the UE and the location of the base station obtained by the UE.

Clause 102. The non-transitory computer readable storage medium of any of clauses 92-101, wherein the program code further comprises instructions to include in the message at least one of an implicit or explicit alignment of the current time to a subframe or slot boundary for the base station, an uncertainty of the current time, a source from which the current time is obtained, or a combination thereof.

Clause 103. The non-transitory computer readable storage medium of any of clauses 92-102, wherein the program code further comprises instructions to include in the message a digital signature for the base station, wherein the UE authenticates the current time in the message based on the digital signature for the base station.

Clause 104. The non-transitory computer readable storage medium of clause 103, wherein the program code further comprises instructions to: send a public ciphering key for the base station to the UE, wherein the digital signature is based on a private ciphering key that corresponds to the public ciphering key, wherein the UE authenticates the current time using the public ciphering key.

Therefore, it is intended that claimed subject matter not be limited to the particular examples disclosed, but that such claimed subject matter may also include all aspects falling within the scope of appended claims, and equivalents thereof.

What is claimed is:

1. A method performed by a User Equipment (UE) for supporting acquisition of a corrected current time in a wireless network, comprising:
   receiving a public ciphering key for a base station from the wireless network;
   receiving a message broadcast from the base station, the message comprising:
      a digital signature for the base station, wherein the digital signature is based on a private ciphering key that corresponds to the public ciphering key, and
      a current time represented by a plurality of digits, wherein at least a portion of the plurality of digits representing the current time is ciphered;
   authenticating the current time in the message based on the digital signature for the base station, wherein authenticating the current time uses the public ciphering key;
   deciphering at least the portion of the plurality of digits representing the current time that is ciphered;
   determining a propagation delay between the base station and the UE; and
   determining the corrected current time at the UE based on the current time, including at least the portion of the plurality of digits representing the current time that is deciphered, and the propagation delay.

2. The method of claim 1, wherein the current time comprises a Coordinated Universal Time (UTC) time, a Global Positioning System (GPS) time, a GLONASS time, a Beidou time, a Galileo time, a Global Navigation Satellite System (GNSS) time, or a local regional time.

3. The method of claim 1, wherein determining the propagation delay comprises one of the following:
   obtaining a timing advance from the base station, wherein the propagation delay is determined from the timing advance;
   obtaining a location of the UE and a location of the base station, wherein the propagation delay is determined based on a distance between the location of the UE and the location of the base station; or
   measuring a round trip propagation time (RTT) between the UE and the base station, wherein the propagation delay equals half of the RTT.

4. The method of claim 3, wherein obtaining the location of the UE and the location of the base station comprises at least one of the following:
   receiving a broadcast from the base station of the location of the base station in a System Information Block (SIB);
   receiving a Long Term Evolution (LTE) positioning protocol (LPP) assistance data message containing the location of the base station;
   receiving a Mobile Originated Location Request (MO-LR) response message containing the location of the UE; or
   performing a positioning session to determine the location of the UE.

5. The method of claim 3, wherein measuring the RTT comprises:
   receiving a first message from the base station that indicates a first local transmission time for the base station;
   associating a local timing in the UE with a local transmission time for the base station based on the first local transmission time for the base station and a local time of receipt in the UE of the first message;
   transmitting a second message to the base station on a Random Access Channel (RACH), the second message comprising a random variable, the second message transmitted at a first time, wherein the first time is either a local time in the UE or an associated local transmission time for the base station;
   receiving a third message from the base station in response to the second message, the third message comprising a second time and the random variable, wherein the second time is the local transmission time for the base station at which the second message was received at the base station; and
   determining the RTT based on the first time and the second time.

6. The method of claim 5, wherein the third message is ciphered.

7. The method of claim 5, wherein the third message further comprises a digital signature for the base station, the method further comprising:
   authenticating the third message based on the digital signature for the base station.

8. The method of claim 3, wherein an attacking device is present in the wireless network between the UE and the base station, wherein the message is received via the attacking device in a replay attack, the method further comprising:
determining the propagation delay from the timing advance or by measuring the RTT; and
detecting the presence of the attacking device based on the propagation delay being outside an expected range.

9. The method of claim 8, wherein the expected range comprises a maximum propagation delay based on a maximum expected distance to the base station.

10. The method of claim 8, further comprising:
obtaining an estimated location of the UE and the location of the base station;
determining a distance estimate between the estimated location of the UE and the location of the base station; and
determining the expected range based on the distance estimate.

11. The method of claim 1, wherein the message further comprises at least one of an implicit or explicit alignment of the current time to a base station subframe or slot boundary, an uncertainty of the current time, a source of the current time, or a combination thereof.

12. A User Equipment (UE) configured for supporting acquisition of a corrected current time in a wireless network, comprising:
a wireless transceiver configured to wirelessly communicate with base stations in the wireless network;
at least one memory;
at least one processor coupled to the wireless transceiver and the at least one memory, wherein the at least one processor is configured to:
receive a public ciphering key for a base station from the wireless network;
receive, via the wireless transceiver, a message broadcast from the base station, the message comprising:
a digital signature for the base station, wherein the digital signature is based on a private ciphering key that corresponds to the public ciphering key, and
a current time represented by a plurality of digits, wherein at least a portion of the plurality of digits representing the current time is ciphered;
authenticate the current time in the message based on the digital signature for the base station, wherein authenticating the current time uses the public ciphering key;
decipher at least the portion of the plurality of digits representing the current time that is ciphered;
determine a propagation delay between the base station and the UE; and
determine the corrected current time at the UE based on the current time, including at least the portion of the plurality of digits representing the current time that is deciphered, and the propagation delay.

13. The UE of claim 12, wherein the current time comprises a Coordinated Universal Time (UTC) time, a Global Positioning System (GPS) time, a GLONASS time, a Beidou time, a Galileo time, a Global Navigation Satellite System (GNSS) time, or a local regional time.

14. The UE of claim 12, wherein the at least one processor is configured to determine the propagation delay by one of the following:
obtain, via the wireless transceiver, a timing advance from the base station, wherein the propagation delay is determined from the timing advance;
obtain a location of the UE and a location of the base station, wherein the propagation delay is determined based on a distance between the location of the UE and the location of the base station; or
measure a round trip propagation time (RTT) between the UE and the base station, wherein the propagation delay equals half of the RTT.

15. The UE of claim 14, wherein the at least one processor is configured to obtain the location of the UE and the location of the base station by at least one of the following:
receive, via the wireless transceiver, a broadcast from the base station of the location of the base station in a System Information Block (SIB);
receive, via the wireless transceiver, a Long Term Evolution (LTE) positioning protocol (LPP) assistance data message containing the location of the base station;
receive, via the wireless transceiver, a Mobile Originated Location Request (MO-LR) response message containing the location of the UE; or
perform a positioning session to determine the location of the UE.

16. The UE of claim 14, wherein the at least one processor is configured to measure the RTT by being configured to:
receive, via the wireless transceiver, a first message from the base station that indicates a first local transmission time for the base station;
associate a local timing in the UE with a local transmission time for the base station based on the first local transmission time for the base station and a local time of receipt in the UE of the first message;
transmit, via the wireless transceiver, a second message to the base station on a Random Access Channel (RACH), the second message comprising a random variable, the second message transmitted at a first time, wherein the first time is either a local time in the UE or an associated local transmission time for the base station;
receive, via the wireless transceiver, a third message from the base station in response to the second message, the third message comprising a second time and the random variable, wherein the second time is the local transmission time for the base station at which the second message was received at the base station; and
determine the RTT based on the first time and the second time.

17. The UE of claim 16, wherein the third message is ciphered.

18. The UE of claim 16, wherein the third message further comprises a digital signature for the base station, the at least one processor is further configured to:
authenticate the third message based on the digital signature for the base station.

19. The UE of claim 14, wherein an attacking device is present in the wireless network between the UE and the base station, wherein the message is received via the attacking device in a replay attack, the at least one processor is further configured to:
determine the propagation delay from the timing advance or by measuring the RTT; and
detect the presence of the attacking device based on the propagation delay being outside an expected range.

20. The UE of claim 19, wherein the expected range comprises a maximum propagation delay based on a maximum expected distance to the base station.

21. The UE of claim 19, wherein the at least one processor is further configured to:
obtain an estimated location of the UE and the location of the base station;

determine a distance estimate between the estimated location of the UE and the location of the base station; and determine the expected range based on the distance estimate.

22. The UE of claim 12, wherein the message further comprises at least one of an implicit or explicit alignment of the current time to a base station subframe or slot boundary, an uncertainty of the current time, a source of the current time, or a combination thereof.

23. A method performed by a base station for supporting acquisition of a corrected current time by a User Equipment (UE) in a wireless network, comprising:

obtaining a current time;
representing the current time using a plurality of digits;
ciphering at least a portion of the plurality of digits representing the current time;
sending a public ciphering key for the base station to the UE; and
broadcasting a message comprising the current time and a digital signature for the base station, wherein the digital signature is based on a private ciphering key that corresponds to the public ciphering key;
wherein the UE receives the message, obtains an unciphered current time by deciphering the ciphered portion of the current time, and determines a propagation delay between the base station and the UE, wherein the UE determines the corrected current time based on the unciphered current time and the propagation delay, wherein the UE authenticates the current time using the public ciphering key.

24. The method of claim 23, wherein the current time comprises a Coordinated Universal Time (UTC) time, a Global Positioning System (GPS) time, a GLONASS time, a Beidou time, a Galileo time, a Global Navigation Satellite System (GNSS) time, or a local regional time.

25. The method of claim 23, further comprising assisting the UE in determining the propagation delay by performing one of the following:

sending a timing advance to the UE, wherein the timing advance enables determination of the propagation delay by the UE;
sending a message to the UE comprising at least one of a location of the UE and a location of the base station, wherein the propagation delay is determined by the UE based on a distance between the location of the UE and the location of the base station; or
assisting the UE in measuring a round trip propagation time (RTT) between the UE and the base station, wherein the propagation delay equals half of the RTT.

26. The method of claim 25, wherein sending the message to the UE comprising at least one of the location of the UE and the location of the base station comprises at least one of the following:

broadcasting the location of the base station in a System Information Block (SIB);
forwarding a Long Term Evolution (LTE) positioning protocol (LPP) assistance data message to the UE containing the location of the base station;
sending a Mobile Originated Location Request (MO-LR) response message to the UE containing the location of the UE; or
transferring LPP messages between the UE and a location server for the UE to determine the location of the UE.

27. The method of claim 25, wherein assisting the UE in measuring the RTT comprises:

sending a first message to the UE that indicates a first local transmission time for the base station, wherein the UE associates local timing in the UE with a local transmission time for the base station based on the first local transmission time for the base station and a local time of receipt in the UE of the first message;
receiving a second message from the UE on a Random Access Channel (RACH), the second message comprising a random variable, the second message transmitted at a first time, wherein the first time is either a local time in the UE or an associated local transmission time for the base station;
measuring a second time, wherein the second time is the local transmission time for the base station at which the second message was received at the base station; and
sending a third message to the UE in response to the second message, the third message comprising the second time and the random variable,
wherein the UE determines the RTT based on the first time and the second time.

28. The method of claim 27, further comprising ciphering the third message.

29. The method of claim 27, further comprising including in the third message a digital signature for the base station, wherein the UE authenticates the third message based on the digital signature for the base station.

30. The method of claim 25, wherein an attacking device is present in the wireless network between the UE and the base station, wherein the message is received by the UE via the attacking device in a replay attack, wherein the UE determines the propagation delay from the timing advance or by measuring the RTT; and wherein the UE detects the presence of the attacking device based on the propagation delay being outside an expected range.

31. The method of claim 30, wherein the expected range comprises a maximum propagation delay based on a maximum expected distance between the UE and the base station.

32. The method of claim 30, wherein the expected range is based on an estimated location of the UE and the location of the base station obtained by the UE.

33. The method of claim 23, further comprising including in the message at least one of an implicit or explicit alignment of the current time to a subframe or slot boundary for the base station, an uncertainty of the current time, a source from which the current time is obtained, or a combination thereof.

34. A base station configured for supporting acquisition of a corrected current time by a User Equipment (UE) in a wireless network, comprising:

an external interface configured to wirelessly communicate with entities in the wireless network;
at least one memory;
at least one processor coupled to the external interface and the at least one memory, wherein the at least one processor is configured to:
obtain a current time;
represent the current time using a plurality of digits;
cipher at least a portion of the plurality of digits representing the current time; and
sending a public ciphering key for the base station to the UE;
broadcast a message comprising the current time and a digital signature for the base station, wherein the digital signature is based on a private ciphering key that corresponds to the public ciphering key;
wherein the UE receives the message, obtains an unciphered current time by deciphering the ciphered portion of the current time, and determines a propagation delay between the base station and the UE, wherein the UE determines the corrected current time based on the unciphered current time and the propagation delay, wherein the UE authenticates the current time using the public ciphering key.

35. The base station of claim 34, wherein the current time comprises a Coordinated Universal Time (UTC) time, a Global Positioning System (GPS) time, a GLONASS time, a Beidou time, a Galileo time, a Global Navigation Satellite System (GNSS) time, or a local regional time.

36. The base station of claim 34, wherein the at least one processor is further configured to assist the UE in determining the propagation delay by being configured for one of the following:
 send a timing advance to the UE, wherein the timing advance enables determination of the propagation delay by the UE;
 send a message to the UE comprising at least one of a location of the UE and a location of the base station, wherein the propagation delay is determined by the UE based on a distance between the location of the UE and the location of the base station; or
 assist the UE in measuring a round trip propagation time (RTT) between the UE and the base station, wherein the propagation delay equals half of the RTT.

37. The base station of claim 36, wherein the at least one processor is further configured to send the message to the UE comprising at least one of the location of the UE and the location of the base station by being configured for at least one of the following:
 broadcast the location of the base station in a System Information Block (SIB);
 forward a Long Term Evolution (LTE) positioning protocol (LPP) assistance data message to the UE containing the location of the base station;
 send a Mobile Originated Location Request (MO-LR) response message to the UE containing the location of the UE; or
 transfer LPP messages between the UE and a location server for the UE to determine the location of the UE.

38. The base station of claim 36, wherein the at least one processor is further configured to assist the UE in measuring the RTT by being configured to:
 send a first message to the UE that indicates a first local transmission time for the base station, wherein the UE associates local timing in the UE with a local transmission time for the base station based on the first local transmission time for the base station and a local time of receipt in the UE of the first message;
 receive a second message from the UE on a Random Access Channel (RACH), the second message comprising a random variable, the second message transmitted at a first time, wherein the first time is either a local time in the UE or an associated local transmission time for the base station;
 measure a second time, wherein the second time is the local transmission time for the base station at which the second message was received at the base station; and
 send a third message to the UE in response to the second message, the third message comprising the second time and the random variable,
 wherein the UE determines the RTT based on the first time and the second time.

39. The base station of claim 38, wherein the at least one processor is further configured to cipher the third message.

40. The base station of claim 38, wherein the at least one processor is further configured to include in the third message a digital signature for the base station, wherein the UE authenticates the third message based on the digital signature for the base station.

41. The base station of claim 36, wherein an attacking device is present in the wireless network between the UE and the base station, wherein the message is received by the UE via the attacking device in a replay attack, wherein the UE determines the propagation delay from the timing advance or by measuring the RTT; and wherein the UE detects the presence of the attacking device based on the propagation delay being outside an expected range.

42. The base station of claim 41, wherein the expected range comprises a maximum propagation delay based on a maximum expected distance between the UE and the base station.

43. The base station of claim 41, wherein the expected range is based on an estimated location of the UE and the location of the base station obtained by the UE.

44. The base station of claim 34, wherein the at least one processor is further configured to include in the message at least one of an implicit or explicit alignment of the current time to a subframe or slot boundary for the base station, an uncertainty of the current time, a source from which the current time is obtained, or a combination thereof.

* * * * *